United States Patent
Khoshnevisan et al.

(10) Patent No.: US 12,414,140 B2
(45) Date of Patent: Sep. 9, 2025

(54) COMPLEXITY HANDLING FOR PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Hari Sankar, San Diego, CA (US); Jae Ho Ryu, San Diego, CA (US); Hobin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/817,230

(22) Filed: Aug. 3, 2022

(65) Prior Publication Data

US 2023/0048970 A1 Feb. 16, 2023

Related U.S. Application Data

(60) Provisional application No. 63/203,962, filed on Aug. 5, 2021.

(51) Int. Cl.
*H04W 72/51* (2023.01)
*H04L 1/08* (2006.01)
(Continued)

(52) U.S. Cl.
CPC ............ *H04W 72/51* (2023.01); *H04L 1/08* (2013.01); *H04L 5/001* (2013.01); *H04L 5/0053* (2013.01); *H04W 72/23* (2023.01); *H04W 72/044* (2013.01)

(58) Field of Classification Search
CPC ... H04W 72/51; H04W 72/23; H04W 72/044; H04W 72/0446; H04L 1/08; H04L 5/001; H04L 5/0053; H04L 5/0094
See application file for complete search history.

(56) References Cited

U.S. PATENT DOCUMENTS 9,763,241 B2   9/2017   Hwang et al.
11,109,397 B2  8/2021   Zhou et al.
(Continued)

FOREIGN PATENT DOCUMENTS

EP      4266742 A1     10/2023
WO   2022154607 A1      7/2022

OTHER PUBLICATIONS

Vivo, "Remaining issues on PDCCH search space", 3GPP TSG RAN WG1 Meeting #92bis, R1-1803828 (Year: 2018).*
(Continued)

*Primary Examiner* — Ayaz R Sheikh
*Assistant Examiner* — Mang Boi Thawng
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network node, an indication of a physical downlink control channel (PDCCH) processing unit (PPU) limit associated with the UE. The UE may receive configurations for a plurality of search space sets, wherein the plurality of search space sets includes one or more linked pairs of search space sets with linked PDCCH candidates for PDCCH repetition. The configurations of the one or more linked pairs of search space sets may be based at least in part on the PPU limit associated with the UE. Numerous other aspects are described.

30 Claims, 21 Drawing Sheets

(51) Int. Cl.
  *H04L 5/00*      (2006.01)
  *H04W 72/23*     (2023.01)
  *H04W 72/044*    (2023.01)

(56) References Cited

U.S. PATENT DOCUMENTS

| | | |
|---|---|---|
| 11,147,101 B2 | 10/2021 | Aiba et al. |
| 2021/0028961 A1* | 1/2021 | Lee ................ H04W 24/08 |
| 2021/0195559 A1 | 6/2021 | Khoshnevisan et al. |
| 2021/0195601 A1 | 6/2021 | Khoshnevisan et al. |
| 2021/0345308 A1 | 11/2021 | Liu et al. |
| 2021/0352501 A1* | 11/2021 | Taherzadeh Boroujeni ................ H04W 72/0446 |
| 2022/0077999 A1 | 3/2022 | Babaei et al. |
| 2022/0225284 A1* | 7/2022 | Hakola ............ H04W 72/0446 |
| 2022/0240160 A1* | 7/2022 | Jang ................ H04L 1/1893 |
| 2022/0304037 A1* | 9/2022 | Zhang ................ H04L 1/08 |
| 2023/0120035 A1* | 4/2023 | Taherzadeh Boroujeni ................ H04L 1/0072 370/329 |
| 2024/0032067 A1* | 1/2024 | Gao ................ H04W 72/232 |
| 2024/0205925 A1* | 6/2024 | Matsumura ........... H04W 72/23 |

OTHER PUBLICATIONS

International Search Report and Written Opinion—PCT/US2022/074529—ISA/EPO—May 23, 2023.

\* cited by examiner

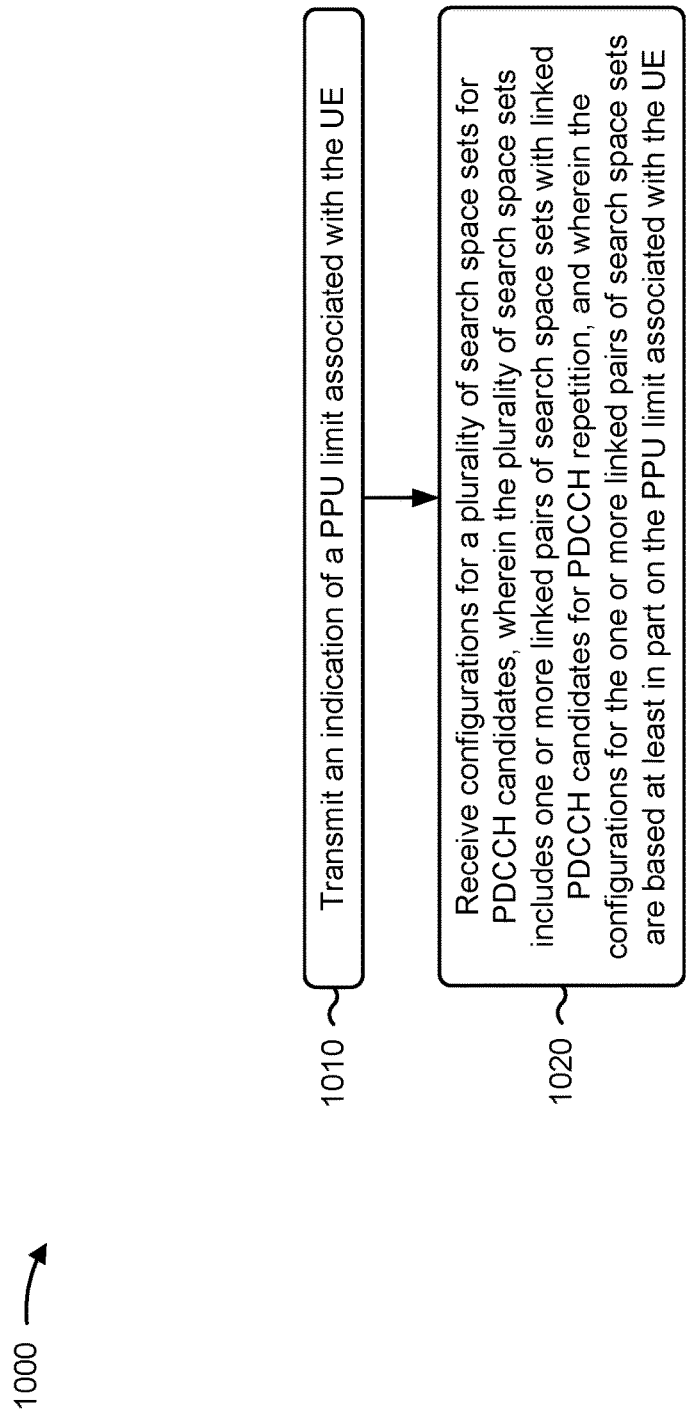

COMPLEXITY HANDLING FOR PHYSICAL DOWNLINK CONTROL CHANNEL REPETITION

CROSS-REFERENCE TO RELATED APPLICATION

This Patent Application claims priority to U.S. Provisional Patent Application No. 63/203,962, filed on Aug. 5, 2021, entitled "COMPLEXITY HANDLING FOR PHYSICAL DOWNLINK CONTROL CHANNEL REPETITION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for complexity handling for physical downlink control channel (PDCCH) repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit, to a network node, an indication of a physical downlink control channel (PDCCH) processing unit (PPU) limit associated with the UE. The one or more processors may be configured to receive, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Some aspects described herein relate to a network node for wireless communication. The network node may include a memory and one or more processors coupled to the memory. The one or more processors may be configured to receive, from a UE, an indication of a PPU limit associated with the UE. The one or more processors may be configured to transmit, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Some aspects described herein relate to a method of wireless communication performed by a UE. The method may include transmitting, to a network node, an indication of a PPU limit associated with the UE. The method may include receiving, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Some aspects described herein relate to a method of wireless communication performed by a network node. The method may include receiving, from a UE, an indication of a PPU limit associated with the UE. The method may include transmitting, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Some aspects described herein relate to a non-transitory computer-readable medium that stores a set of instructions for wireless communication by a UE. The set of instructions, when executed by one or more processors of the UE, may cause the UE to transmit, to a network node, an indication of a PPU limit associated with the UE. The set of instructions, when executed by one or more processors of the UE, may cause the UE to receive, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Some aspects described herein relate to a non-transitory computer-readable medium that stores a set of instructions for wireless communication by a network node. The set of instructions, when executed by one or more processors of the network node, may cause the network node to receive, from a UE, an indication of a PPU limit associated with the UE. The set of instructions, when executed by one or more processors of the network node, may cause the network node to transmit, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Some aspects described herein relate to an apparatus for wireless communication. The apparatus may include means for transmitting, to a network node, an indication of a PPU limit. The apparatus may include means for receiving, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit.

Some aspects described herein relate to an apparatus for wireless communication. The apparatus may include means for receiving, from a UE, an indication of a PPU limit associated with the UE. The apparatus may include means for transmitting, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10-15 are diagrams illustrating example processes associated with complexity handling for PDCCH repetition, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
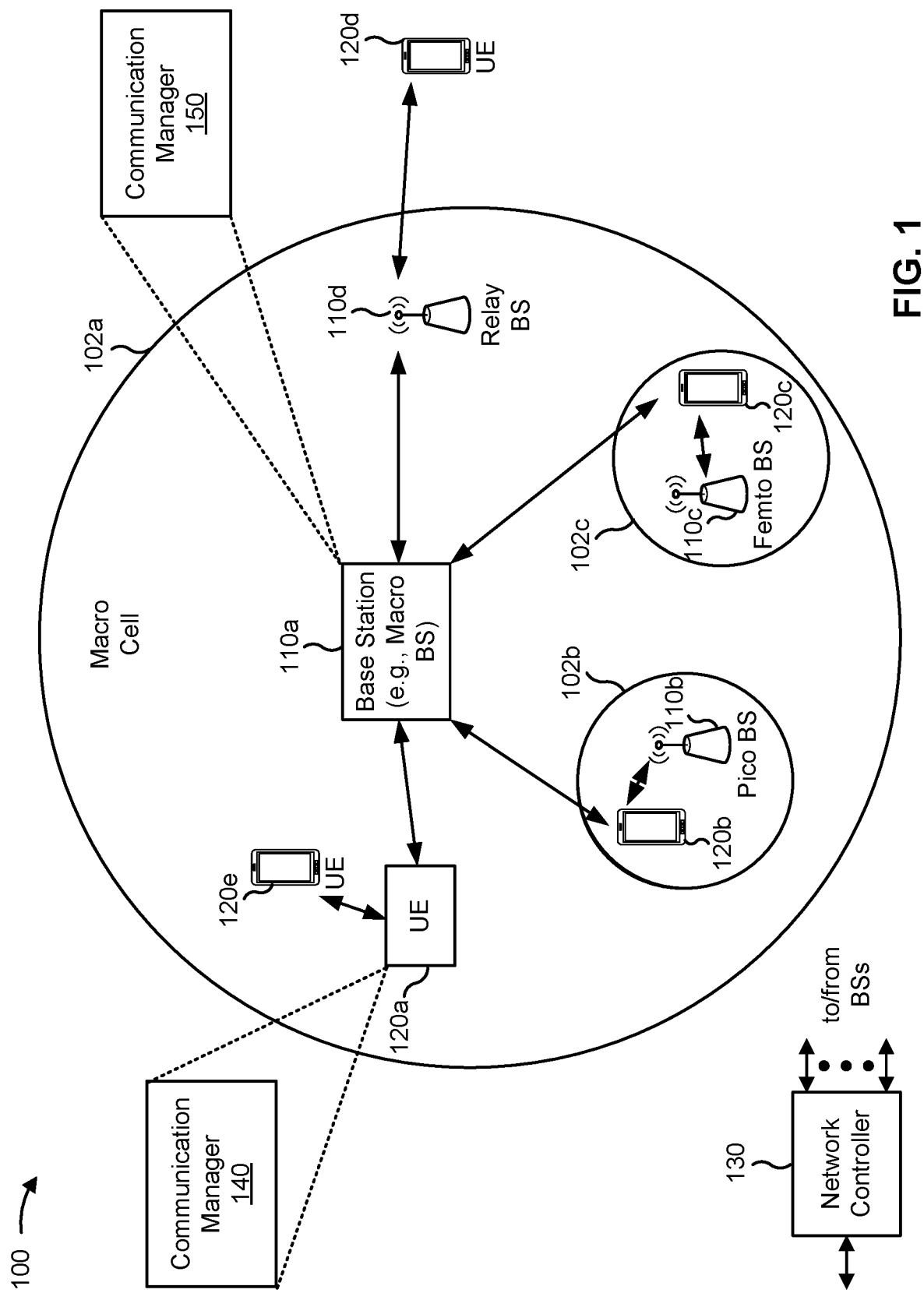
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, an indication of a physical downlink control channel (PDCCH) processing unit (PPU) limit associated with the UE; and receive, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE. Additionally, or alternatively, the communication manager 140 may perform one or more other operations described herein.

In some aspects, as described in more detail elsewhere herein, the communication manager 140 may transmit, to a network node, an indication of a PPU limit associated with the UE; receive, from the network node, configurations for a plurality of search space sets for PDCCH candidates, wherein the plurality of search space sets includes one or more linked pairs of search space sets with linked PDCCH candidates for PDCCH repetition; and selectively monitor one or more of the linked PDCCH candidates in a linked pair of monitoring occasions associated with a linked pair of search space sets of the one or more linked pairs of search space sets based at least in part on a comparison of a total number of PPUs occupied by the linked PDCCH candidates in all of the one or more linked pairs of search space sets and the PPU limit associated with the UE. Additionally, or alternatively, the communication manager 140 may perform one or more other operations described herein.

In some aspects, as described in more detail elsewhere herein, the communication manager 140 may transmit, to a network node, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates; and receive, from the network node, a configuration of a plurality of search space sets for monitoring PDCCH candidates based at least in part on the indication of the capability of the UE to support the linked monitoring occasion between the other two linked monitoring occasions. Additionally, or alternatively, the communication manager 140 may perform one or more other operations described herein.

In some aspects, a network node (e.g., the base station 110) may include a communication manager 150. As described in more detail elsewhere herein, the communication manager 150 may receive, from a UE, an indication of a PPU limit associated with the UE; and transmit, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE. Additionally, or alternatively, the communication manager 150 may perform one or more other operations described herein.

In some aspects, as described in more detail elsewhere herein, the communication manager 150 may receive, from a UE, an indication of a PPU limit associated with the UE; transmit, to the UE, configurations for a plurality of search space sets for PDCCH candidates, wherein the plurality of search space sets includes one or more linked pairs of search space sets with linked PDCCH candidates for PDCCH repetition; and transmit, to the UE, repeated PDCCH transmissions in a pair of linked PDCCH candidates of a linked pair of search space sets, wherein at least one of the configurations of the linked pairs of search space sets or transmitting the repeated PDCCH transmissions is based at least in part on the PPU limit associated with the UE. Additionally, or alternatively, the communication manager 150 may perform one or more other operations described herein.

In some aspects, as described in more detail elsewhere herein, the communication manager 150 may receive from a UE, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates; and transmit, to the UE, a configuration of one or more search space sets for monitoring PDCCH candidates based at least in part on the indication of the capability of the UE to support the linked monitoring occasion between the other two linked monitoring occasions. Additionally, or alternatively, the communication manager 150 may perform one or more other operations described herein.

As indicated above, FIG. 1 is provided as an example. Other examples may differ from what is described with regard to FIG. 1.

Figure 2:
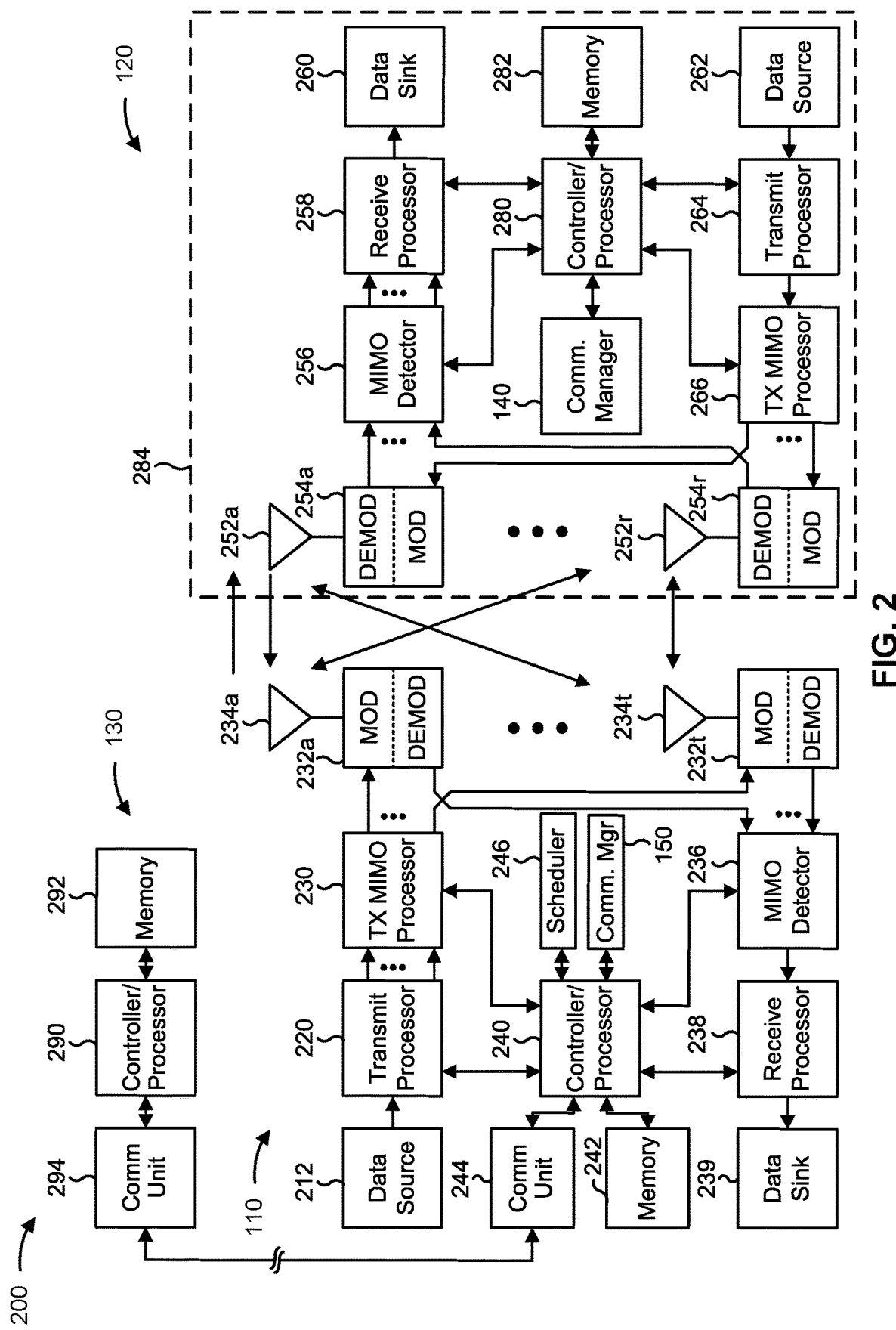
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-17).

The controller/processor 240 of the base station 110, the controller/processor 280 of the UE 120, and/or any other component(s) of FIG. 2 may perform one or more techniques associated with complexity handling for PDCCH repetition, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples. In some aspects, a network node described herein is the base station 110, is included in the base station 110, or includes one or more components of the base station 110 shown in FIG. 2.

In some aspects, a UE (e.g., the UE 120) includes means for transmitting, to a network node, an indication of a PPU limit associated with the UE; and/or means for receiving, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for transmitting, to a network node, an indication of a PPU limit associated with the UE; means for receiving, from the network node, configurations for a plurality of search space sets for PDCCH candidates, wherein the plurality of search space sets includes one or more linked pairs of search space sets with linked PDCCH candidates for PDCCH repetition; and/or means for selectively monitoring one or more of the linked PDCCH candidates in a linked pair of monitoring occasions associated with a linked pair of search space sets of the one or more linked pairs of search space sets based at least in part on a comparison of a total number of PPUs occupied by the linked PDCCH candidates in all of the one or more linked pairs of search space sets and the PPU limit associated with the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for transmitting, to a network node, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates; and/or means for receiving, from the network node, a configuration of a plurality of search space sets for monitoring PDCCH candidates based at least in part on the indication of the capability of the UE to support the linked monitoring occasion between the other two linked monitoring occasions. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for receiving, from a UE, an indication of a PPU limit associated with the UE; and/or means for transmitting, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the base station 110) includes means for receiving, from a UE, an indication of a PPU limit associated with the UE; means for transmitting, to the UE, configurations for a plurality of search space sets for PDCCH candidates, wherein the plurality of search space sets includes one or more linked pairs of search space sets with linked PDCCH candidates for PDCCH repetition; and/or means for transmitting, to the UE, repeated PDCCH transmissions in a pair of linked PDCCH candidates of a linked pair of search space sets, wherein at least one of the configurations of the linked pairs of search space sets or transmitting the repeated PDCCH transmissions is based at least in part on the PPU limit associated with the UE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the base station 110) includes means for receiving, from a UE, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates; and/or means for transmitting, to the UE, a configuration of one or more search space sets for monitoring PDCCH candidates based at least in part on the indication of the capability of the UE to support the linked monitoring occasion between the other two linked monitoring occasions. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to an aggregated base station, a disaggregated base station, or to one or more units of a disaggregated base station (such as one or more central units (CUs), one or more distributed units (DUs), one or more radio units (RUs), or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more DUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
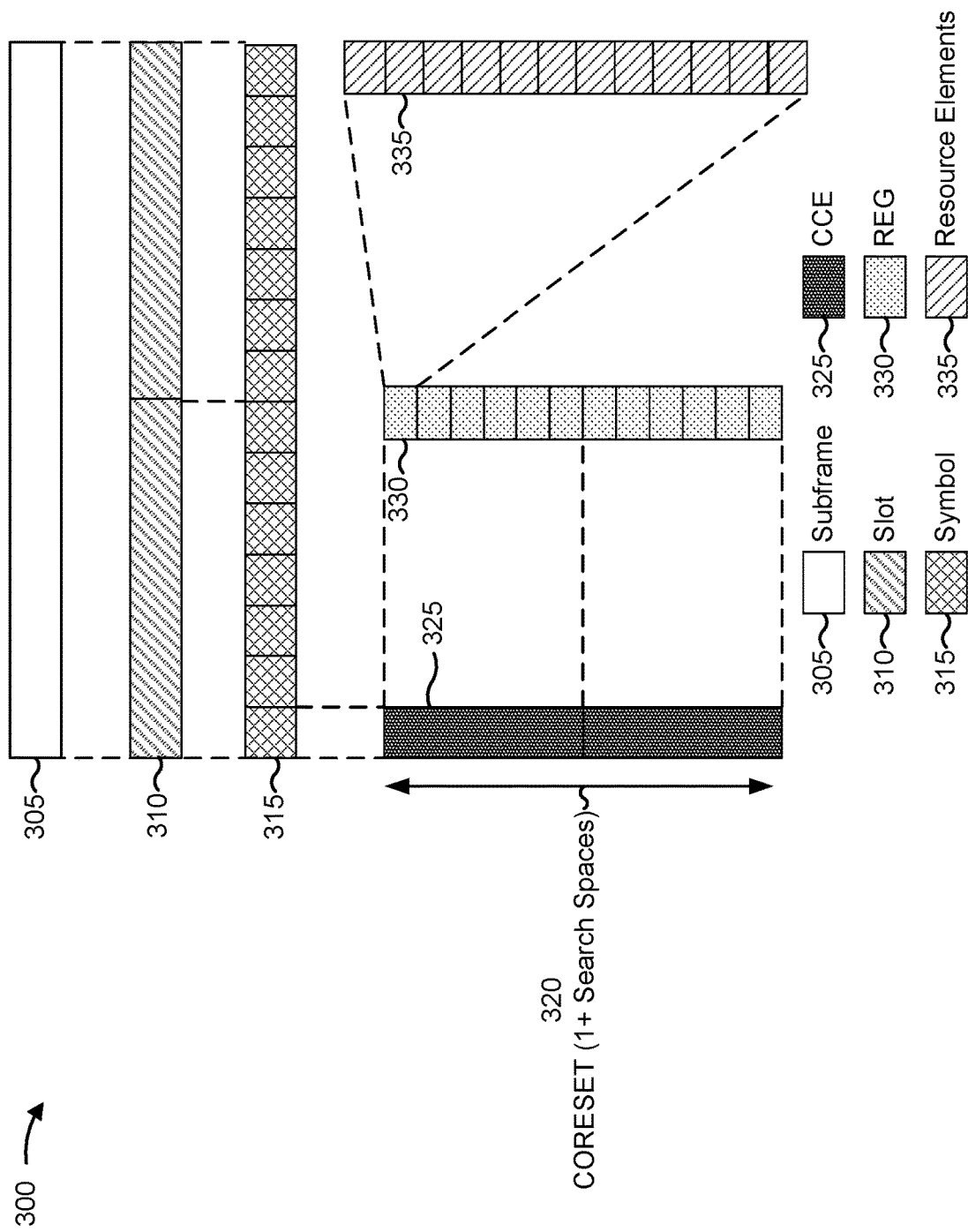
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some examples, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some examples, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of RBs) and/or a time domain region (e.g., a quantity of symbols) for the CORESET 320. In some examples, a UE may be configured with multiple CORESETs 320 (e.g., up to three or up to five) in a bandwidth part (BWP) of a component carrier (CC) (e.g., a serving cell). Each CORESET 320 may be associated with a respective active transmission configuration indicator (TCI) state.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some examples, different ALs may be used, such as 1, 2, 4, 8, 16, or another AL.

Each CCE 325 may include a fixed quantity of resource element groups (REGs) 330, shown as 6 REGs 330, or may include a variable quantity of REGs 330. In some examples, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include possible locations (e.g., in time and/or frequency) where a PDCCH may be located. A CORESET 320 may include one or more types of search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an AL being used. A possible location (e.g., in time and/or frequency) for a PDCCH may be referred to as a PDCCH candidate, and a set of possible PDCCH locations at an AL may be referred to as a search space. One or more search spaces across ALs may be referred to as a search space (SS) set.

In some examples, there may be multiple SS sets (e.g., up to 10) in a BWP of a CC. A CORESET 320 may have one or more SS sets, and each SS set is associated with a CORESET 320. A configuration of an SS set may include an RRC configuration that identifies, for the SS set, the associated CORESET 320, periodicity, and offset for monitoring slots and monitoring symbols with a monitoring slot, a SS set type (e.g., common SS (CSS) or UE-specific SS (USS)), DCI formats to monitor, and/or a number of PDCCH candidates for one or more given ALs. The periodicity and offset of the monitoring slots, and the monitoring symbols within the monitoring slots, determine PDCCH monitoring occasions for the SS set. In the configuration of an SS set, PDCCH candidates for a given AL are associated with respective candidate indexes. A UE may monitor PDCCH candidates in the monitoring occasions for a configured SS set and perform blind decoding of the PDCCH candidates to receive DCI transmitted in a PDCCH communication in the PDCCH candidates. In this case, one or more PDCCH candidates with a cyclic redundancy check (CRC) pass correspond to decoded DCI for the UE.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

FIGS. 4A-4D are diagrams illustrating examples 400, 410, 420, 430, 440, 450, 460, 470, and 480 of examples of linked SS sets for PDCCH repetition, in accordance with the present disclosure.

In some examples, SS search sets may be configured for PDCCH repetition. In this case, two PDCCH candidates, in different SS sets, may be linked together for repetition of PDCCH communications including the same DCI. The two linked PDCCH candidates have the same AL (e.g., the same number of CCEs), and when a DCI payload is transmitted using one of the linked PDCCH candidates, the same DCI payload is transmitted using the other one of the linked PDCCH candidates. When PDCCH repetition is used, the UE may perform soft combining to decode the DCI from both of the linked PDCCH candidates, or the UE may attempt to individually decode the two linked PDCCH candidates. To perform soft combining of DCI transmitted in two linked PDCCH candidates, the UE may store the demodulator output (prior to decoding the demodulator output) for the DCI transmitted in the first PDCCH candidate, and then combine the stored demodulator output for the first DCI transmission with the demodulator output for the second DCI transmission (in the second PDCCH candidate) and decode the combined output of the first and second DCI transmissions. For example, in some cases, the UE may use log-likelihood ratio (LLR) soft combining to combine two transmissions of DCI. In this case, the UE may store a vector of LLR values for the demodulator output for the first DCI transmission (e.g., a respective value for each coded bit corresponding to the DCI) in a memory or buffer, and then the UE may combine the vector of LLR values for the first DCI transmission with a vector of LLR values for the second DCI transmission prior decoding the combined DCI transmissions. PDCCH repetition and soft combining may result in reduced errors in decoding DCI by the UE, and thus may increase network reliability and speed.

Figure 4A:
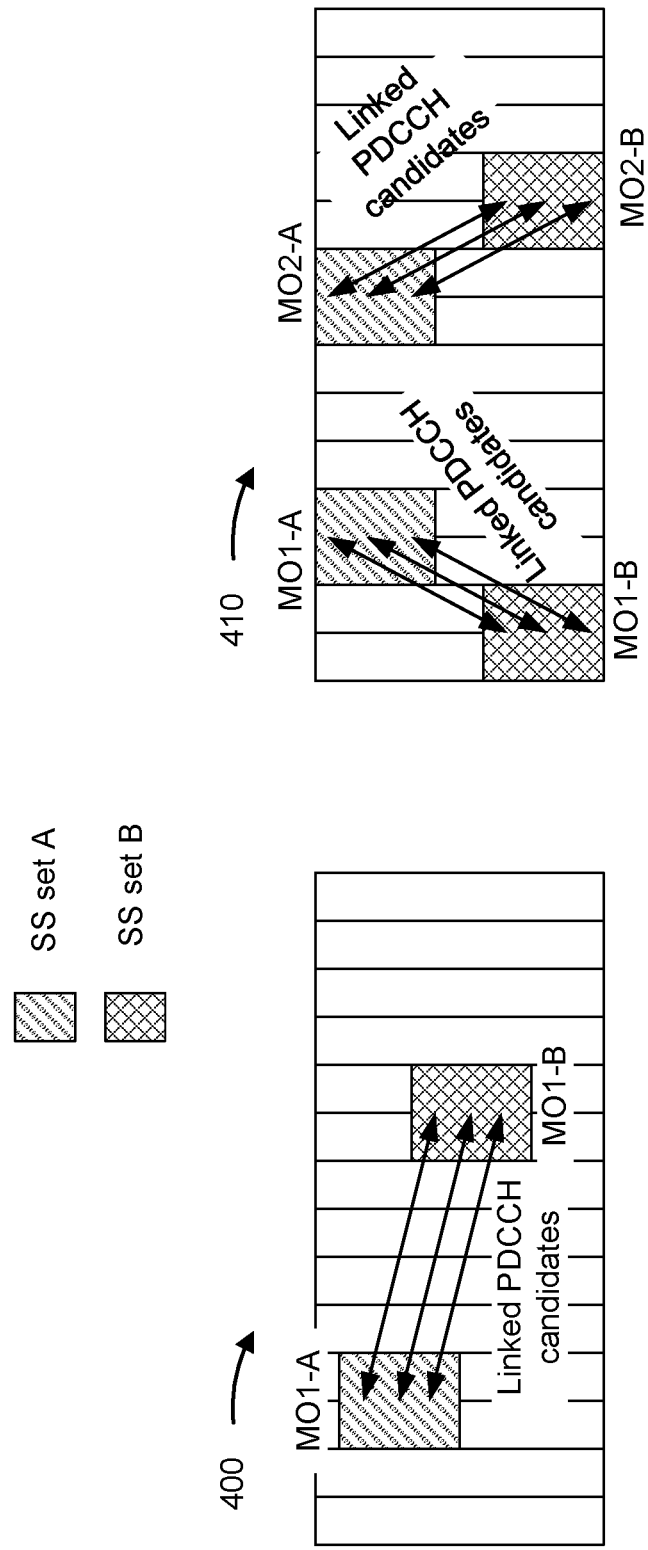
FIGS. 4A-4D are diagrams illustrating examples of linked search space (SS) sets for physical downlink control channel (PDCCH) repetition, in accordance with the present disclosure

As shown in FIG. 4A, example 400 shows an example of a linked pair of SS sets for PDCCH repetition. As shown in example 400, a first SS set (SS set A) and a second SS set (SS set B) may be linked to provide PDCCH repetition. Two SS sets (e.g., SS set A and SS set B) may be linked by RRC configurations. The monitoring occasions for the linked pair of SS sets (e.g., SS set A and SS set B) may be one-to-one mapped. The two linked SS sets may have the same periodicity and number of monitoring occasions within a slot. As shown in example 400, SS set A and SS set B each have one monitoring occasion in a slot, and the monitoring occasion for SS set A (MO1-A) is linked (e.g., one-to-one mapped) to the monitoring occasion for SS set B (MO1-B). The two linked SS sets (e.g., SS set A and SS set B) may be configured with the same number of PDCCH candidates for each AL, and PDCCH candidates with the same AL and the same candidate index in the two linked SS sets (e.g., SS set A and SS set B) are linked to each other. The linked PDCCH candidates in the linked monitoring occasions (e.g., MO1-A and MO1-B) may be used for PDCCH repetition. For example, in a case in which a base station transmits a PDCCH communication including a DCI in a PDCCH candidate of SS set A in MO1-A, the base station may repeat the PDCCH communication including the same DCI in the linked PDCCH candidate (e.g., with the same AL and same candidate index) in SS set B in MO1-B.

As further shown in FIG. 4A, example 410 shows an example in which the linked pair of SS sets (e.g., SS set A and SS set B) have multiple monitoring occasions in a slot. As shown in example 410, SS set A may have a first monitoring occasion (MO1-A) and a second monitoring occasion (MO2-A) in a slot, and SS set B may have a first monitoring occasion (MO1-B) and a second monitoring occasion (MO2-B) in the slot. For a pair of linked SS sets, the nth monitoring occasions of the linked SS sets may be linked to each other. For example, as shown in example 410, the first monitoring occasions (MO1-A and MO1-B) for the linked SS sets (SS set A and SS set B) may be linked, and the second monitoring occasions for the linked SS sets (SS set A and SS set B) may be linked. As shown in example 410, a PDCCH communication including a DCI transmitted in a PDCCH candidate in MO1-B may be repeated (with the same DCI) in the linked PDCCH candidate in MO1-A, and a PDCCH communication including a DCI transmitted in a PDCCH candidate in MO2-A may be repeated (with the same DCI) in the linked PDCCH candidate in MO2-B.

As described above, for a pair of linked SS sets, the two SS sets may have the same number of monitoring occasions within a slot, and an nth monitoring occasion of one SS set of the pair of linked SS sets is linked to an nth monitoring occasion of the other SS set of the pair of linked SS sets. However, different configurations of monitoring occasions for a pair of linked SS sets may result in more or less UE complexity (e.g., complexity of the operations performed by the UE) and/or consume more or less memory resources of the UE, especially when the UE performs soft combining for the linked PDCCH candidates in the monitoring occasions of the linked SS sets.

Figure 4B:
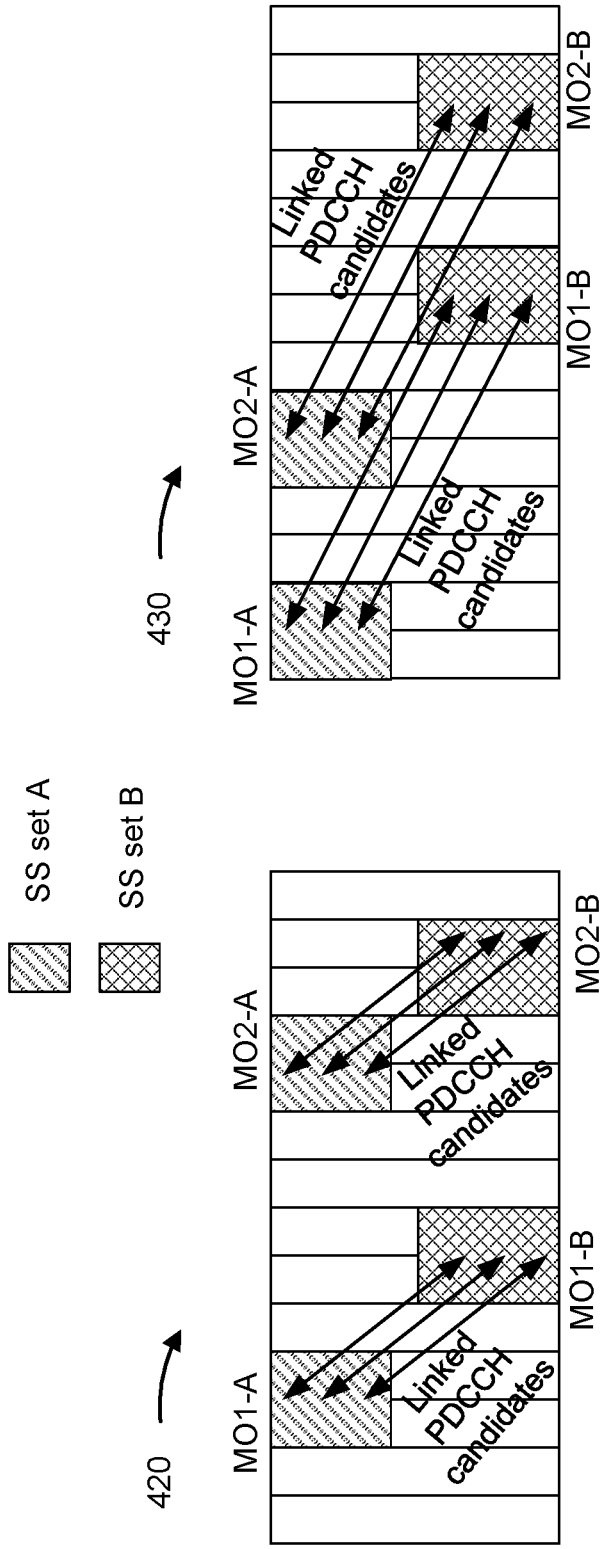

FIG. 4B shows examples 420 and 430 of linked SS sets that result in different UE complexity for PDCCH repetition. As shown in FIG. 4B, example 420 shows a case in which the first monitoring occasion (MO1-A) of the first SS set (SS set A) and the first monitoring occasion (MO1-B) of the second SS set (SS set B) both occur before the second monitoring occasion (MO2-A) of SS set A and the second monitoring occasion (MO2-B) of SS set B. In this case, the UE may be done with soft combining (e.g., LLR combining) of linked PDCCH candidates in MO1-A and MO1-B before the UE performs the soft combining of the linked PDCCH candidates in MO2-A and MO2-B. As further shown in FIG. 4B, example 430 shows a case in which the second monitoring occasion (MO2-A) of SS set A occurs prior to the first monitoring occasion (MO1-B) of SS set B. In other words, MO2-A, which is linked to MO2-B, is scheduled between the linked first monitoring occasions MO1-A and MO1-B. In this case, the UE needs to buffer the soft demodulator output (e.g., LLR values) of the linked PDCCH candidates in both MO1-A and MO2-A (e.g., both the first and second monitoring occasions in SS set A) before the UE can perform soft combining with the linked PDCCH candidates in MO1-B and MO2-B, respectively. As a result, the case shown in example 430 requires increased UE complexity and consumes increased UE memory resources, as compared to the case shown in example 420.

Figure 4C:
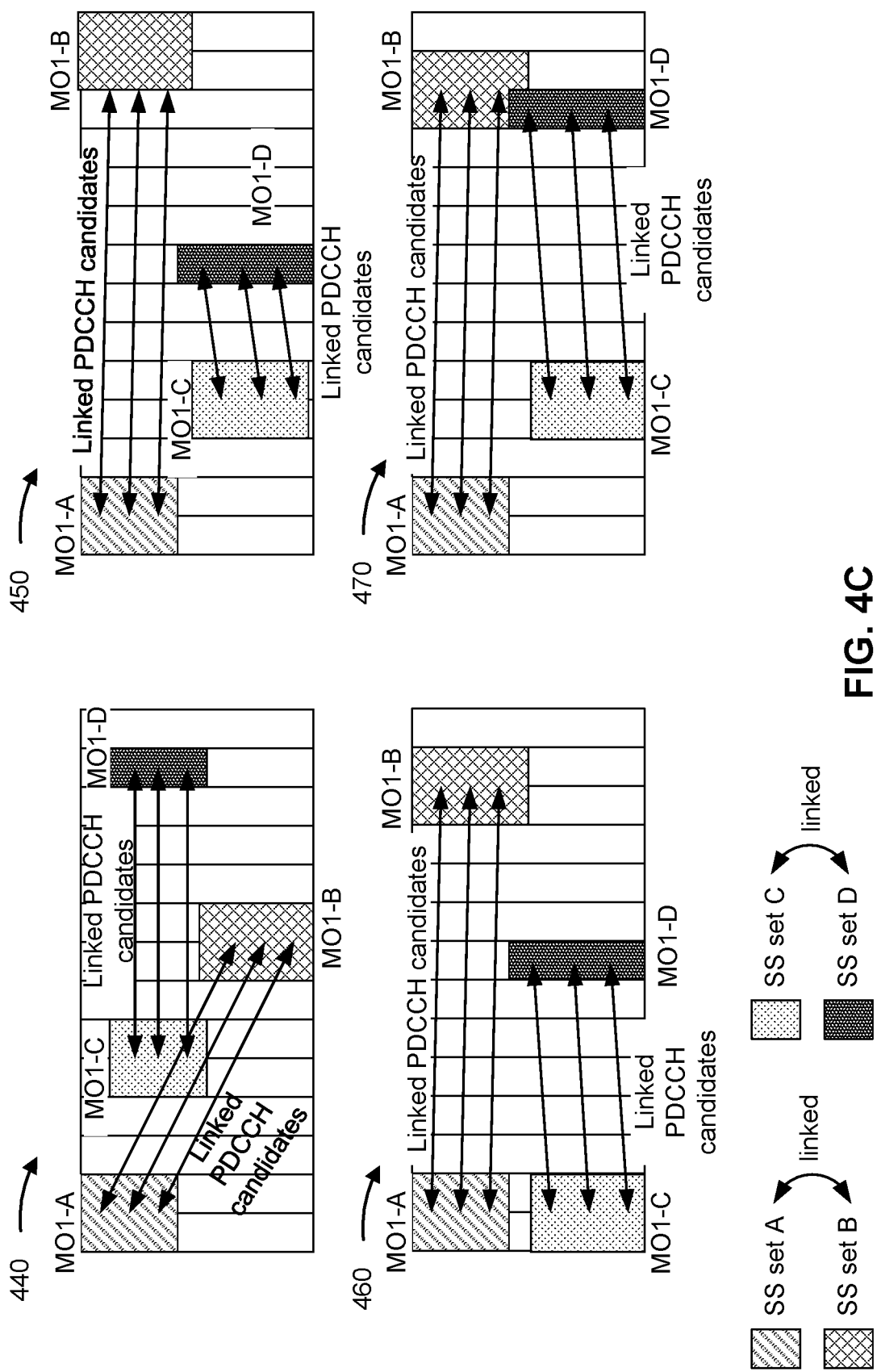
Figure 4D:
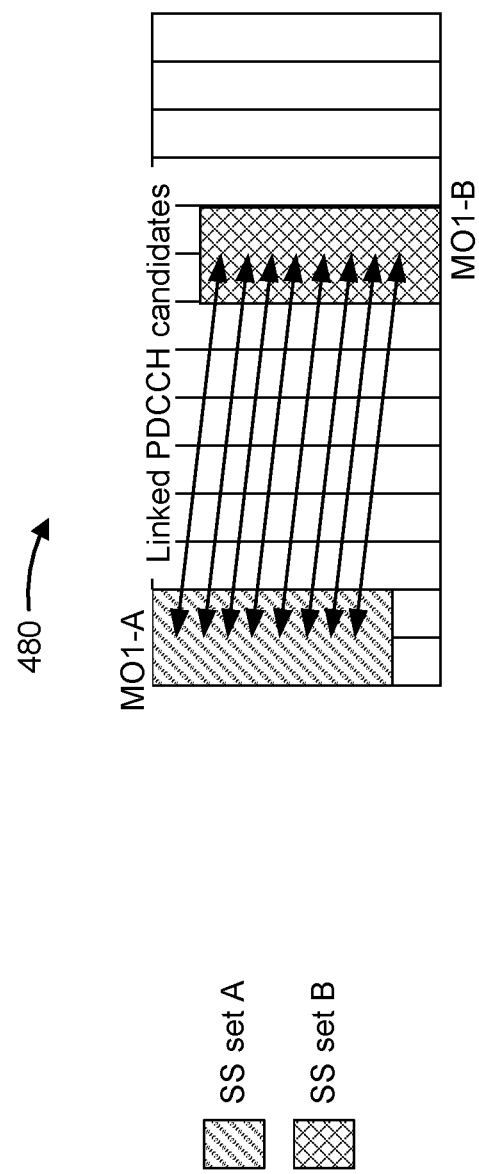

FIGS. 4C and 4D show examples 440, 450, 460, 470, and 480 of linked SS sets that may result in increased UE complexity and/or increased consumption of UE memory resources, as compared to the case shown in example 420 of FIG. 4B. As shown in FIG. 4C, examples 440, 450, 460, and 470 show examples in which a first SS set (SS set A) is linked to a second SS set (SS set B) and a third SS set (SS set C) is linked to a fourth SS set (SS set D). Examples 440, 450, 460, and 470 show that increased UE complexity and increased consumption of UE memory resources may occur when more than one pair of linked SS sets are scheduled in a slot, even when each SS set has one monitoring occasion in the slot. As shown in example 440, the first monitoring occasion (MO1-C) for SS set C (which is linked to the first monitoring occasion (MO1-D) for SS set D) is scheduled between the first monitoring occasion (MO1-A) for SS set A and the first monitoring occasion (MO1-B) for SS set B. As shown in example 450, the first monitoring occasion (MO1-C) for SS set C and the first monitoring occasion (MO1-D) for SS set D are scheduled between the first monitoring occasion (MO1-A) for SS set A and the first monitoring occasion (MO1-B) for SS set B. As shown in example 460, the first monitoring occasion (MO1-A) for SS set A and the first monitoring occasion (MO1-C) for SS set C are scheduled in the same symbols in the slot, and the first monitoring occasion (MO1-D) for SS set D is scheduled before the first monitoring occasion (MO1-B) for SS set B. As shown in example 470, the first monitoring occasion (MO1-C) for SS set C is scheduled between the first monitoring occasion (MO1-A) for SS set A and the first monitoring occasion (MO1-B) for SS set B, and the first monitoring occasion (MO1-D) for SS set D is scheduled to begin in a same symbol as MO1-B. In all of examples 440, 450, 460, and 470, the UE needs to buffer the soft demodulator output (e.g., LLR values) of the linked PDCCH candidates in both MO1-A and MO1-C before the UE can perform soft combining with the linked PDCCH candidates in MO1-B and MO1-D, respectively.

FIG. 4D shows an example 480 of a pair of linked SS sets (SS set A and SS set B) with a large number of linked PDCCH candidates. In this case, soft combining the linked PDCCH candidates in SS set A and SS set B may require increased UE complexity and consume a large amount of memory resources (e.g., as compared to a pair of linked SS sets with fewer linked PDCCH candidates) to buffer the soft demodulator outputs (e.g., LLR values) for the large number of linked PDCCH candidates.

As indicated above, FIGS. 4A-4D are provided as examples. Other examples may differ from what is described with respect to FIG. 4.

As described above in connection with FIGS. 4A-4D, in some cases, PDCCH repetition in linked SS sets may result in increased consumption of memory resources by a UE. In some cases, this increased consumption of memory resources may result in slower communications, decreased battery life, or otherwise reduced performance for the UE. In some cases, the soft combining of linked PDCCH candidates may require more memory resources than the UE has available, which may result in decoding failures of DCI transmitted in the linked PDCCH candidates. This may cause reduced reliability and increased latency for communications to and/or from the UE.

Some techniques and apparatuses described herein enable certain cases of PDCCH repetition to be disallowed or allowed based at least in part on UE capability. In some aspects, a UE may transmit, to a base station, an indication of a capability of the UE to support a linked monitoring occasion, in a first pair of linked monitoring occasions for monitoring linked PDCCH candidates, scheduled between two other linked monitoring occasions in a second pair of linked monitoring occasions for monitoring linked PDCCH candidates. The base station may transmit, to the UE, a configuration of a plurality of SS sets for monitoring PDCCH candidates that is based at least in part on the indication of the capability of the UE. As a result, based at least in part on the UE capability, the base station may refrain from configuring a pair of linked SS sets in which the nth monitoring occasion for one SS set is before the (n−1)th monitoring occasion for the other SS set (e.g., as in example 430 of FIG. 4B), and/or the base station may refrain from configuring multiple pairs of linked SS sets in which a monitoring occasion of an SS set in one pair of linked SS sets is between monitoring occasions for SS sets in another pair of linked SS sets (e.g., as in examples 440, 450, 460, and 470 of FIG. 4C), unless the UE indicates that the UE is capable of supporting such configurations. This may result in reduced consumption of memory resources by the UE and/or increased reliability and decreased latency (e.g., due to decreased DCI decoding errors) for communications to and/or from the UE.

In some cases, a binary UE capability indication of support or no support may be sufficient for handling cases of increased UE complexity and/or memory consumption, such as the cases shown in examples 430, 440, 450, 460, and 470, if a number of linked PDCCH candidates is not too large for the memory resources of the UE. However, in some cases, the binary UE capability indication of support or no support may not be flexible enough to cover all cases in which the UE complexity and/or consumption of memory resources associated with PDCCH repetition in linked SS sets may cause reduced performance for the UE. For example, in some cases, the base station may have difficulty ensuring that an SS set from one linked SS set pair does not occur between SS sets from another linked SS set pair because the configuration restrictions (e.g., same periodicity and/or same number of monitoring occasions in a slot, among other examples) are only among two linked SS sets (and not among multiple pairs of linked SS sets). Furthermore, the binary UE capability indication of support or no support may not prevent the base station from configuring a pair of linked SS sets with a number of linked PDCCH candidates that is too large for the memory resources of the UE.

Some techniques and apparatuses described herein enable a UE to transmit, to a base station, an indication of a PPU limit associated with the UE. A PPU is a metric that represents the memory resources and/or complexity required for a pair of linked PDCCH candidates. The base station may transmit, to the UE, configurations for a plurality of SS sets including one or more linked pairs of SS sets with linked PDCCH candidates for PDCCH repetition. The UE may selectively monitor the linked PDCCH candidates in the one or more linked pairs of SS sets based at least in part on a comparison of a total number of PPUs occupied by the linked PDCCH candidates in all of the one or more linked pairs of search space sets and the PPU limit associated with the UE. As a result, the UE may refrain from monitoring linked PDCCH candidates for PDCCH repetition in any case in which the PPUs exceed the PPU limit associated with the UE. This may result in reduced consumption of memory resources by the UE and/or increased reliability and decreased latency (e.g., due to decreased DCI decoding errors) for communications to and/or from the UE.

Figure 5:
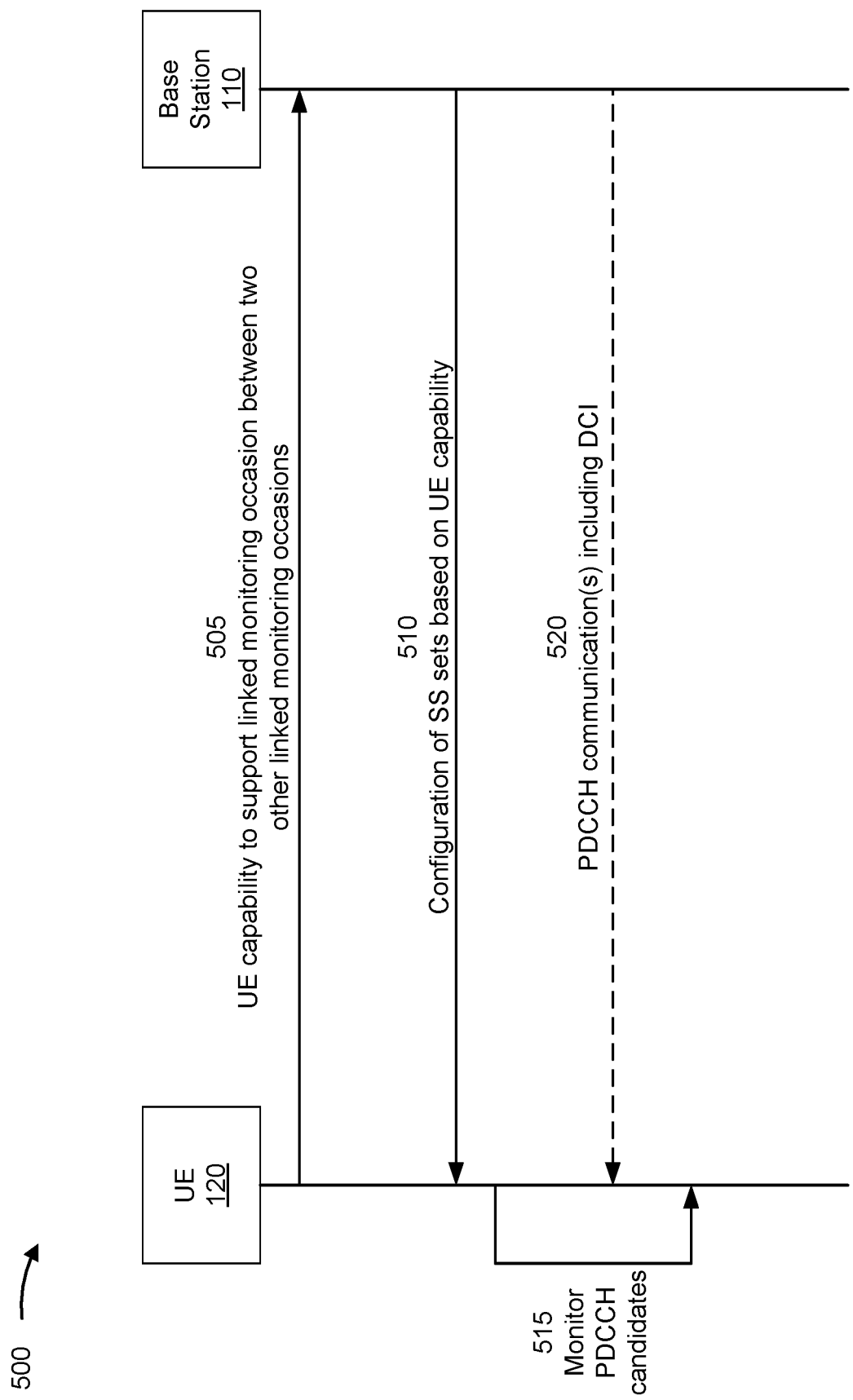
FIGS. 5-8 and 9A-9B are diagrams illustrating examples associated with complexity handling for PDCCH repetition, in accordance with the present disclosure.

FIG. 5 is a diagram illustrating an example 500 associated with complexity handling for PDCCH repetition, in accordance with the present disclosure. As shown in FIG. 5, example 500 includes communication between a base station 110 and a UE 120. In some aspects, the base station 110 and the UE 120 may be included in a wireless network, such as wireless network 100 (e.g., shown in FIG. 1). The base station 110 and the UE 120 may communicate via a wireless access link, which may include an uplink and a downlink.

As shown in FIG. 5, and by reference number 505, the UE 120 may transmit, to the base station 110, a UE capability report that includes an indication of a capability of the UE 120 to support a linked monitoring occasion scheduled between two other linked monitoring occasions. For example, the indication may indicate whether the UE 120 is capable of supporting a linked monitoring occasion, in a first pair of linked monitoring occasions for monitoring PDCCH candidates, being scheduled between two other linked monitoring occasions in a second pair of linked monitoring occasions. In some aspects, the UE 120 may transmit the indication of the UE 120 capability to the base station 110 via an RRC message.

In some aspects, the indication of support or no support may apply to the capability of the UE 120 to support an nth monitoring occasion of a first SS set of a linked pair of SS sets being scheduled before an (n−1)th monitoring occasion of a second SS set of the linked pair of SS sets (e.g., the nth monitoring occasion of the first SS set being scheduled between the (n−1)th monitoring occasions of the first and second SS sets) and/or the capability of the UE 120 to support a monitoring occasion of an SS set in a first linked pair of SS sets being scheduled between monitoring occasions of the SS sets in a second pair of SS sets. In some aspects, UE capability report may include separate UE capability indications for the capability of the UE 120 to support an nth monitoring occasion of a first SS set of a linked pair of SS sets being scheduled before an (n−1)th monitoring occasion of a second SS set of the linked pair of SS sets and for the capability of the UE 120 to support a monitoring occasion of an SS set in a first linked pair of SS sets being scheduled between monitoring occasions of the SS sets in a second pair of SS sets. For example, in some aspects, the UE capability report may include a first indication that indicates the capability of the UE 120 to support an nth monitoring occasion of a first SS set of a linked pair of SS sets being scheduled before an (n−1)th monitoring occasion of a second SS set of the linked pair of SS sets. Additionally, or alternatively, the UE capability report may include a second indication that indicates the capability of the UE 120 to support a monitoring occasion of an SS set in a first linked pair of SS sets being scheduled between monitoring occasions of the SS sets in a second pair of SS sets.

As further shown in FIG. 5, and by reference number 510, the base station 110 may transmit, to the UE 120, a configuration of SS sets for monitoring PDCCH candidates based at least in part on the UE capability indicated in the UE capability report. In some aspects, the base station 110 may receive the indication of the capability of the UE 120 to support a linked monitoring occasion between two other linked monitoring occasions, and the base station 110 may determine the configuration (or configurations) of the SS sets for the UE 120 based at least in part on the UE capability indication received from the UE 120. For example, the base station 110 may determine the configuration of the SS sets for the UE 120 based at least in part on whether the UE 120 is capable of supporting a linked monitoring occasion scheduled between two other linked monitoring occasions.

In a case in which the UE 120 indicates that the UE 120 is capable of supporting a linked monitoring occasion scheduled between other linked monitoring occasions, the base station 110 may determine a configuration of the SS sets that includes one or more linked pairs of SS sets with a linked monitoring occasion for an SS set of a first linked pair of SS sets scheduled between other linked monitoring occasions (e.g., for the first linked pair of SS sets or for a second linked pair of SS sets).

In some aspects, in a case in which the UE 120 indicates that the UE 120 is not capable of supporting a linked monitoring occasion scheduled between other linked monitoring occasions, the base station 110 may determine a configuration that ensures that, for a linked pair of SS sets including a first SS set and a second SS set, an nth monitoring occasion of the first SS set is not scheduled before an (n−1)th monitoring occasion of the second SS set. For example, in this case, the base station 110 may not link a first SS set and a second SS set if an nth monitoring occasion of the first SS set is before an (n−1)th monitoring occasion of a second SS set. In some aspects, in a case in which the UE 120 indicates that the UE 120 is not capable of supporting a linked monitoring occasion scheduled between other linked monitoring occasions, the base station 110 may determine a configuration that ensures, for any two pairs of linked SS sets, a monitoring occasion of any of the SS sets is not scheduled between two monitoring occasions of another two SS sets that are linked. For example, in this case, the base station 110 may determine a configuration that ensures that a monitoring occasion of an SS set in a first pair of linked SS sets is not scheduled between monitoring occasions of SS sets in a second pair of linked SS sets.

In some aspects, the base station 110 may receive from the UE 120 separate indications (e.g., a first indication and a second indication) for the capability of the UE 120 to support an nth monitoring occasion of a first SS set of a linked pair of SS sets being scheduled before an (n−1)th monitoring occasion of a second SS set of the linked pair of SS sets and for the capability of the UE 120 to support a monitoring occasion of an SS set in a first linked pair of SS sets being scheduled between monitoring occasions of the SS sets in a second pair of SS sets. In this case, the base station 110 may determine the configuration for one or more pairs of linked SS sets based at least in part on the separate indications.

In some aspects, the base station 110 may transmit the configuration of the SS sets to the UE 120 in one or more RRC messages. In some aspects, the configuration of the SS sets may include SS set configuration information that configures each SS set and linking configuration information that configures the linking between the one or more linked pairs of SS sets.

As further shown in FIG. 5, and by reference number 515, the UE 120 may monitor for PDCCH candidates based at least in part on the configuration of SS sets. In some aspects, the UE 120 may receive the configuration of SS sets from the base station 110, and the UE 120 may monitor the PDCCH candidates in the monitoring occasions of the SS sets configured in the configuration. In some aspects, the UE 120 may monitor linked PDCCH candidates in linked monitoring occasions for one or more pairs of linked SS sets for PDCCH repetition. In this case, the UE 120 may perform soft combining of the linked PDCCH candidates in the linked monitoring occasions for each linked pair of SS sets. For unlinked PDCCH candidates (e.g., PDCCH candidates that are not linked to other PDCCH candidates of another SS set), the UE 120 may monitor the PDCCH candidates and attempt to decode DCI transmitted in the PDCCH candidates.

As further shown in FIG. 5, and by reference number 520, the base station 110 may transmit, to the UE 120, one or more PDCCH communications including DCI in one or more PDCCH candidates. In some aspects, the base station 110 may transmit repeated PDCCH transmissions including the same DCI in a pair of linked PDCCH candidates in linked monitoring occasions of a linked pair of SS sets. For example, the base station 110 may transmit a PDCCH communication including DCI in a first PDCCH candidate in a monitoring occasion of a first SS set of a linked pair of SS sets, and the base station 110 may repeat the transmission of the same PDCCH communication including the same DCI in a second PDCCH candidate, that is linked to the first PDCCH candidate (e.g., has the same AL and same candidate index), in a monitoring occasion of a second SS set of the linked pair of SS sets. The UE 120 may monitor each pair of linked PDCCH candidates for PDCCH repetition. For example, the UE 120 may perform soft combining (e.g., LLR combining) of a pair of linked PDCCH candidates to decode the DCI based at least in part on a combination of the repeated PDCCH transmissions in the pair of linked PDCCH candidates. In some aspects, the base station 110 may transmit one or more PDCCH communications without PDCCH repetition in one or more unlinked PDCCH candidates (e.g., in one or more unlinked SS sets).

In some aspects, the DCI transmitted by the base station 110 and decoded by the UE 120 may schedule one or more downlink communications (e.g., PDSCH communications) from the base station 110 to the UE 120 and/or one or more uplink communications (e.g., physical uplink shared channel (PUSCH) communications) from the UE 120 to the base station 110. In this case, the base station 110 may transmit, and the UE 120 may receive, one or more downlink communications scheduled by the DCI, and/or the UE 120 may transmit, and the base station 110 may receive, one or more uplink communications scheduled by the DCI.

As described above, the UE 120 may transmit, to the base station 110, an indication of a capability of the UE 120 to support a linked monitoring occasion, in a first pair of linked monitoring occasions, scheduled between two other linked monitoring occasions in a second pair of linked monitoring occasions. The base station 110 may transmit, to the UE 120, a configuration of one or more SS sets for monitoring PDCCH candidates that is based at least in part on the indication of the capability of the UE 120. As a result, based at least in part on the UE capability, the base station 110 may refrain from configuring a pair of linked SS sets in which the nth monitoring occasion for one SS set is before the (n−1)th monitoring occasion for the other SS set and/or the base station may refrain from configuring multiple pairs of linked SS sets in which monitoring occasion of an SS set in one pair of linked SS sets is between monitoring occasions for the SS sets in another pair of linked SS sets, unless the UE 120 indicates that the UE 120 is capable of supporting such configurations. This may result in reduced consumption of memory resources by the UE 120 and/or increased reliability and decreased latency (e.g., due to decreased DCI decoding errors) for communications to and/or from the UE 120.

As indicated above, FIG. 5 is provided as an example. Other examples may differ from what is described with respect to FIG. 5.

Figure 6:
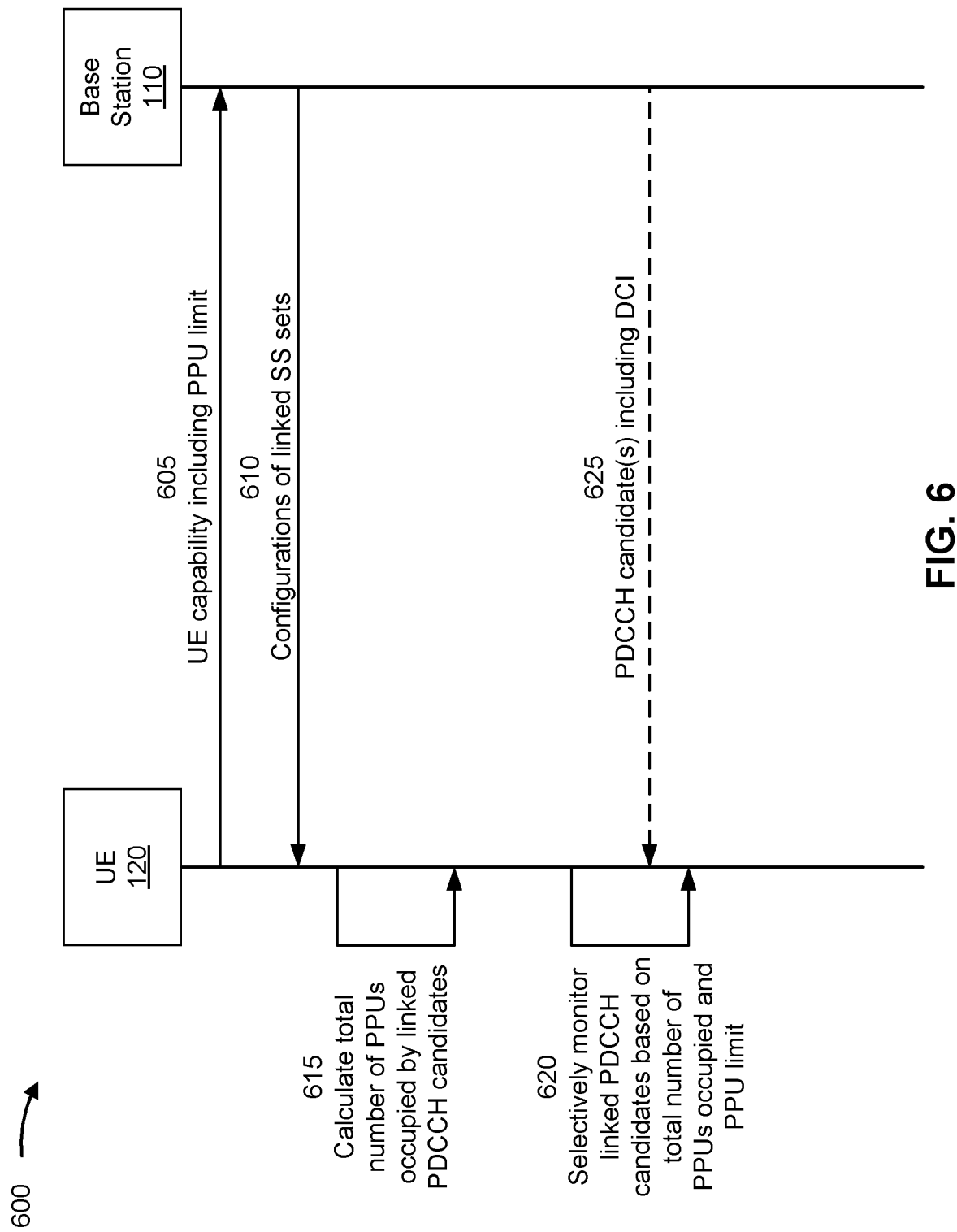

FIG. 6 is a diagram illustrating an example 600 associated with complexity handling for PDCCH repetition, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 6, and by reference number 605, the UE 120 may transmit, to the base station 110, a UE capability report including an indication of a PPU limit associated with the UE 120. A PPU is a metric that represents the memory resources and/or complexity required for a pair of linked PDCCH candidates. For example, a PPU may represent the memory resources and/or complexity required for soft combining a pair of linked PDCCH candidates.

In some aspects, any pair of linked PDCCH candidates (e.g., any two PDCCH candidates linked to each other) occupies a number of PPUs for a duration associated with the pair of linked PDCCH candidates. A pair of linked PDCCH candidates may include a first PDCCH candidate in a first SS set of a linked pair of SS sets and a second PDCCH candidate, linked to the first PDCCH candidate (e.g., having the same AL and the same candidate index), in a second SS set of the linked pair of SS sets. In some aspects, the number of PPUs occupied by a pair of linked PDCCH candidates (e.g., the number of occupied PPUs for the pair of linked PDCCH candidates) may be based at least in part on the AL associated with the pair of linked PDCCH candidates. For example, an AL-dependent factor may be applied to determine the number of PPUs occupied by the pair of linked PDCCH candidates. In some aspects, the number of PPUs occupied by a pair of linked PDCCH candidates may be equal to the AL (e.g., 1, 2, 4, 8, or 16) associated with the pair of linked PDCCH candidates. In some aspects, the number of PPUs occupied by a pair of linked PDCCH candidates may be equal to, or based at least in part on, a mother code length (e.g., circular buffer size) for the AL associated with the pair of linked PDCCH candidates. For example, the mother code length (e.g., circular buffer size) for AL=1, 2, 4, 8, and 16 may be equal to 128, 256, 512, 512, and 512, respectively. Accordingly, in a case in which the number of PPUs occupied by a pair of linked PDCCH candidates is based at least in part on (or equal to) the mother code length for the AL level, the number of occupied PPUs for a pair of linked PDCCH candidates with AL=4 (e.g., mother code length=512) may be larger than the number of occupied PPUs for a pair of linked PDCCH candidates with AL=2 (e.g., mother code length=256), but the number of occupied PPUs may be the same for the pair of linked PDCCH candidates with AL=4 and for a pair of linked PDCCH candidates with AL=16 because the mother code length (e.g., 512) is the same for AL=4 and for AL=16.

In some aspects, for a pair of linked PDCCH candidates including a first PDCCH candidate and a second PDCCH candidate, the duration (e.g., occupation duration) associated with the pair of PDCCH candidates may be based at least in part on one or more symbols associated with the first PDCCH candidate and one or more symbols associated with the second PDCCH candidate. In some aspects, the duration for the pair of PDCCH candidates may run from a start of a first symbol associated with the first PDCCH candidate (e.g., the earlier PDCCH candidate in time) until an end of a last symbol associated with the second PDCCH candidate (e.g., the later PDCCH candidate in time). In some aspects, the duration for the pair of PDCCH candidates may run from an end of a last symbol associated with the first PDCCH candidate (e.g., the earlier PDCCH candidate in time) until the end of the last symbol associated with the second PDCCH candidate (e.g., the later PDCCH candidate in time). In some aspects, the duration for the pair of PDCCH candidates may run from a start of the first symbol associated with the first PDCCH candidate (e.g., the earlier PDCCH candidate in time) until a start of a first symbol associated with the second PDCCH candidate (e.g., the later PDCCH candidate in time). In some aspects, the duration for the pair of PDCCH candidates may run from the end of the last symbol associated with the first PDCCH candidate (e.g., the earlier PDCCH candidate in time) until the start of the first symbol associated with the second PDCCH candidate (e.g., the later PDCCH candidate in time).

At a given time (time t), the total number of occupied PPUs may be based on the occupied PPUs across all pairs of linked PDCCH candidates (e.g., across all linked monitoring occasions of all linked SS sets) with an associated occupation duration that includes time t. For example, for each pair of linked PDCCH candidates (e.g., across all linked monitoring occasions of all linked SS sets), the number of PPUs occupied by a pair of linked PDCCH candidates may be included in the total number of PPUs occupied at time t if the duration associated with that pair of linked PDCCH candidates includes time t.

The UE 120 may transmit, to the base station 110, the indication of the PPU limit associated with the UE 120. In some aspects, the indication of the PPU limit may be an indication of a capability of the UE 120 that indicates a maximum number of PPUs that the UE 120 is capable of supporting. In some aspects, the PPU limit may be a PPU limit set at a number of PPUs other than the maximum number of PPUs that the UE 120 is capable of handling. In some aspects, the indication of the PPU limit may include an indication of a respective PPU limit (e.g., a maximum number of PPUs) per CC. For example, the indication may include respective PPU limits for one or more CCs. As another example, the indication of a PPU limit may be separately applied per CC (e.g., the indication may include one PPU limit, which is applied on a per-CC basis). Additionally, or alternatively, the indication of the PPU limit may include an indication of a PPU limit (e.g., a maximum number of PPUs) across all CCs. For example, in this case, the PPU limit may be for a total number of PPUs across one or more CCs. In some aspects, the indication of the PPU limit may include the indication of respective PPU limits for one or more CCs, and the UE 120 and the base station 110 may each derive a total PPU limit across all of the CCs based at least in part on the respective PPU limits for the CCs. For example, the respective PPU limits for the CCs may include a PPU limit (e.g., a maximum number of PPUs) per CC, and the total PPU limit (e.g., maximum number of PPUs) across all of the CCs may be derived by multiplying the PPU limit per CC by a factor. In some aspects, the factor may be equal to a UE capability for blind detection (e.g., pdcch-BlinddetectionCA), which may also be used to determine a maximum number of blind decodes (e.g., maximum number of monitored candidates) across all of the CCs.

In some aspects, the UE 120 may separately indicate PPU limits for different subcarrier spacings (SCSs). For example, the indication of the PPU limit may include a respective PPU limit (e.g., maximum number of PPUs) for each of one or more SCSs (e.g., 15 kHz, 30 kHz, 60 kHz, 120 kHz, 240 kHz, 480 kHz, and/or 960 kHz, among other examples). In some aspects, the UE 120 may transmit the indication of the PPU limit to the base station 110 in a UE capability report (e.g., via an RRC message or a medium access control (MAC) control element (MAC-CE)).

As further shown in FIG. 6, and by reference number 610, the base station 110 may transmit, to the UE 120, configurations of linked SS sets. In some aspects, the base station 110 may transmit, and the UE 120 may receive, configurations for a plurality of SS sets for PDCCH candidates, and the plurality of SS sets may include one or more linked pairs of SS sets. The one or more linked pairs of SS sets may include linked PDCCH candidates (e.g., in linked monitoring occasions) for PDCCH repetition. In some aspects, the base station 110 may transmit the configurations for the SS sets (including the linked SS sets) to the UE 120 in one or more RRC messages. In some aspects, the configurations for the linked pairs of SS sets may include SS set configurations for the SS sets and linking configurations that configured the linking between the linked pairs of SS sets.

In some aspects, the base station 110 may determine the configurations of the linked pairs of SS sets based at least in part on the indication of the PPU limit associated with the UE 120 received from the UE 120. In some aspects, the UE 120 may not expect that a total number of PPUs occupied by all of the linked PDCCH candidates at any time does not satisfy (e.g., exceeds) the PPU limit associated with the UE 120. In this case, the total number of PPUs occupied by all of the linked PDCCH candidates (e.g., across all of the configured linked pairs of SS sets) may be required to satisfy (e.g., be less than or equal to) the PPU limit associated with the UE 120. For example, based at least in part on the indication of the PPU limit associated with the UE 120, the base station 110 may determine the configurations for the linked pairs of SS sets, and the base station 110 may ensure (e.g., may be required to ensure) that the configurations for the linked pairs of SS sets (e.g., the SS set configurations and/or the linking configurations) result in the PPU limit associated with the UE 120 being satisfied for the UE 120 at all times. In some aspects, in a case in which a per CC PPU limit is indicated by the UE 120, the base station 110 may determine the configurations for the linked pairs of SS sets to ensure that the per CC PPU limit is satisfied at all times for each CC. In some aspects, in a case in which a total PPU limit across all CCs is indicated by the UE 120 (or derived based at least in part on the per CC PPU limit), the base station 110 may determine the configurations for the linked pairs of SS sets to ensure that the total PPU limit across all CCs is satisfied at all times for the UE 120.

In some aspects, the UE 120 may dynamically select which linked PDCCH candidates to monitor for PDCCH communication in a case in which the total number of PPUs occupied by all of the linked PDCCH candidates (e.g., across all of the configured linked pairs of SS sets) at a given time does not satisfy (e.g., exceeds) the PPU limit associated with the UE 120. In this case, the base station 110 may determine configurations for the linked pairs of SS sets that result in times at which the total number of PPUs occupied by all of the linked PDCCH candidates does not satisfy the PPU limit.

As further shown in FIG. 6, and by reference number 615, the UE 120 may calculate the total number of PPUs occupied by all of the linked PDCCH candidates (e.g., across all of the configured linked pairs of SS sets) at one or more time points associated with monitoring one or more of linked PDCCH candidates. For example, the UE 120 may calculate the total number of PPUs occupied by all of the linked PDCCH candidates (e.g., across all of the configured linked pairs of SS sets) at one or more time points associated with a linked pair of monitoring occasions that include one or more pairs of linked PDCCH candidates. The UE 120 may calculate the total number of PPUs occupied by all of the linked PDCCH candidates (e.g., across all of the configured linked pairs of SS sets), at a time point t, by calculating the total number of PPUs occupied by each pair of linked PDCCH candidates with an associated duration that includes the time point t. For example, at the time point t, for each pair of linked PDCCH candidates across all of the linked pairs of SS sets, the UE 120 may add the number of occupied PPUs for that pair of linked PDCCH candidates to the total number of PPUs occupied if the duration associated with that pair of linked PDCCH candidates includes the time point t.

In some aspects, in a case in which a per CC PPU limit is indicated by the UE 120, the UE 120 may calculate the total number of PPUs occupied per CC at one or more time points. In some aspects, in a case in which a total PPU limit across all CCs is indicated by the UE 120 (or derived based at least in part on the per CC PPU limit), the UE 120 may calculate the total number of PPUs occupied across all of the CCs. In some aspects, the UE 120 may calculate the total number of PPUs occupied by all of the linked PDCCH candidates at multiple time points over a duration associated with one or more PDCCH candidates.

As further shown in FIG. 6, and by reference number 620, the UE 120 may selectively monitor linked PDCCH candidates in linked monitoring occasions of the linked SS sets based at least in part on the total number of PPUs occupied at one or more time points and the PPU limit associated with the UE 120. In some aspects, the UE 120 may compare the total number of PPUs occupied by all of the linked PDCCH candidates (e.g., across all of the configured linked pairs of SS sets) at one or more time points with the PPU limit associated with the UE 120. For example, at each time point, the UE 120 may compare the total number of PPUs occupied per CC with the per CC PPU limit associated with the UE 120, and/or the UE 120 may compare the total number of PPUs occupied with a total PPU limit across all CCs for the UE 120. In some aspects, the UE 120 may selectively monitor one or more linked PDCCH candidates at the one or more time points based at least in part on the comparison between the total PPUs occupied by all the linked PDCCH candidates at the one or more time points and the PPU limit associated with the UE 120. For example, the UE 120 may selectively monitor the one or more linked PDCCH candidates based at least in part on a determination of whether the total PPUs occupied by all the linked PDCCH candidates at the one or more time points satisfies (e.g., is less than or equal to) the PPU limit associated with the UE 120.

In some aspects, in connection with a determination that the total number of PPUs occupied at one or more time points satisfies (e.g., is less than or equal to) the PPU limit associated with the UE 120 (e.g., on a per-CC basis and/or across all CCs), the UE 120 may monitor all of the linked PDCCH candidates at the one or more time points for PDCCH repetition. For example, the one or more time points may be a set of time points over a duration associated with one or more pairs of linked PDCCH candidates. In this case, the UE 120 may monitor the one or more pairs of linked PDCCH candidates (and any other linked PDCCH candidates scheduled during that duration). For example, the UE 120 may buffer the soft demodulator outputs (e.g., LLR values) for first linked PDCCH candidates (of the one or more pairs of PDCCH candidates) in a first monitoring occasion and soft combine the first linked PDCCH candidates with second linked PDCCH candidates (of the one or more pairs of PDCCH candidates) in a second monitoring occasion (that is linked to the first monitoring occasion).

In some aspects, the UE 120 may not expect that a total number of PPUs occupied by all of the linked PDCCH candidates at any time does not satisfy (e.g., exceeds) the PPU limit associated with the UE 120. In this case, the total number of PPUs occupied by all of the linked PDCCH candidates (e.g., across all of the configured linked pairs of SS sets) may be required to satisfy (e.g., be less than or equal to) the PPU limit associated with the UE 120. As described above, in this case, the base station 110 may be required to ensure that the configurations for the linked pairs of SS sets result in the PPU limit associated with the UE 120 being satisfied for the UE 120 at all times. In this case, the UE 120 may monitor the linked PDCCH candidates (e.g., in the linked pairs of monitoring occasions or the linked pairs of SS sets) for PDCCH repetition based at least in part on the configurations received from the base station 110. In some aspects, the UE 120 may determine that an error case has occurred in connection with a determination, by the UE 120, that the total number of PPUs occupied at a time point does not satisfy the PPU limit associated with the UE 120.

In some aspects, in connection with a determination that the total number of PPUs occupied at a time point does not satisfy the PPU limit associated with the UE 120, the UE 120 may drop (e.g., refrain from monitoring) one or more PDCCH candidates from the linked PDCCH candidates. For example, the UE 120 may determine the total number PPUs occupied does not satisfy the PPU limit associated with the UE 120 for one or more symbols during a duration associated with one or more pairs of linked PDCCH candidates. In this case, the UE 120 may drop (e.g., refrain from monitoring) one or more of the linked PDCCH candidates in the one or more pairs of linked PDCCH candidates or one or more other PDCCH candidates (e.g., in other pairs of linked PDCCH candidates) with durations that overlap the duration of the one or more pairs of linked PDCCH candidates. In some aspects, the UE 120 may select one or more linked PDCCH candidates to drop in order for the total number of PPUs to satisfy the PPU limit associated with the UE 120. In some aspects, the UE 120 may refrain from monitoring the dropped linked PDCCH candidates, and in case in which the UE 120 has buffered soft demodulator outputs (e.g., LLR values) for any of the dropped linked PDCCH candidates, the UE 120 may drop, from a memory of the UE 120, the soft demodulator outputs (e.g., LLR values) for the dropped linked PDCCH candidates.

In some aspects, the UE 120 may determine a priority order for the linked PDCCH candidates that occupy PPUs at the time at which the total number of PPUs does not satisfy the PPU limit associated with the UE 120, and the UE 120 may select the PDCCH candidates to drop based at least in part on the priority order. In some aspects, in a case in which the PPU limit is across all of the CCs, the UE 120 may determine the priority for the linked PDCCH candidates based at least in part (e.g., as a function of) on the CC index. For example, linked PDCCH candidates on different CCs may be associated with different priorities. In this case, the UE 120 may drop (e.g., refrain from monitoring) one or more linked PDCCH candidates based at least in part on the priority associated with the CC for one or more linked PDCCH candidates. For example, the UE 120 may drop (e.g., refrain from monitoring) one or more pairs of linked PDCCH candidates on a lowest priority CC.

In some aspects, the UE 120 may determine the priority order for selecting the linked PDCCH candidates to drop based at least in part on SS set indexes associated with linked pairs of SS sets associated with the linked PDCCH candidates. For example, the SS set index associated with a linked pair of SS sets may be a smaller SS set index among the SS indexes associated with the two linked SS sets. In some aspects, each SS set index may be associated with a respective priority. In some aspects, SS sets of different SS types (e.g., CSS or USS) may be associated with different priorities. In some aspects, the UE 120 may drop linked PDCCH candidates at the SS set level. For example, the UE 120 may drop (e.g., refrain from monitoring) the linked PDCCH candidates in a linked pair of SS sets based at least in part on a priority associated with the linked pair of SS sets (e.g., a priority associated with the SS set index associated with the linked pair of SS sets or a priority associated with an SS type associated with the linked pair of SS sets).

In some aspects, the UE 120 may determine the priority order for selecting the linked PDCCH candidates to drop based at least in part on monitoring occasion indexes, within a slot, for monitoring occasions of a pair of linked SS sets. For example, different monitoring occasion indexes may be associated with different priorities. In some aspects, the UE 120 may drop linked PDCCH candidates at the monitoring occasion level. For example, the UE 120 may drop (e.g., refrain from monitoring) the linked PDCCH candidates in a linked pair of monitoring occasions of a linked pair of SS sets based at least in part on a priority associated with a monitoring occasion index for the linked pair of monitoring occasions.

In some aspects, the UE 120 may determine the priority order for selecting the linked PDCCH candidates to drop based at least in part on the candidate indexes or the ALs for the linked PDCCH candidates. In some aspects, different priorities may be associated with different pairs of linked PDCCH candidates based at least in part on the candidate indexes associated with the pairs of linked PDCCH candidates. In some aspects, different priorities may be associated with different pairs of linked PDCCH candidates based at least in part on the ALs associated with the pairs of linked PDCCH candidates. In some aspects, the UE 120 may drop (e.g., refrain from monitoring) one or more pairs of linked PDCCH candidates based at least in part on the priority associated with the one or more pairs of linked PDCCH candidates (e.g., the priority associated with the candidate index or the priority associated with the AL). For example, the UE 120 may select one or more lowest priority pairs of linked PDCCH candidate to drop.

In some aspects, in connection with a determination that the total number of PPUs occupied at a time point does not satisfy the PPU limit associated with the UE 120, the UE 120 may select one or more of the linked PDCCH candidates to be unlinked. In this case, the UE 120 may monitor the selected linked PDCCH candidates as unlinked PDCCH candidates (e.g., the UE 120 may independently monitor the PDCCH candidates without soft combining). For example, the UE 120 may determine the total number PPUs occupied does not satisfy the PPU limit associated with the UE 120 for one or more symbols during a duration associated with one or more pairs of linked PDCCH candidates. In this case, the UE 120 may monitor one or more of the linked PDCCH candidates in the one or more pairs of linked PDCCH candidates or one or more other PDCCH candidates (e.g., in other pairs of linked PDCCH candidates) with durations that overlap the duration of the one or more pairs of linked PDCCH candidates as unlinked PDCCH candidates. In some aspects, the UE 120 may select one or more pairs of linked PDCCH candidates to monitor as unlinked PDCCH candidates in order for the total number of PPUs to satisfy the PPU limit associated with the UE 120. In some aspects, because the UE 120 independently monitors the selected PDCCH candidates to be unlinked, the UE 120 may refrain buffering soft demodulator outputs (e.g., LLR values) for the selected PDCCH candidates, resulting in a reduction in the total number of PPUs occupied.

In some aspects, the UE 120 may determine a priority order for the linked PDCCH candidates that occupy PPUs at the time at which the total number of PPUs does not satisfy the PPU limit associated with the UE 120, and the UE 120 may select the PDCCH candidates to unlink based at least in part on the priority order. In some aspects, in a case in which the PPU limit is across the CCs, the UE 120 may determine the priority for the linked PDCCH candidates based at least in part (e.g., as a function of) on the CC index. For example, linked PDCCH candidates on different CCs may be associated with different priorities. In this case, the UE 120 may select one or more linked PDCCH candidates to monitor as unlinked PDCCH candidates based at least in part on the priority associated with the CC for one or more linked PDCCH candidates.

In some aspects, the UE 120 may determine the priority order for selecting the linked PDCCH candidates to unlink based at least in part on SS set indexes associated with linked pairs of SS sets associated with the linked PDCCH candidates. For example, the SS set index associated with a linked pair of SS sets may be a smaller SS set index among the SS indexes associated with the two linked SS sets. In some aspects, each SS set index may be associated with a respective priority. In some aspects, SS sets of different SS types (e.g., CSS or USS) may be associated with different priorities. In some aspects, the UE 120 may select linked PDCCH candidates to monitor as unlinked PDCCH candidates at the SS set level. For example, the UE 120 may select the linked PDCCH candidates in a linked pair of SS sets to monitor as unlinked candidates based at least in part on a priority associated with the linked pair of SS sets (e.g., a priority associated with the SS set index associated with the linked pair of SS sets or a priority associated with an SS type associated with the linked pair of SS sets).

In some aspects, the UE 120 may determine the priority order for selecting the linked PDCCH candidates to unlink based at least in part on monitoring occasion indexes, within a slot, for monitoring occasions of a pair of linked SS sets. For example, different monitoring occasion indexes may be associated with different priorities. In some aspects, the UE 120 may select linked PDCCH candidates to monitor as unlinked PDCCH candidates at the monitoring occasion level. For example, the UE 120 may select the linked PDCCH candidates in a linked pair of monitoring occasions to monitor as unlinked PDCCH candidates based at least in part on a priority associated with monitoring occasion index for the linked pair of monitoring occasions.

In some aspects, the UE 120 may determine the priority order for selecting the linked PDCCH candidates to unlink based at least in part on the candidate indexes or the ALs for the linked PDCCH candidates. In some aspects, different priorities may be associated with different pairs of linked PDCCH candidates based at least in part on the candidate indexes associated with the pairs of linked PDCCH candidates. In some aspects, different priorities may be associated with different pairs of linked PDCCH candidates based at least in part on the ALs associated with the pairs of linked PDCCH candidates. In some aspects, the UE 120 may select one or more pairs of linked PDCCH candidates to monitor as unlinked PDCCH candidates based at least in part on the priority associated with the one or more pairs of linked PDCCH candidates (e.g., the priority associated with the candidate index or the priority associated with the AL). For example, the UE 120 may select one or more lowest priority pairs of linked PDCCH candidates to monitor as unlinked PDCCH candidates.

As further shown in FIG. 6, and by reference number 625, the base station 110 may transmit, to the UE 120, one or more PDCCH communications including DCI in one or more PDCCH candidates configured for the UE 120. In some aspects, the base station 110 may transmit repeated PDCCH transmissions including the same DCI in a pair of linked PDCCH candidates in linked monitoring occasions of a linked pair of SS sets. For example, the base station 110 may transmit a PDCCH communication including DCI in a first PDCCH candidate in a monitoring occasion of a first SS set of a linked pair of SS sets, and the base station 110 may repeat the transmission of the same PDCCH communication including the same DCI in a second PDCCH candidate, that is linked to the first PDCCH candidate (e.g., has the same AL and same candidate index), in a monitoring occasion of a second SS set of the linked pair of SS sets. In some aspects, the UE 120 may monitor one or more pairs of linked PDCCH candidates for PDCCH repetition. For example, the UE 120 may perform soft combining (e.g., LLR combining) of a pair of linked PDCCH candidates to decode the DCI based at least in part on a combination of the repeated PDCCH transmissions in the pair of linked PDCCH candidates. In some aspects, the base station 110 may transmit one or more PDCCH communications without PDCCH repetition in one or more unlinked PDCCH candidates (e.g., in one or more unlinked SS sets). In this case, the UE 120 may decode the DCI without soft combining.

In some aspects, the base station 110 may transmit repeated PDCCH communications with the same DCI in a pair of linked PDCCH candidates of a pair of linked SS sets based at least in part on the PPU limit associated with the UE 120. For example, the base station 110 may calculate the total number of PPUs occupied by all of the linked PDCCH candidates at one or more time points for the UE 120, and the base station 110 may compare the total number of PPUs occupied at the one or more time points to the PPU limit associated with the UE 120. In this case, the base station 110 may schedule and transmit repeated PDCCH communications based at least in part on whether the total number PPUs occupied at a time point of the UE 120 satisfies the PPU limit associated with the UE 120. In some aspects, in connection with a determination that the total number of PPUs occupied satisfies the PPU limit associated with the UE 120 at one or more time points, the base station 110 may transmit repeated PDCCH communications in any pair of linked PDCCH candidates scheduled for the one or more time points. In this case, the UE 120 may decode the DCI by soft combining the pair of PDCCH candidates.

In some aspects, in connection with a determination that the total number of PPUs occupied for the UE 120 at a time point does not satisfy the PPU limit associated with the UE 120, the base station 110 may identify one or more linked PDCCH candidates to be dropped (e.g., not monitored) by the UE 120. For example, the base station 110 may identify the one or more linked PDCCH candidates to be dropped based at least in part on the priority used by the UE 120 to select the linked PDCCH candidates to be dropped. In this case, the base station 110 may transmit repeated PDCCH communications in pairs of linked PDCCH candidates that are not being dropped by the UE 120, and the base station 110 may refrain from transmitting repeated PDCCH communications in the linked PDCCH candidates that are being dropped by the UE 120.

In some aspects, in connection with a determination that the total number of PPUs occupied for the UE 120 at a time point does not satisfy the PPU limit associated with the UE 120, the base station 110 may identify one or more linked PDCCH candidates to be unlinked (e.g., monitored as unlinked PDCCH candidates) by the UE 120. For example, the base station 110 may identify the one or more linked PDCCH candidates to be unlinked based at least in part on the priority used by the UE 120 to select the linked PDCCH candidates to be unlinked. In this case, the base station 110 may transmit repeated PDCCH communications in pairs of linked PDCCH candidates that are not being unlinked by the UE 120, and the base station 110 may refrain from transmitting repeated PDCCH communications in the linked PDCCH candidates that are being monitored as unlinked PDCCH candidates by the UE 120.

In some aspects, the DCI transmitted by the base station 110 and decoded by the UE 120 may schedule one or more downlink communications (e.g., PDSCH communications) from the base station 110 to the UE 120 and/or one or more uplink communications (e.g., PUSCH communications) from the UE 120 to the base station 110. In this case, the base station 110 may transmit, and the UE 120 may receive, one or more downlink communications scheduled by the DCI, and/or the UE 120 may transmit, and the base station 110 may receive, one or more uplink communications scheduled by the DCI.

As described above, the UE 120 may transmit, to the base station 110, an indication of a PPU limit associated with the UE 120. The base station 110 may transmit, to the UE 120, configurations for a plurality of SS sets including one or more linked pairs of SS sets with linked PDCCH candidates for PDCCH repetition. The UE 120 may selectively monitor the linked PDCCH candidates in the one or more linked pairs of SS sets based at least in part on a comparison of a total number of PPUs occupied by the linked PDCCH candidates in all of the one or more linked pairs of search space sets and the PPU limit associated with the UE 120. As a result, the UE 120 may refrain from monitoring linked PDCCH candidates for PDCCH repetition in any case in which the PPUs exceed the PPU limit associated with the UE. This may result in reduced consumption of memory resources by the UE 120 and/or increased reliability and decreased latency (e.g., due to decreased DCI decoding errors) for communications to and/or from the UE 120.

As indicated above, FIG. 6 is provided as an example. Other examples may differ from what is described with respect to FIG. 6.

Figure 7:
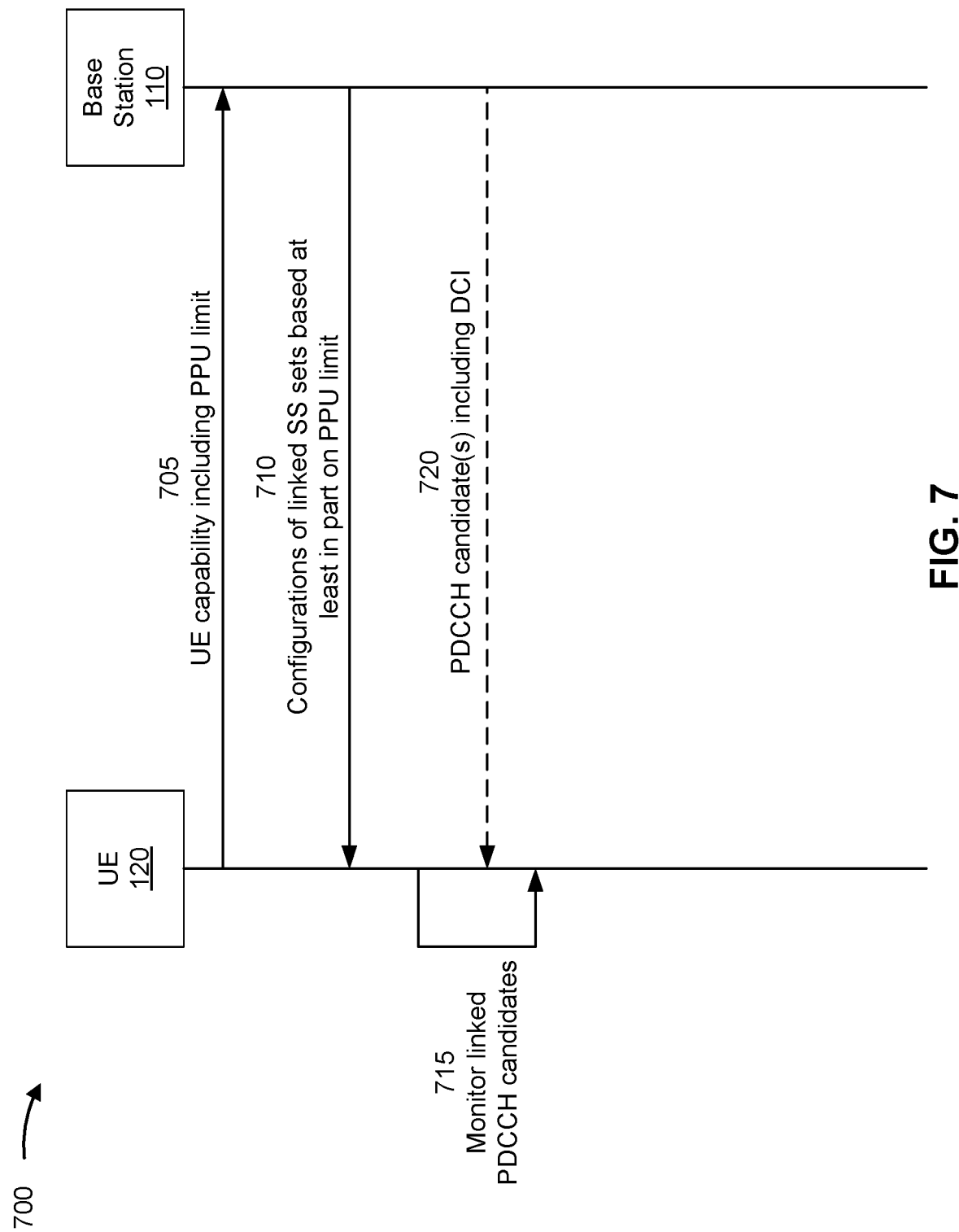

FIG. 7 is a diagram illustrating an example 700 associated with complexity handling for PDCCH repetition, in accordance with the present disclosure. As shown in FIG. 7, example 700 includes communication between a base station 110 and a UE 120. In some aspects, the base station 110 and the UE 120 may be included in a wireless network, such as wireless network 100 (e.g., as shown in FIG. 1). The base station 110 and the UE 120 may communicate via a wireless access link, which may include an uplink and a downlink.

As shown in FIG. 7, and by reference number 705, the UE 120 may transmit, to the base station 110, a UE capability report including an indication of a PPU limit associated with the UE 120. A PPU is a metric that represents the memory resources and/or complexity required for a pair of linked PDCCH candidates. For example, a PPU may represent the memory resources and/or complexity required for soft combining a pair of linked PDCCH candidates.

In some aspects, any pair of linked PDCCH candidates (e.g., any two PDCCH candidates linked to each other) occupies a number of PPUs for a duration associated with the pair of linked PDCCH candidates. A pair of linked PDCCH candidates may include a first PDCCH candidate in a first SS set of a linked pair of SS sets and a second PDCCH candidate, linked to the first PDCCH candidate (e.g., having the same AL and the same candidate index), in a second SS set of the linked pair of SS sets. In some aspects, the number of PPUs occupied by a pair of linked PDCCH candidates (e.g., the number of occupied PPUs for the pair of linked PDCCH candidates) may be based at least in part on the AL associated with the pair of linked PDCCH candidates. For example, an AL-dependent factor may be applied to determine the number of PPUs occupied by the pair of linked PDCCH candidates. In some aspects, the number of PPUs occupied by a pair of linked PDCCH candidates may be equal to the AL (e.g., 1, 2, 4, 8, or 16) associated with the pair of linked PDCCH candidates. In some aspects, the number of PPUs occupied by a pair of linked PDCCH candidates may be equal to, or based at least in part on, a mother code length (e.g., circular buffer size) for the AL associated with the pair of linked PDCCH candidates. For example, the mother code length (e.g., circular buffer size) for AL=1, 2, 4, 8, and 16 may be equal to 128, 256, 512, 512, and 512, respectively. Accordingly, in a case in which the number of PPUs occupied by a pair of linked PDCCH candidates is based at least in part on (or equal to) the mother code length for the AL level, the number of occupied PPUs for a pair of linked PDCCH candidates with AL=4 (e.g., mother code length=512) may be larger than the number of occupied PPUs for a pair of linked PDCCH candidates with AL=2 (e.g., mother code length=256), but the number of occupied PPUs may be the same for the pair of linked PDCCH candidates with AL=4 and for a pair of linked PDCCH candidates with AL=16 because the mother code length (e.g., 512) is the same for AL=4 and for AL=16.

In some aspects, for a pair of linked PDCCH candidates including a first PDCCH candidate and a second PDCCH candidate, the duration (e.g., occupation duration) associated with the pair of PDCCH candidates may be based at least in part on one or more symbols associated with the first PDCCH candidate and one or more symbols associated with the second PDCCH candidate. In some aspects, the duration for the pair of PDCCH candidates may run from a start of a first symbol associated with the first PDCCH candidate (e.g., the earlier PDCCH candidate in time) until an end of a last symbol associated with the second PDCCH candidate (e.g., the later PDCCH candidate in time). In some aspects, the duration for the pair of PDCCH candidates may run from an end of a last symbol associated with the first PDCCH candidate (e.g., the earlier PDCCH candidate in time) until the end of the last symbol associated with the second PDCCH candidate (e.g., the later PDCCH candidate in time). In some aspects, the duration for the pair of PDCCH candidates may run from a start of the first symbol associated with the first PDCCH candidate (e.g., the earlier PDCCH candidate in time) until a start of a first symbol associated with the second PDCCH candidate (e.g., the later PDCCH candidate in time). In some aspects, the duration for the pair of PDCCH candidates may run from the end of the last symbol associated with the first PDCCH candidate (e.g., the earlier PDCCH candidate in time) until the start of the first symbol associated with the second PDCCH candidate (e.g., the later PDCCH candidate in time).

At a given time (time t), the total number of occupied PPUs may be based on the occupied PPUs across all pairs of linked PDCCH candidates (e.g., across all linked monitoring occasions of all linked SS sets) with an associated occupation duration that includes time t. For example, for each pair of linked PDCCH candidates (e.g., across all linked monitoring occasions of all linked SS sets), the number of PPUs occupied by a pair of linked PDCCH candidates may be included in the total number of PPUs occupied at time t if the duration associated with that pair of linked PDCCH candidates includes time t.

The UE 120 may transmit, to the base station 110, the indication of the PPU limit associated with the UE 120. In some aspects, the indication of the PPU limit may be an indication of a capability of the UE 120 that indicates a maximum number of PPUs that the UE 120 is capable of supporting. In some aspects, the PPU limit may be a PPU limit set at a number of PPUs other than the maximum number of PPUs that the UE 120 is capable of supporting. In some aspects, the indication of the PPU limit may include an indication of a respective PPU limit (e.g., a maximum number of PPUs) per CC. For example, the indication may include respective PPU limits for one or more CCs. As another example, the indication of a PPU limit may be separately applied per CC (e.g., the indication may include one PPU limit, which is applied on a per-CC basis). Additionally, or alternatively, the indication of the PPU limit may include an indication of a PPU limit (e.g., a maximum number of PPUs) across all CCs. For example, in this case, the PPU limit may be for a total number of PPUs across one or more CCs. In some aspects, the indication of the PPU limit may include the indication of respective PPU limits for one or more CCs, and the UE 120 and the base station 110 may each derive a total PPU limit across all of the CCs based at least in part on the respective PPU limits for the CCs. For example, the respective PPU limits for the CCs may include a PPU limit (e.g., a maximum number of PPUs) per CC, and the total PPU limit (e.g., maximum number of PPUs) across all of the CCs may be derived by multiplying the PPU limit per CC by a factor. In some aspects, the factor may be equal to a UE capability for blind detection (e.g., pdcch-BlinddetectionCA), which may also be used to determine a maximum number of blind decodes (e.g., a maximum number of monitored candidates) across all of the CCs.

In some aspects, the UE 120 may separately indicate PPU limits for different subcarrier spacings (SCSs). For example, the indication of the PPU limit may include a respective PPU limit (e.g., maximum number of PPUs) for each of one or more SCSs (e.g., 15 kHz, 30 kHz, 60 kHz, 120 kHz, 240 kHz, 480 kHz, and/or 960 kHz, among other examples). In some aspects, the UE 120 may transmit the indication of the PPU limit to the base station 110 in a UE capability report (e.g., via an RRC message or a MAC-CE).

As further shown in FIG. 7, and by reference number 710, the base station 110 may transmit, to the UE 120, configurations of linked SS sets. In some aspects, the base station 110 may transmit, and the UE 120 may receive, configurations for a plurality of SS sets for PDCCH candidates, and the plurality of SS sets may include one or more linked pairs of SS sets. The one or more linked pairs of SS sets may include linked PDCCH candidates (e.g., in linked monitoring occasions) for PDCCH repetition. In some aspects, the base station 110 may transmit the configurations for the SS sets (including the linked SS sets) to the UE 120 in one or more RRC messages. In some aspects, the configurations for the linked pairs of SS sets may include SS set configurations for the SS sets and linking configurations that configure the linking between the linked pairs of SS sets.

In some aspects, the base station 110 may determine the configurations of the linked pairs of SS sets based at least in part on the indication of the PPU limit associated with the UE 120 received from the UE 120. In some aspects, the UE 120 may not expect that a total number of PPUs occupied by all of the linked PDCCH candidates at any time does not satisfy (e.g., exceeds) the PPU limit associated with the UE 120. In this case, the total number of PPUs occupied by all of the linked PDCCH candidates (e.g., across all of the configured linked pairs of SS sets) may be required to satisfy (e.g., be less than or equal to) the PPU limit associated with the UE 120. For example, based at least in part on the indication of the PPU limit associated with the UE 120, the base station 110 may determine the configurations for the linked pairs of SS sets, and the base station 110 may ensure (e.g., may be required to ensure) that the configurations for the linked pairs of SS sets (e.g., the SS set configurations and/or the linking configurations) result in the PPU limit associated with the UE 120 being satisfied for the UE 120 at all times. In some aspects, in a case in which a per CC PPU limit is indicated by the UE 120, the base station 110 may determine the configurations for the linked pairs of SS sets to ensure that the per CC PPU limit is satisfied at all times for each CC. In some aspects, in a case in which a total PPU limit across all CCs is indicated by the UE 120 (or derived based at least in part on the per CC PPU limit), the base station 110 may determine the configurations for the linked pairs of SS sets to ensure that the total PPU limit across all CCs is satisfied at all times for the UE 120.

As further shown in FIG. 7, and by reference number 715, the UE 120 may monitor the linked PDCCH candidates in linked monitoring occasions of the linked SS sets based at least in part on the configurations of the linked SS sets. In some aspects, the UE 120 may not expect that a total number of PPUs occupied by all of the linked PDCCH candidates at any time does not satisfy (e.g., exceeds) the PPU limit associated with the UE 120. In this case, the total number of PPUs occupied by all of the linked PDCCH candidates (e.g., across all of the configured linked pairs of SS sets) may be required to satisfy (e.g., be less than or equal to) the PPU limit associated with the UE 120. As described above, in some aspects, the base station 110 may be required to ensure that the configurations for the linked pairs of SS sets result in the PPU limit associated with the UE 120 being satisfied for the UE 120 at all times. In this case, the UE 120 may monitor the linked PDCCH candidates (e.g., in the linked pairs of monitoring occasions for the linked pairs of SS sets) for PDCCH repetition based at least in part on the configurations received from the base station 110. In some aspects, the UE 120 may determine that an error case has occurred in connection with a determination, by the UE 120, that the total number of PPUs occupied at a time point does not satisfy the PPU limit associated with the UE 120.

As further shown in FIG. 7, and by reference number 720, the base station 110 may transmit, to the UE 120, one or more PDCCH communications including DCI in one or more PDCCH candidates configured for the UE 120. In some aspects, the base station 110 may transmit repeated PDCCH transmissions including the same DCI in a pair of linked PDCCH candidates in linked monitoring occasions of a linked pair of SS sets. For example, the base station 110 may transmit a PDCCH communication including DCI in a first PDCCH candidate in a monitoring occasion of a first SS set of a linked pair of SS sets, and the base station 110 may repeat the transmission of the same PDCCH communication including the same DCI in a second PDCCH candidate, that is linked to the first PDCCH candidate (e.g., has the same AL and same candidate index), in a monitoring occasion of a second SS set of the linked pair of SS sets. In some aspects, the UE 120 may monitor one or more pairs of linked PDCCH candidates for PDCCH repetition. For example, the UE 120 may perform soft combining (e.g., LLR combining) of a pair of linked PDCCH candidates to decode the DCI based at least in part on a combination of the repeated PDCCH transmissions in the pair of linked PDCCH candidates. In some aspects, the base station 110 may transmit one or more PDCCH communications without PDCCH repetition in one or more unlinked PDCCH candidates (e.g., in one or more unlinked SS sets). In this case, the UE 120 may decode the DCI without soft combining.

In some aspects, the DCI transmitted by the base station 110 and decoded by the UE 120 may schedule one or more downlink communications (e.g., PDSCH communications) from the base station 110 to the UE 120 and/or one or more uplink communications (e.g., PUSCH communications) from the UE 120 to the base station 110. In this case, the base station 110 may transmit, and the UE 120 may receive, one or more downlink communications scheduled by the DCI, and/or the UE 120 may transmit, and the base station 110 may receive, one or more uplink communications scheduled by the DCI.

As described above, the UE 120 may transmit, to the base station 110, an indication of a PPU limit associated with the UE 120. The base station 110 may transmit, to the UE 120, configurations for a plurality of SS sets including one or more linked pairs of SS sets with linked PDCCH candidates for PDCCH repetition. The configurations for the one or more linked pairs of SS sets may be based at least in part on the PPU limit associated with the UE 120. The UE 120 may monitor the linked PDCCH candidates in the one or more linked pairs of SS sets based at least in part on the configurations for the one or more linked pairs of SS sets. As a result, the linked PDCCH candidates monitored by the UE 120 for PDCCH repetition may not exceed the PPU limit associated with the UE 120. This may result in reduced consumption of memory resources by the UE 120 and/or increased reliability and decreased latency (e.g., due to decreased DCI decoding errors) for communications to and/or from the UE 120.

As indicated above, FIG. 7 is provided as an example. Other examples may differ from what is described with respect to FIG. 7.

Figure 8:
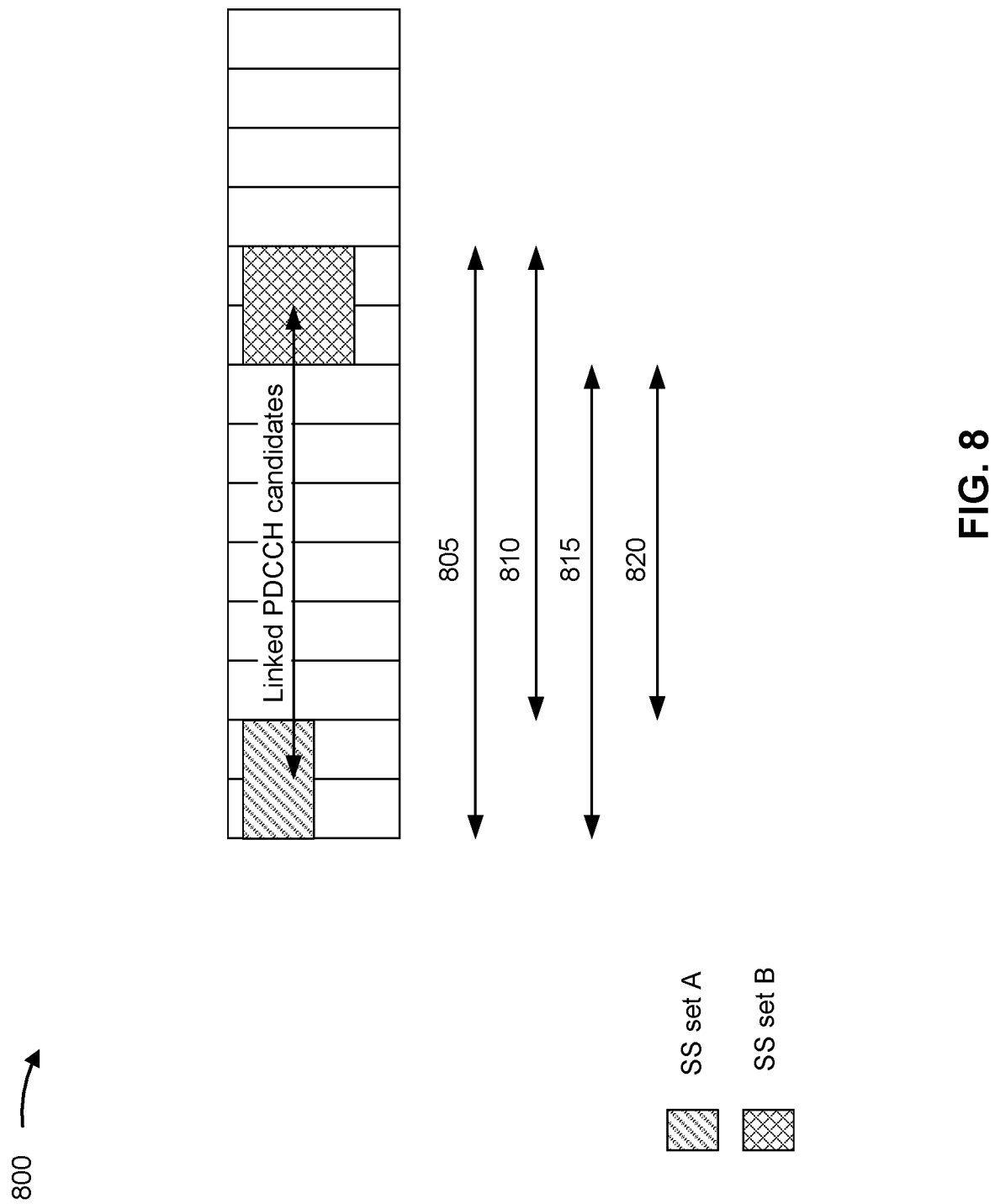

FIG. 8 is a diagram illustrating an example 800 associated with complexity handling for PDCCH repetition, in accordance with the present disclosure. As shown in FIG. 8, example 800 shows an example of a pair of linked PDCCH candidates including a first PDCCH candidate in a monitoring occasion of a first SS set (SS set A) and a second PDCCH candidate in a monitoring occasion of a second SS set (SS set B).

The pair of linked PDCCH candidates may occupy a number of PPUs for a duration associated with the pair of linked PDCCH candidates. In some aspects, the duration (e.g., occupation duration) associated with the pair of PDCCH candidates may be based at least in part on one or more symbols associated with the first PDCCH candidate (e.g., one or more symbols associated with the monitoring occasion for SS set A) and one or more symbols associated with the second PDCCH candidate (e.g., one or more symbols associated with the monitoring occasion for SS set B). In some aspects, as shown by reference number 805, the duration for the pair of PDCCH candidates may run from a start of a first symbol associated with the first PDCCH candidate (e.g., the first symbol of the monitoring occasion for SS set A) until an end of a last symbol associated with the second PDCCH candidate (e.g., the last symbol of the monitoring occasion for SS set B). In some aspects, as shown by reference number 810, the duration for the pair of PDCCH candidates may run from an end of a last symbol associated with the first PDCCH candidate (e.g., the last symbol of the monitoring occasion for SS set A) until the end of the last symbol associated with the second PDCCH candidate (e.g., the last symbol of the monitoring occasion for SS set B). In some aspects, as shown by reference number 815, the duration for the pair of PDCCH candidates may run from a start of the first symbol associated with the first PDCCH candidate (e.g., the first symbol of the monitoring occasion for SS set A) until a start of a first symbol associated with the second PDCCH candidate (e.g., the first symbol of the monitoring occasion for SS set B). In some aspects, as shown by reference number 820, the duration for the pair of PDCCH candidates may run from the end of the last symbol associated with the first PDCCH candidate (e.g., the last symbol of the monitoring occasion for SS set A) until the start of the first symbol associated with the second PDCCH candidate (e.g., the first symbol of the monitoring occasion for SS set B).

As indicated above, FIG. 8 is provided as an example. Other examples may differ from what is described with respect to FIG. 8.

Figure 9A:
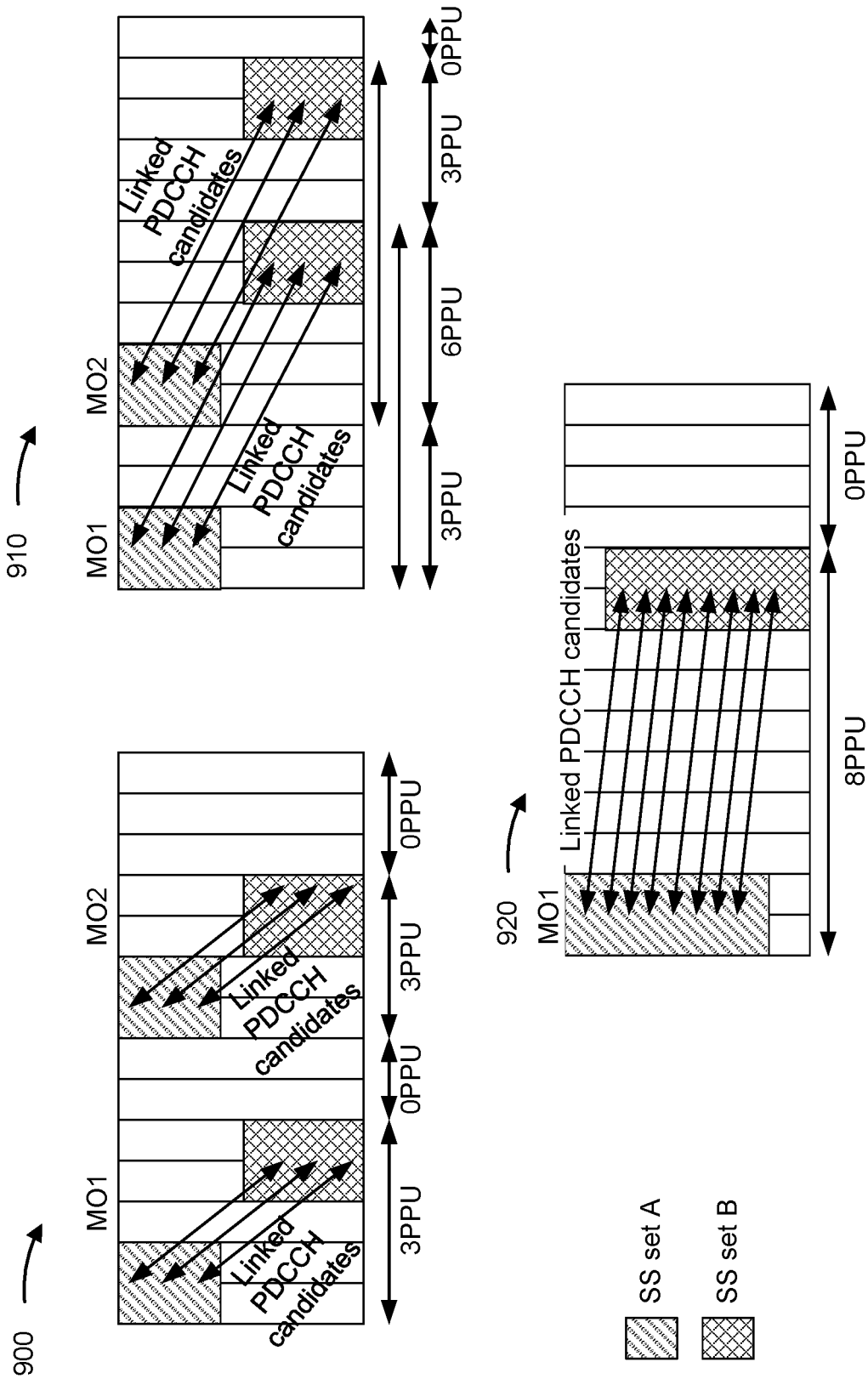
Figure 9B:
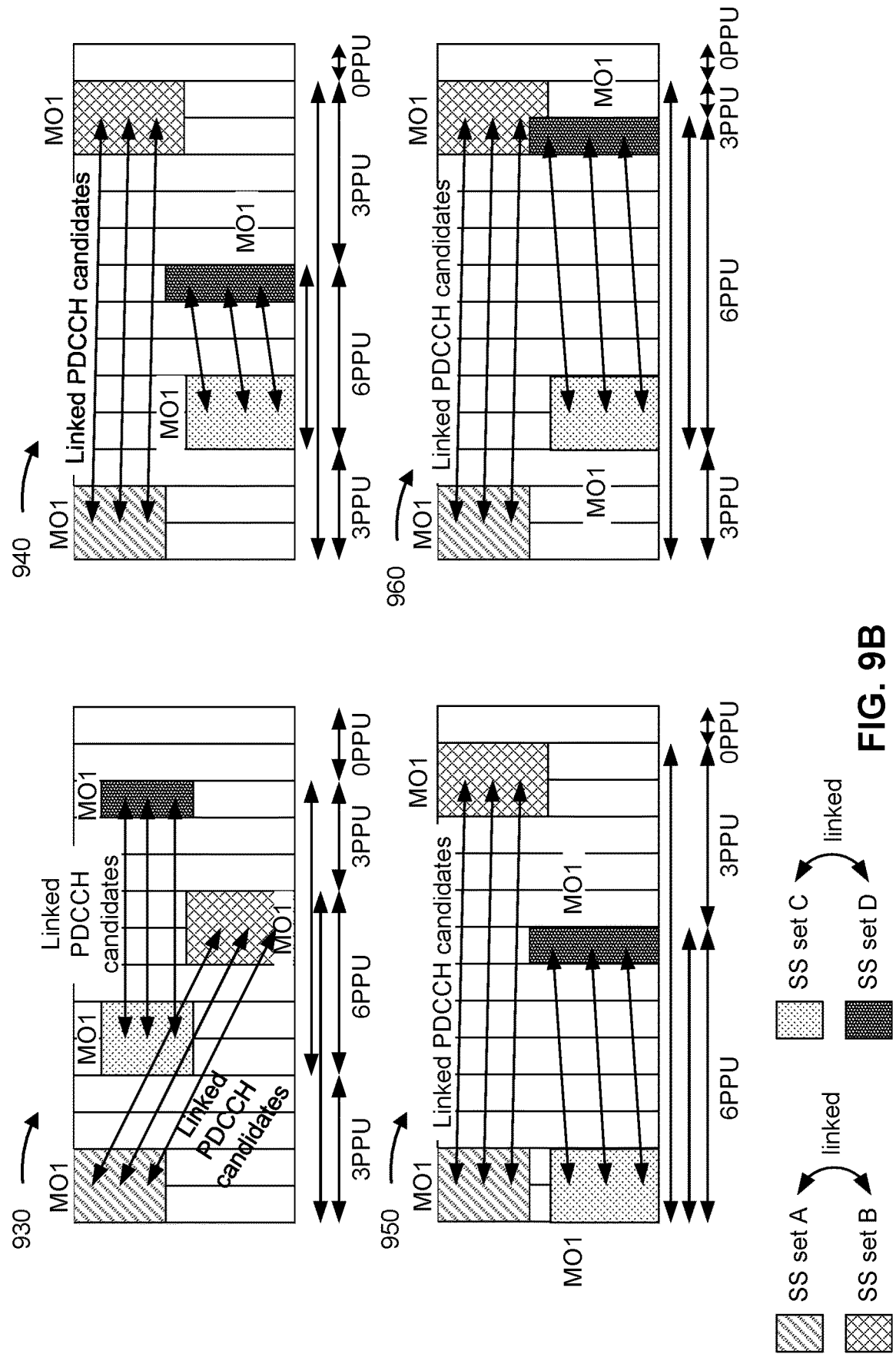

FIGS. 9A-9B are diagrams illustrating examples 900, 910, 920, 930, 940, 950, and 960 associated with complexity handling for PDCCH repetition, in accordance with the present disclosure. As shown in FIGS. 9A-9B, examples 900, 910, 920, 930, 940, 950, and 960 show examples of calculating occupied PPUs for a UE. As described above, a pair of linked PDCCH candidates may occupy a number of PPUs for a duration associated with the pair of linked PDCCH candidates. In examples 900, 910, 920, 930, 940, 950, and 960, it is assumed that each pair of linked PDCCH candidates occupies 1 PPU for the duration associated with that pair of linked PDCCH candidates. Furthermore, in examples 900, 910, 920, 930, 940, 950, and 960, the duration for each pair of PDCCH candidates runs from the start of the first symbol associated with the first PDCCH candidate to the end of the last symbol associated with the second PDCCH candidate.

As shown in FIG. 9A, example 900 shows a case in which a first monitoring occasion of a first SS set (SS set A) and a first monitoring occasion of a second SS set (SS set B) both occur before the second monitoring occasion of SS set A and the second monitoring occasion of SS set B. As shown in example 900, 3 PPUs are occupied during the duration between the first monitoring occasions of SS set A and SS set B, 3 PPUs are occupied during the duration between the second monitoring occasions of SS set A and SS set B, and 0 PPUs are occupied in the symbols between the first monitoring occasion of SS set B and the second monitoring occasion of SS set A and after the second monitoring occasion of SS set B.

As further shown in FIG. 9A, example 910 shows a case in which the second monitoring of SS set A occurs prior to the first monitoring of SS set B. As shown in example 910, a total of 3 PPUs are occupied in the duration from the first monitoring occasion of SS set A to the second monitoring occasion of SS set A. A total of 6 PPUs are occupied in the duration from the second monitoring occasion of SS set A to an end of the first monitoring occasion of SS set B. A total of 3 PPUs are occupied in the duration from the end of the first monitoring occasion of SS set B to the end of the second monitoring occasion of SS set B, and 0 PPUs are occupied after the second monitoring occasion of SS set B.

As further shown in FIG. 9A, example 920 shows a case in which SS set A and SS set B have 8 pairs of linked PDCCH candidates. As shown in example 920, a total of 8 PPUs are occupied in the duration between the first monitoring occasion for SS set A and the first monitoring occasion of SS set B, and 0 PPUs are occupied after the first monitoring occasion of SS set B.

As shown in FIG. 9B, examples 930, 940, 950, and 960 show cases in which a first SS set (SS set A) is linked to a second SS set (SS set B) and a third SS set (SS set C) is linked to a fourth SS set (SS set D). As shown in FIG. 9B, example 930 shows a case in which the first monitoring occasion for SS set C is scheduled between the first monitoring occasion for SS set A and the first monitoring occasion for SS set B. As shown in example 930, a total of 3 PPUs are occupied in the duration from the first monitoring occasion of SS set A to the first monitoring occasion of SS set C. A total of 6 PPUs are occupied in the duration from the first monitoring occasion of SS set C to an end of the first monitoring occasion of SS set B. A total of 3 PPUs are occupied in the duration from the end of the first monitoring occasion of SS set B to the end of the first monitoring occasion of SS set D, and 0 PPUs are occupied after the first monitoring occasion of SS set D.

As further shown in FIG. 9B, example 940 shows a case in which the first monitoring occasion for SS set C and the first monitoring occasion for SS set D are scheduled between the first monitoring occasion for SS set A and the first monitoring occasion for SS set B. As shown in example 940, a total of 3 PPUs are occupied in the duration from the first monitoring occasion of SS set A to the first monitoring occasion of SS set C. A total of 6 PPUs are occupied in the duration between the first monitoring occasion of SS set C and the first monitoring occasion of SS set D. A total of 3 PPUs are occupied in the duration from the first monitoring occasion of SS set D to the end of the first monitoring occasion of SS set B, and 0 PPUs are occupied after the first monitoring occasion of SS set B.

As further shown in FIG. 9B, example 950 shows a case in which the first monitoring occasion for SS set A and the first monitoring occasion for SS set C are scheduled in the same symbols in the slot, and the first symbol of the first monitoring occasions for SS set A and SS set C is scheduled before the first monitoring occasion for SS set B. As shown in example 950, a total of 6 PPUs are occupied in the duration between the first monitoring occasion of SS set C and the first monitoring occasion of SS set D. A total of 3 PPUs are occupied in the duration from the first monitoring occasion of SS set D to the end of the first monitoring occasion of SS set B, and 0 PPUs are occupied after the first monitoring occasion of SS set B.

As further shown in FIG. 9B, example 960 shows a case in which the first monitoring occasion for SS set C is scheduled between the first monitoring occasion for SS set A and the first monitoring occasion for SS set B, and the first monitoring occasion for SS set D is scheduled to begin in a same symbol as the first monitoring occasion for SS set B. As shown in example 960, a total of 3 PPUs are occupied in the duration from the first monitoring occasion of SS set A to the first monitoring occasion of SS set C. A total of 6 PPUs are occupied in the duration between the start of first monitoring occasion of SS set C and the end of the first monitoring occasion of SS set D. A total of 3 PPUs are occupied in the duration from the end of the first monitoring occasion of SS set D to the end of the first monitoring occasion of SS set B, and 0 PPUs are occupied after the first monitoring occasion of SS set B.

As indicated above, FIGS. 9A and 9B are provided as examples. Other examples may differ from what is described with respect to FIGS. 9A and 9B.

FIG. 10 is a diagram illustrating an example process 1000 performed, for example, by a UE, in accordance with the present disclosure. Example process 1000 is an example where the UE (e.g., UE 120) performs operations associated with complexity handling for physical downlink control channel repetition.

As shown in FIG. 10, in some aspects, process 1000 may include transmitting, to a network node, an indication of a PPU limit associated with the UE (block 1010). For example, the UE (e.g., using communication manager 140 and/or transmission component 1604, depicted in FIG. 16) may transmit, to a network node, an indication of a PPU limit associated with the UE, as described above.

As further shown in FIG. 10, in some aspects, process 1000 may include receiving, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE (block 1020). For example, the UE (e.g., using communication manager 140 and/or reception component 1602, depicted in FIG. 16) may receive, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE, as described above.

Process 1000 may include additional aspects, such as any single aspect or any combination of aspects described below and/or in connection with one or more other processes described elsewhere herein.

In a first aspect, process 1000 includes monitoring the linked PDCCH candidates in the one or more linked pairs of search space sets based at least in part on the configurations for the one or more linked pairs of search space sets.

In a second aspect, alone or in combination with the first aspect, process 1000 includes calculating a total number of PPUs occupied by the linked PDCCH candidates in all of the one or more linked pairs of search space sets at one or more time points associated with linked pairs of monitoring occasions associated with the one or more linked pairs of search space sets.

In a third aspect, alone or in combination with one or more of the first and second aspects, the linked PDCCH candidates include one or more pairs of linked PDCCH candidates, wherein each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

In a fourth aspect, alone or in combination with one or more of the first through third aspects, for each pair of linked PDCCH candidates, the number of PPUs occupied by that pair of linked PDCCH candidates is based at least in part on an aggregation level associated with that pair of linked PDCCH candidates.

In a fifth aspect, alone or in combination with one or more of the first through fourth aspects, for each pair of linked PDCCH candidates, the number of PPUs occupied by that pair of linked PDCCH candidates is based at least in part on a mother code length for an aggregation level associated with that pair of linked PDCCH candidates.

In a sixth aspect, alone or in combination with one or more of the first through fifth aspects, for each pair of linked PDCCH candidates, the number of PPUs occupied by that pair of linked PDCCH candidates is equal to a first value in connection with an aggregation level of 1 associated with that pair of linked PDCCH candidates, a second value, larger than the first value, in connection with an aggregation level of 2 associated with that pair of linked PDCCH candidates, or a third value, larger than the second value, in connection with an aggregation level of 4, 8, or 16 associated with that pair of linked PDCCH candidates.

In a seventh aspect, alone or in combination with one or more of the first through sixth aspects, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

In an eighth aspect, alone or in combination with one or more of the first through seventh aspects, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

In a ninth aspect, alone or in combination with one or more of the first through eighth aspects, the indication of the PPU limit associated with the UE includes an indication of respective PPU limits for one or more component carriers.

In a tenth aspect, alone or in combination with one or more of the first through ninth aspects, the indication of the PPU limit associated with the UE indicates a PPU limit for a number of PPUs across one or more component carriers.

In an eleventh aspect, alone or in combination with one or more of the first through tenth aspects, the indication of the PPU limit associated with the UE includes a respective PPU limit for each of one or more subcarrier spacings.

In a twelfth aspect, alone or in combination with one or more of the first through eleventh aspects, a total number of PPUs occupied by the linked PDCCHs in all of the one or more linked pairs of search space sets is required to satisfy the PPU limit associated with the UE.

In a thirteenth aspect, alone or in combination with one or more of the first through twelfth aspects, process 1000 includes monitoring one or more of the linked PDCCH candidates for PDCCH repetition in a linked pair of monitoring occasions in connection with a determination that a total number of PPUs occupied by the linked PDCCH candidates in all of the one or more linked pairs of search space sets satisfies the PPU limit associated with the UE during a duration associated with the one or more of the linked PDCCH candidates.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
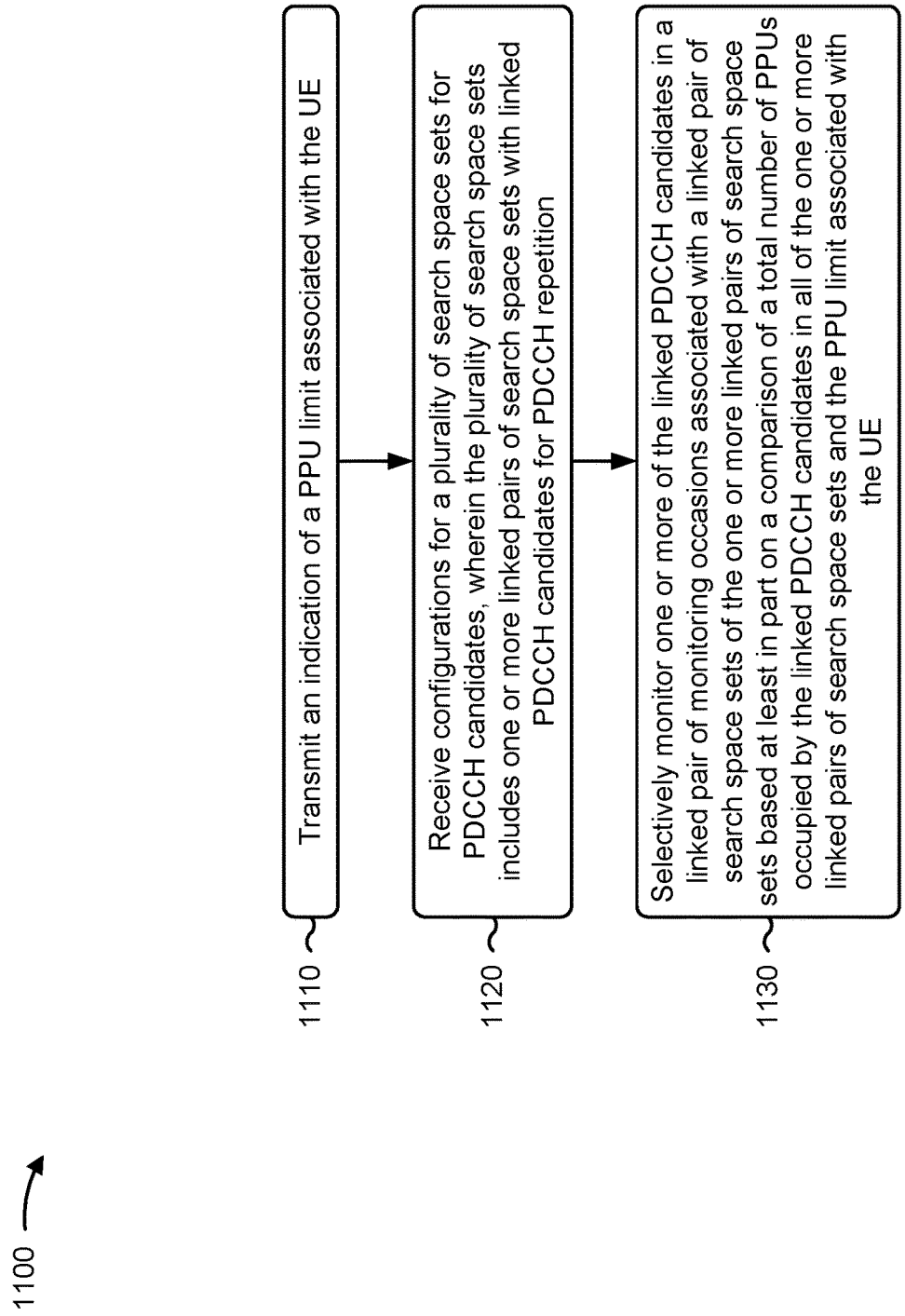

FIG. 11 is a diagram illustrating an example process 1100 performed, for example, by a UE, in accordance with the present disclosure. Example process 1100 is an example where the UE (e.g., UE 120) performs operations associated with complexity handling for PDCCH repetition.

As shown in FIG. 11, in some aspects, process 1100 may include transmitting, to a network node, an indication of a PPU limit associated with the UE (block 1110). For example, the UE (e.g., using communication manager 140 and/or transmission component 1604, depicted in FIG. 16) may transmit, to a network node, an indication of a PPU limit associated with the UE, as described above.

As further shown in FIG. 11, in some aspects, process 1100 may include receiving, from the network node, configurations for a plurality of search space sets for PDCCH candidates, wherein the plurality of search space sets includes one or more linked pairs of search space sets with linked PDCCH candidates for PDCCH repetition (block 1120). For example, the UE (e.g., using communication manager 140 and/or reception component 1602, depicted in FIG. 16) may receive, from the network node, configurations for a plurality of search space sets for PDCCH candidates, wherein the plurality of search space sets includes one or more linked pairs of search space sets with linked PDCCH candidates for PDCCH repetition, as described above.

As further shown in FIG. 11, in some aspects, process 1100 may include selectively monitoring one or more of the linked PDCCH candidates in a linked pair of monitoring occasions associated with a linked pair of search space sets of the one or more linked pairs of search space sets based at least in part on a comparison of a total number of PPUs occupied by the linked PDCCH candidates in all of the one or more linked pairs of search space sets and the PPU limit associated with the UE (block 1130). For example, the UE (e.g., using communication manager 140 and/or monitoring component 1608, depicted in FIG. 16) may selectively monitor one or more of the linked PDCCH candidates in a linked pair of monitoring occasions associated with a linked pair of search space sets of the one or more linked pairs of search space sets based at least in part on a comparison of a total number of PPUs occupied by the linked PDCCH candidates in all of the one or more linked pairs of search space sets and the PPU limit associated with the UE, as described above.

Process 1100 may include additional aspects, such as any single aspect or any combination of aspects described below and/or in connection with one or more other processes described elsewhere herein.

In a first aspect, process 1100 includes calculating the total number of PPUs occupied by the linked PDCCH candidates in all of the one or more linked pairs of search space sets at one or more time points associated with the linked pair of monitoring occasions, wherein selectively monitoring the one or more of the linked PDCCH candidates in the monitoring occasions is based at least in part on a comparison of the total number of PPUs calculated at the one or more time points associated with the linked pair of monitoring occasions and the PPU limit associated with the UE.

In a second aspect, alone or in combination with the first aspect, the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

In a third aspect, alone or in combination with one or more of the first and second aspects, for each pair of linked PDCCH candidates, the number of PPUs occupied by that pair of linked PDCCH candidates is based at least in part on an aggregation level associated with that pair of linked PDCCH candidates.

In a fourth aspect, alone or in combination with one or more of the first through third aspects, for each pair of linked PDCCH candidates, the number of PPUs occupied by that pair of linked PDCCH candidates is equal to an aggregation level associated with that pair of linked PDCCH candidates.

In a fifth aspect, alone or in combination with one or more of the first through fourth aspects, for each pair of linked PDCCH candidates, the number of PPUs occupied by that pair of linked PDCCH candidates is based at least in part on a mother code length for an aggregation level associated with that pair of linked PDCCH candidates.

In a sixth aspect, alone or in combination with one or more of the first through fifth aspects, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

In a seventh aspect, alone or in combination with one or more of the first through sixth aspects, for each pair of linked PDCCH candidates, the duration associated with that pair of linked PDCCH candidates runs from a start of a first symbol associated with the first PDCCH candidate of that pair of linked PDCCH candidates to an end of a last symbol associated with the second PDCCH candidate of that pair of linked PDCCH candidates.

In an eighth aspect, alone or in combination with one or more of the first through seventh aspects, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

In a ninth aspect, alone or in combination with one or more of the first through eighth aspects, for each pair of linked PDCCH candidates, the duration associated with that pair of linked PDCCH candidates runs from a start of a first symbol associated with the first PDCCH candidate of that pair of linked PDCCH candidates to a start of a first symbol associated with the second PDCCH candidate of that pair of linked PDCCH candidates.

In a tenth aspect, alone or in combination with one or more of the first through ninth aspects, for each pair of linked PDCCH candidates, the duration associated with that pair of linked PDCCH candidates runs from an end of a last symbol associated with the first PDCCH candidate of that pair of linked PDCCH candidates to a start of a first symbol associated with the second PDCCH candidate of that pair of linked PDCCH candidates.

In an eleventh aspect, alone or in combination with one or more of the first through tenth aspects, the indication of the PPU limit associated with the UE includes an indication of respective PPU limits for one or more component carriers.

In a twelfth aspect, alone or in combination with one or more of the first through eleventh aspects, process 1100 includes deriving a total PPU limit across all of the one or more component carriers based at least in part on the respective PPU limits for the one or more component carriers.

In a thirteenth aspect, alone or in combination with one or more of the first through twelfth aspects, the indication of the PPU limit associated with the UE indicates a PPU limit for a number of PPUs across one or more component carriers.

In a fourteenth aspect, alone or in combination with one or more of the first through thirteenth aspects, the indication of the PPU limit associated with the UE includes a respective PPU limit for each of one or more subcarrier spacings.

In a fifteenth aspect, alone or in combination with one or more of the first through fourteenth aspects, selectively monitoring the one or more of the linked PDCCH candidates in the linked pair of monitoring occasions includes monitoring the one or more of the linked PDCCH candidates for PDCCH repetition in the linked pair of monitoring occasions, and the total number of PPUs occupied by the linked PDCCHs in all of the one or more linked pairs of search space sets is required to satisfy the PPU limit associated with the UE.

In a sixteenth aspect, alone or in combination with one or more of the first through fifteenth aspects, selectively monitoring the one or more of the linked PDCCH candidates in the linked pair of monitoring occasions includes monitoring the one or more of the linked PDCCH candidates for PDCCH repetition in the linked pair of monitoring occasions in connection with a determination that the total number of PPUs occupied by the linked PDCCHs in all of the one or more linked pairs of search space sets satisfies the PPU limit associated with the UE during a duration associated with the one or more of the linked PDCCH candidates.

In a seventeenth aspect, alone or in combination with one or more of the first through sixteenth aspects, selectively monitoring the one or more of the linked PDCCH candidates in the linked pair of monitoring occasions includes refraining from monitoring one or more PDCCH candidates of the one or more of the linked PDCCH candidates in the linked pair of monitoring occasions in connection with a determination that the total number of PPUs occupied by the linked PDCCHs in all of the one or more linked pairs of search space sets does not satisfy the PPU limit associated with the UE during a duration associated with the one or more of the linked PDCCH candidates.

In an eighteenth aspect, alone or in combination with one or more of the first through seventeenth aspects, refraining from monitoring one or more PDCCH candidates of the one or more of the linked PDCCH candidates in the linked pair of monitoring occasions includes refraining from monitoring the one or more PDCCH candidates in connection with the determination that the total number of PPUs occupied does not satisfy the PPU limit associated with the UE based at least in part on a priority associated with a component carrier for the PDCCH candidates.

In a nineteenth aspect, alone or in combination with one or more of the first through eighteenth aspects, refraining from monitoring one or more PDCCH candidates of the one or more of the linked PDCCH candidates in the linked pair of monitoring occasions includes refraining from monitoring the linked search space set pair in connection with the determination that the total number of PPUs occupied does not satisfy the PPU limit associated with the UE based at least in part on a priority associated with the linked search space set pair.

In a twentieth aspect, alone or in combination with one or more of the first through nineteenth aspects, refraining from monitoring one or more PDCCH candidates of the one or more of the linked PDCCH candidates in the linked pair of monitoring occasions includes refraining from monitoring the linked monitoring occasion pair in connection with the determination that the total number of PPUs occupied does not satisfy the PPU limit associated with the UE based at least in part on a priority associated with the linked monitoring occasion pair.

In a twenty-first aspect, alone or in combination with one or more of the first through twentieth aspects, refraining from monitoring one or more PDCCH candidates of the one or more of the linked PDCCH candidates in the linked pair of monitoring occasions includes selecting the PDCCH candidates to refrain from monitoring from the one or more of the linked PDCCH candidates based at least in part on respective priorities associated with the one or more of the linked PDCCH candidates.

In a twenty-second aspect, alone or in combination with one or more of the first through twenty-first aspects, selectively monitoring the one or more of the linked PDCCH candidates in the linked pair of monitoring occasions includes monitoring the one or more of the linked PDCCH candidates in the linked pair of monitoring occasions separately as unlinked PDCCH candidates in connection with a determination that the total number of PPUs occupied by the linked PDCCHs in all of the one or more linked pairs of search space sets does not satisfy the PPU limit associated with the UE during a duration associated with the one or more of the linked PDCCH candidates.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
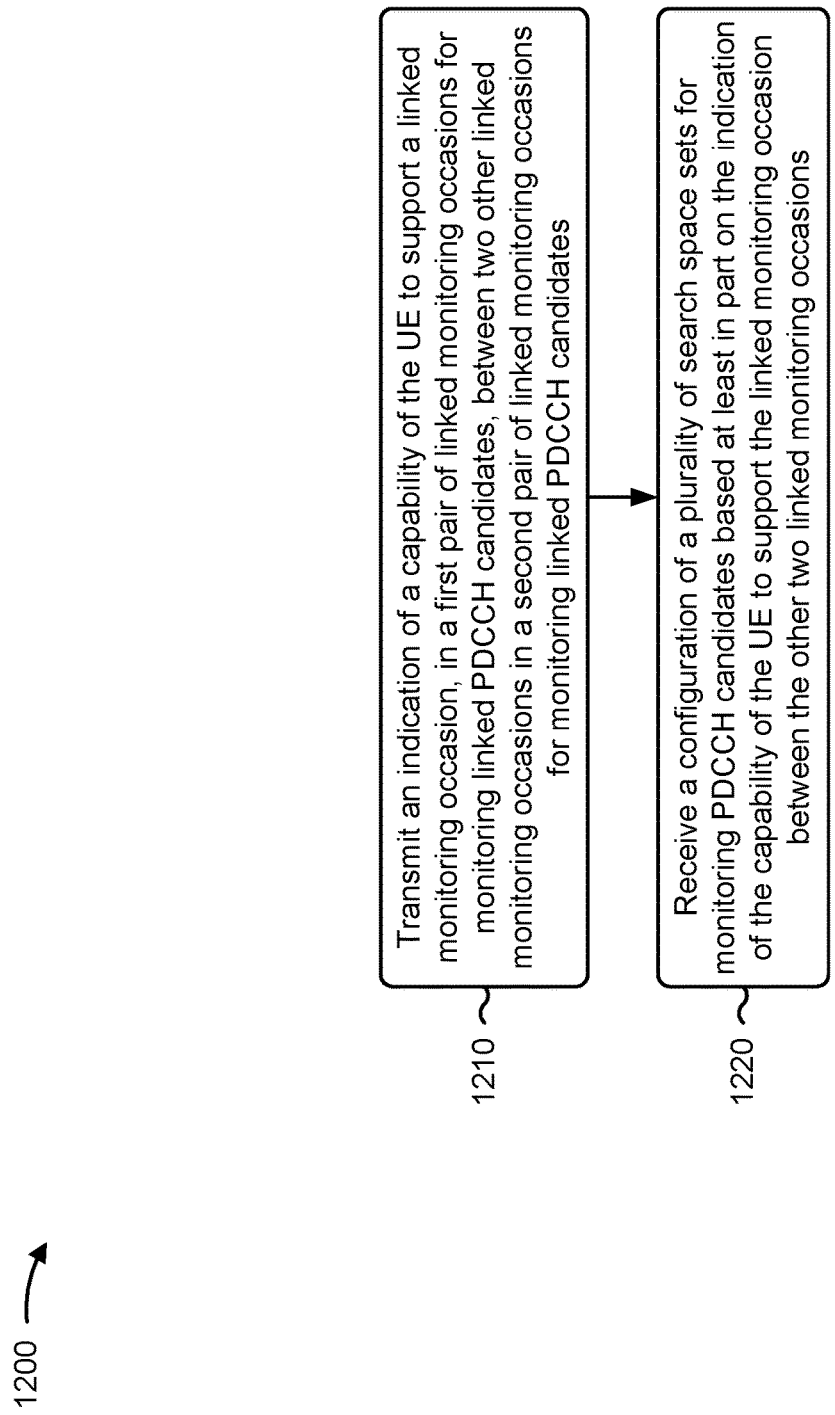

FIG. 12 is a diagram illustrating an example process 1200 performed, for example, by a UE, in accordance with the present disclosure. Example process 1200 is an example where the UE (e.g., UE 120) performs operations associated with complexity handling for PDCCH repetition.

As shown in FIG. 12, in some aspects, process 1200 may include transmitting, to a network node, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates (block 1210). For example, the UE (e.g., using communication manager 140 and/or transmission component 1604, depicted in FIG. 16) may transmit, to a network node, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates, as described above.

As further shown in FIG. 12, in some aspects, process 1200 may include receiving, from the network node, a configuration of a plurality of search space sets for monitoring PDCCH candidates based at least in part on the indication of the capability of the UE to support the linked monitoring occasion between the other two linked monitoring occasions (block 1220). For example, the UE (e.g., using communication manager 140 and/or reception component 1602, depicted in FIG. 16) may receive, from the network node, a configuration of a plurality of search space sets for monitoring PDCCH candidates based at least in part on the indication of the capability of the UE to support the linked monitoring occasion between the other two linked monitoring occasions, as described above.

Process 1200 may include additional aspects, such as any single aspect or any combination of aspects described below and/or in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
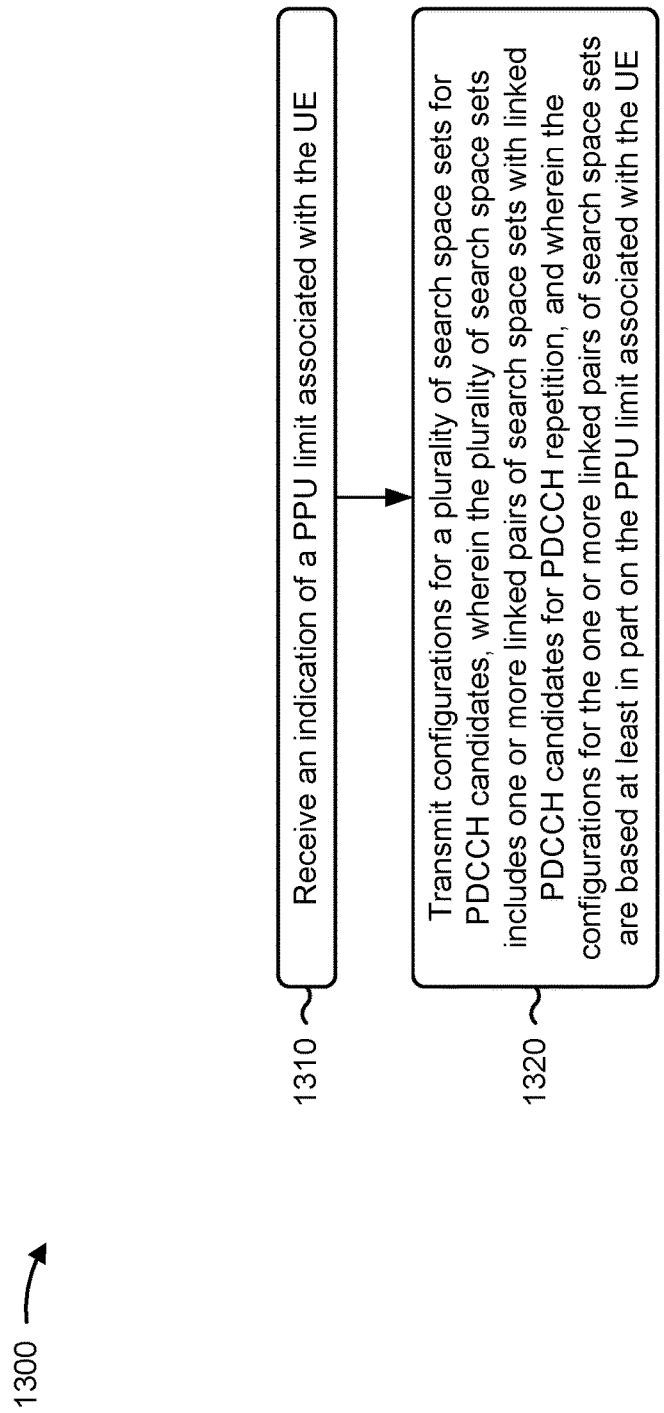

FIG. 13 is a diagram illustrating an example process 1300 performed, for example, by a network node, in accordance with the present disclosure. Example process 1300 is an example where the network node (e.g., base station 110) performs operations associated with complexity handling for physical downlink control channel repetition.

As shown in FIG. 13, in some aspects, process 1300 may include receiving, from a UE, an indication of a PPU limit associated with the UE (block 1310). For example, the network node (e.g., using communication manager 150 and/or reception component 1702, depicted in FIG. 17) may receive, from a UE, an indication of a PPU limit associated with the UE, as described above.

As further shown in FIG. 13, in some aspects, process 1300 may include transmitting, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE (block 1320). For example, the network node (e.g., using communication manager 150 and/or transmission component 1704, depicted in FIG. 17) may transmit, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE, as described above.

Process 1300 may include additional aspects, such as any single aspect or any combination of aspects described below and/or in connection with one or more other processes described elsewhere herein.

In a first aspect, process 1300 includes transmitting, to the UE, repeated PDCCH transmissions in the linked PDCCH candidates of the one or more linked pairs of search space sets based at least in part on the configurations of the one or more linked pairs of search space sets.

In a second aspect, alone or in combination with the first aspect, the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

In a third aspect, alone or in combination with one or more of the first and second aspects, for each pair of linked PDCCH candidates, the number of PPUs occupied by that pair of linked PDCCH candidates is based at least in part on an aggregation level associated with that pair of linked PDCCH candidates.

In a fourth aspect, alone or in combination with one or more of the first through third aspects, for each pair of linked PDCCH candidates, the number of PPUs occupied by that pair of linked PDCCH candidates is based at least in part on a mother code length for an aggregation level associated with that pair of linked PDCCH candidates.

In a fifth aspect, alone or in combination with one or more of the first through fourth aspects, for each pair of linked PDCCH candidates, the number of PPUs occupied by that pair of linked PDCCH candidates is equal to a first value in connection with an aggregation level of 1 associated with that pair of linked PDCCH candidates, a second value, larger than the first value, in connection with an aggregation level of 2 associated with that pair of linked PDCCH candidates, or a third value, larger than the second value, in connection with an aggregation level of 4, 8, or 16 associated with that pair of linked PDCCH candidates.

In a sixth aspect, alone or in combination with one or more of the first through fifth aspects, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

In a seventh aspect, alone or in combination with one or more of the first through sixth aspects, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

In an eighth aspect, alone or in combination with one or more of the first through seventh aspects, the indication of the PPU limit associated with the UE includes an indication of respective PPU limits for one or more component carriers.

In a ninth aspect, alone or in combination with one or more of the first through eighth aspects, the indication of the PPU limit associated with the UE indicates a PPU limit for a number of PPUs across one or more component carriers.

In a tenth aspect, alone or in combination with one or more of the first through ninth aspects, the indication of the PPU limit associated with the UE includes a respective PPU limit for each of one or more subcarrier spacings.

In an eleventh aspect, alone or in combination with one or more of the first through tenth aspects, the configurations for the plurality of search space sets ensure that a total number of PPUs occupied by the linked PDCCHs in all of the one or more linked pairs of search space sets satisfies the PPU limit associated with the UE at all times.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
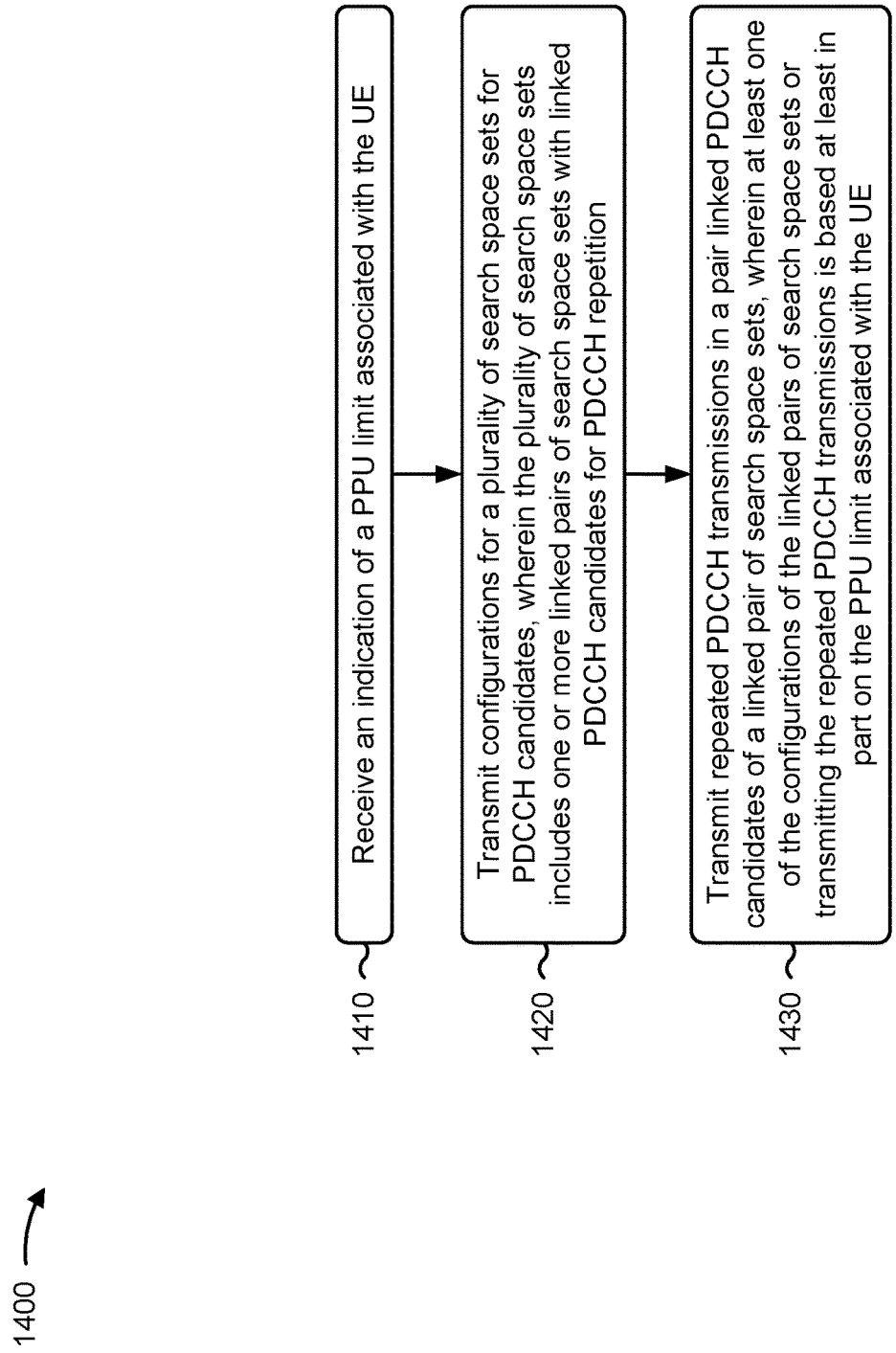

FIG. 14 is a diagram illustrating an example process 1400 performed, for example, by a network node, in accordance with the present disclosure. Example process 1400 is an example where the network node (e.g., base station 110) performs operations associated with complexity handling for PDCCH repetition.

As shown in FIG. 14, in some aspects, process 1400 may include receiving, from a UE, an indication of a PPU limit associated with the UE (block 1410). For example, the network node (e.g., using communication manager 150 and/or reception component 1702, depicted in FIG. 17) may receive, from a UE, an indication of a PPU limit associated with the UE, as described above.

As further shown in FIG. 14, in some aspects, process 1400 may include transmitting, to the UE, configurations for a plurality of search space sets for PDCCH candidates, wherein the plurality of search space sets includes one or more linked pairs of search space sets with linked PDCCH candidates for PDCCH repetition (block 1420). For example, the network node (e.g., using communication manager 150 and/or transmission component 1704, depicted in FIG. 17) may transmit, to the UE, configurations for a plurality of search space sets for PDCCH candidates, wherein the plurality of search space sets includes one or more linked pairs of search space sets with linked PDCCH candidates for PDCCH repetition, as described above.

As further shown in FIG. 14, in some aspects, process 1400 may include transmitting, to the UE, repeated PDCCH transmissions in a pair of linked PDCCH candidates of a linked pair of search space sets, wherein at least one of the configurations of the linked pairs of search space sets or transmitting the repeated PDCCH transmissions is based at least in part on the PPU limit associated with the UE (block 1430). For example, the network node (e.g., using communication manager 150 and/or transmission component 1704, depicted in FIG. 17) may transmit, to the UE, repeated PDCCH transmissions in a pair of linked PDCCH candidates of a linked pair of search space sets, wherein at least one of the configurations of the linked pairs of search space sets or transmitting the repeated PDCCH transmissions is based at least in part on the PPU limit associated with the UE, as described above.

Process 1400 may include additional aspects, such as any single aspect or any combination of aspects described below and/or in connection with one or more other processes described elsewhere herein.

In a first aspect, the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

In a second aspect, alone or in combination with the first aspect, for each pair of linked PDCCH candidates, the number of PPUs occupied by that pair of linked PDCCH candidates is based at least in part on an aggregation level associated with that pair of linked PDCCH candidates.

In a third aspect, alone or in combination with one or more of the first and second aspects, for each pair of linked PDCCH candidates, the number of PPUs occupied by that pair of linked PDCCH candidates is equal to an aggregation level associated with that pair of linked PDCCH candidates.

In a fourth aspect, alone or in combination with one or more of the first through third aspects, for each pair of linked PDCCH candidates, the number of PPUs occupied by that pair of linked PDCCH candidates is based at least in part on a mother code length for an aggregation level associated with that pair of linked PDCCH candidates.

In a fifth aspect, alone or in combination with one or more of the first through fourth aspects, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

In a sixth aspect, alone or in combination with one or more of the first through fifth aspects, for each pair of linked PDCCH candidates, the duration associated with that pair of linked PDCCH candidates runs from a start of a first symbol associated with the first PDCCH candidate of that pair of linked PDCCH candidates to an end of a last symbol associated with the second PDCCH candidate of that pair of linked PDCCH candidates.

In a seventh aspect, alone or in combination with one or more of the first through sixth aspects, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

In an eighth aspect, alone or in combination with one or more of the first through seventh aspects, wherein, for each pair of linked PDCCH candidates, the duration associated with that pair of linked PDCCH candidates runs from a start of a first symbol associated with the first PDCCH candidate of that pair of linked PDCCH candidates to a start of a first symbol associated with the second PDCCH candidate of that pair of linked PDCCH candidates.

In a ninth aspect, alone or in combination with one or more of the first through eighth aspects, for each pair of linked PDCCH candidates, the duration associated with that pair of linked PDCCH candidates runs from an end of a last symbol associated with the first PDCCH candidate of that pair of linked PDCCH candidates to a start of a first symbol associated with the second PDCCH candidate of that pair of linked PDCCH candidates.

In a tenth aspect, alone or in combination with one or more of the first through ninth aspects, the indication of the PPU limit associated with the UE includes an indication of respective PPU limits for one or more component carriers.

In an eleventh aspect, alone or in combination with one or more of the first through tenth aspects, process 1400 includes deriving a total PPU limit across all of the one or more component carriers based at least in part on the respective PPU limits for the one or more component carriers.

In a twelfth aspect, alone or in combination with one or more of the first through eleventh aspects, the indication of the PPU limit associated with the UE indicates a PPU limit for a number of PPUs across one or more component carriers.

In a thirteenth aspect, alone or in combination with one or more of the first through twelfth aspects, the indication of the PPU limit associated with the UE includes a respective PPU limit for each of one or more subcarrier spacings.

In a fourteenth aspect, alone or in combination with one or more of the first through thirteenth aspects, the configurations for the plurality of search space sets ensure that a total number of PPUs occupied by the linked PDCCHs in all of the one or more linked pairs of search space sets satisfies the PPU limit associated with the UE at all times.

In a fifteenth aspect, alone or in combination with one or more of the first through fourteenth aspects, transmitting the repeated PDCCH transmissions in a pair of linked PDCCH candidates of a linked pair of search space sets includes transmitting repeated PDCCH transmissions in the pair of linked PDCCH candidates in connection with a determination that a total number of PPUs occupied by the linked PDCCHs in all of the one or more linked pairs of search space sets satisfies the PPU limit associated with the UE during a duration associated with the pair of the linked PDCCH candidates.

In a sixteenth aspect, alone or in combination with one or more of the first through fifteenth aspects, transmitting the repeated PDCCH transmissions in a pair of linked PDCCH candidates of a linked pair of search space sets includes identifying one or more of the linked PDCCH candidates to be dropped by the UE in connection with a determination that a total number of PPUs occupied by the linked PDCCHs in all of the one or more linked pairs of search space sets does not satisfy the PPU limit associated with the UE, and transmitting the repeated PDCCH transmissions in the pair of linked PDCCH candidates, wherein the pair of linked PDCCH candidates is selected from a set of remaining linked PDCCH candidates other than the one or more of the linked PDCCH candidates to be dropped by the UE.

In a seventeenth aspect, alone or in combination with one or more of the first through sixteenth aspects, transmitting the repeated PDCCH transmissions in a pair of linked PDCCH candidates of a linked pair of search space sets includes identifying one or more of the linked PDCCH candidates to be monitored as unlinked PDCCH candidates by the UE in connection with a determination that a total number of PPUs occupied by the linked PDCCHs in all of the one or more linked pairs of search space sets does not satisfy the PPU limit associated with the UE, and transmitting the repeated PDCCH transmissions in the pair of linked PDCCH candidates, wherein the pair of linked PDCCH candidates is selected from a set of remaining linked PDCCH candidates other than the one or more of the linked PDCCH candidates to be monitored as unlinked PDCCH candidates by the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
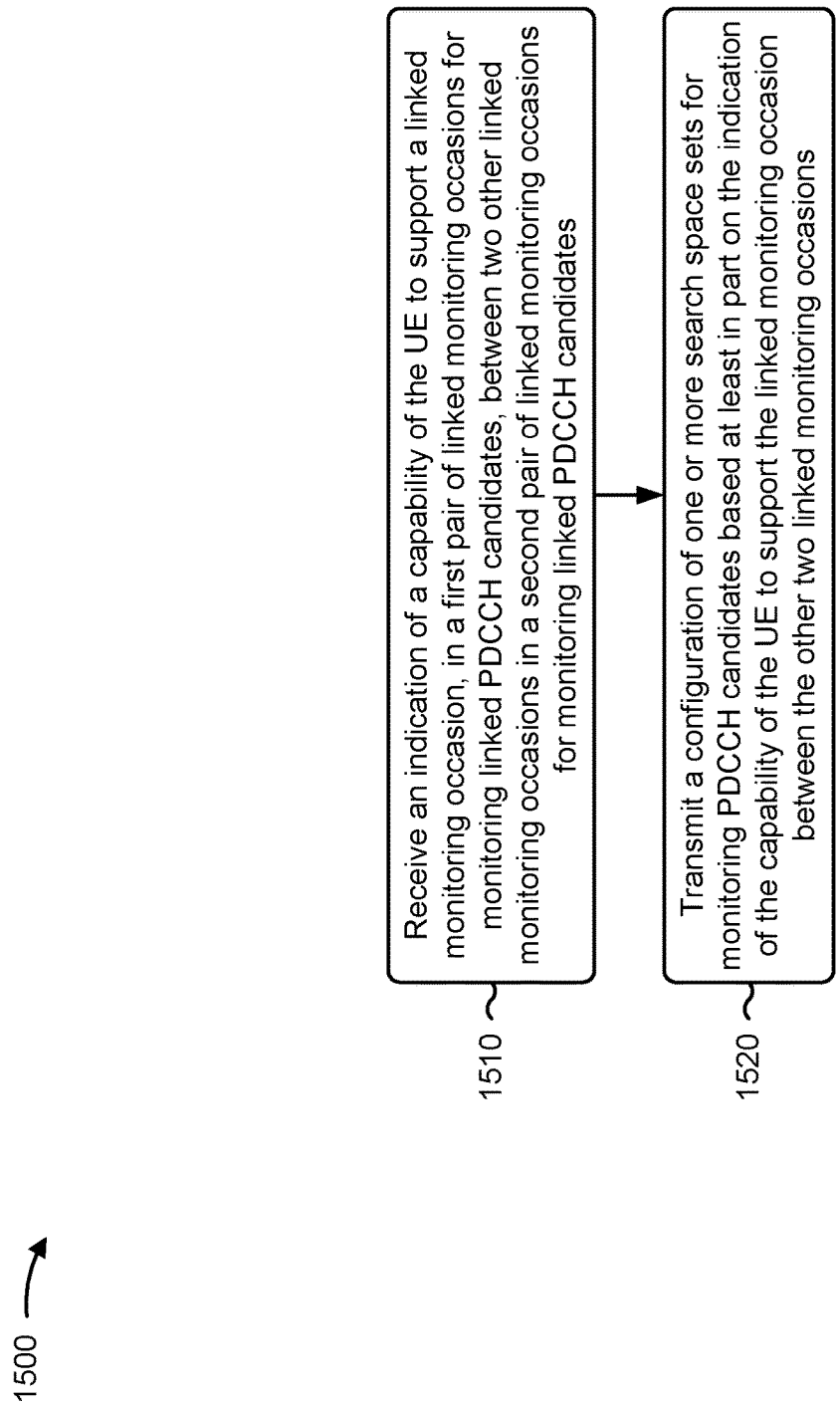

FIG. 15 is a diagram illustrating an example process 1500 performed, for example, by a network node, in accordance with the present disclosure. Example process 1500 is an example where the network node (e.g., base station 110) performs operations associated with complexity handling for PDCCH repetition.

As shown in FIG. 15, in some aspects, process 1500 may include receiving, from a UE, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates (block 1510). For example, the network node (e.g., using communication manager 150 and/or reception component 1702, depicted in FIG. 17) may receive, from a UE, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates, as described above.

As further shown in FIG. 15, in some aspects, process 1500 may include transmitting, to the UE, a configuration of one or more search space sets for monitoring PDCCH candidates based at least in part on the indication of the capability of the UE to support the linked monitoring occasion between the other two linked monitoring occasions (block 1520). For example, the network node (e.g., using communication manager 150 and/or transmission component 1704, depicted in FIG. 17) may transmit, to the UE, a configuration of one or more search space sets for monitoring PDCCH candidates based at least in part on the indication of the capability of the UE to support the linked monitoring occasion between the other two linked monitoring occasions, as described above.

Process 1500 may include additional aspects, such as any single aspect or any combination of aspects described below and/or in connection with one or more other processes described elsewhere herein.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
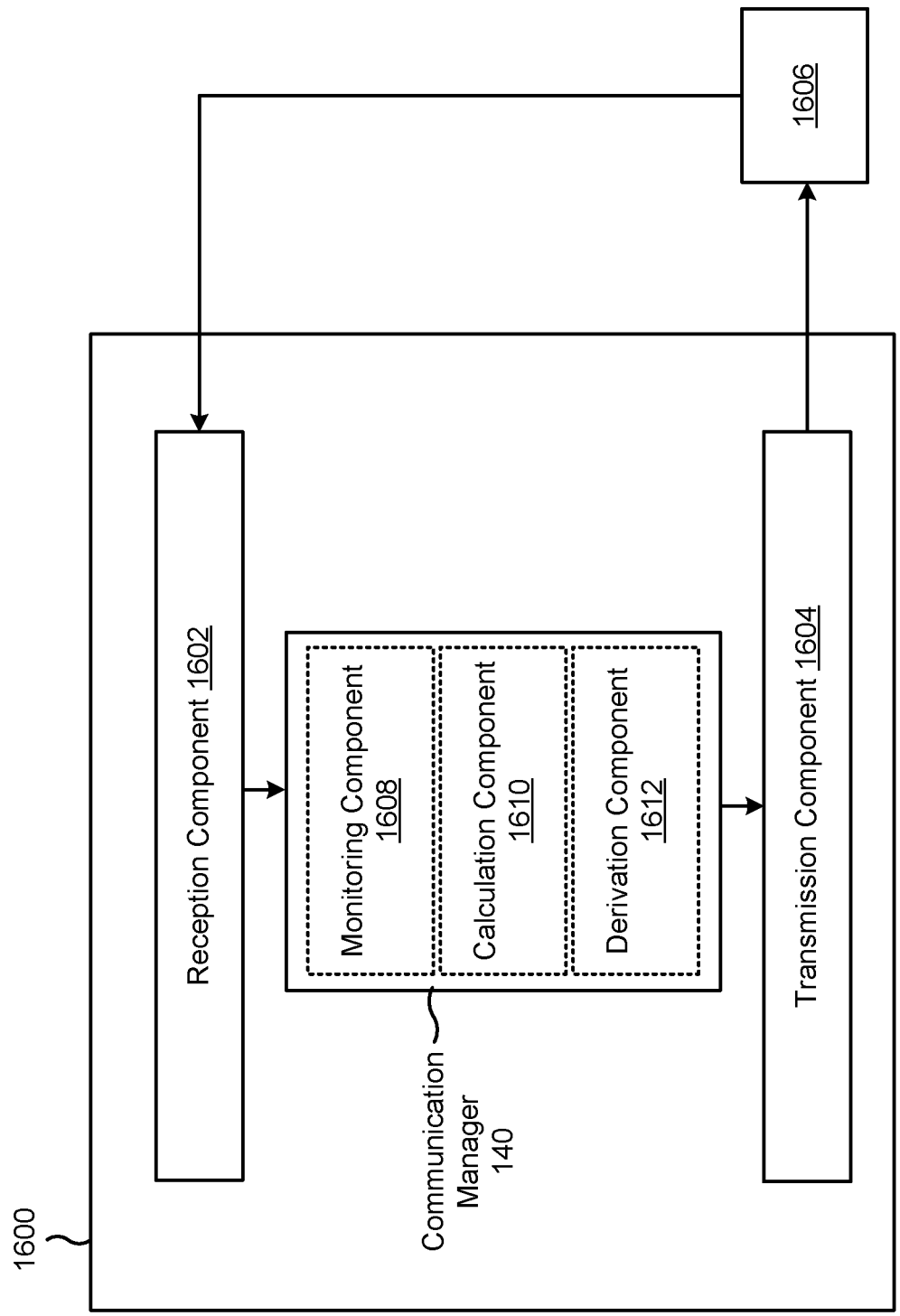
FIGS. 16-17 are diagrams of example apparatuses for wireless communication, in accordance with the present disclosure.

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of a monitoring component 1608, a calculation component 1610, or a derivation component 1612, among other examples.

In some aspects, the apparatus 1600 may be configured to perform one or more operations described herein in connection with FIGS. 5-9B. Additionally, or alternatively, the apparatus 1600 may be configured to perform one or more processes described herein, such as process 1000 of FIG. 10, process 1100 of FIG. 11, process 1200 of FIG. 12, or a combination thereof. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1600. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The transmission component 1604 may transmit, to a network node, an indication of a PPU limit associated with the UE. The reception component 1602 may receive, from the network node, configurations for a plurality of search space sets for PDCCH candidates, wherein the plurality of search space sets includes one or more linked pairs of search space sets with linked PDCCH candidates for PDCCH repetition, and wherein the configurations of the plurality of search space sets are based at least in part on the PPU limit associated with the UE.

The monitoring component 1608 may monitor the linked PDCCH candidates in the one or more linked pairs of search space sets based at least in part on the configurations for the one or more linked pairs of search space sets.

The calculation component 1610 may calculate a total number of PPUs occupied by the linked PDCCH candidates in all of the one or more linked pairs of search space sets at one or more time points associated with linked pairs of monitoring occasions associated with the one or more linked pairs of search space sets.

The monitoring component 1608 may monitor one or more of the linked PDCCH candidates for PDCCH repetition in a linked pair of monitoring occasions in connection with a determination that a total number of PPUs occupied by the linked PDCCH candidates in all of the one or more linked pairs of search space sets satisfies the PPU limit associated with the UE during a duration associated with the one or more of the linked PDCCH candidates.

The transmission component 1604 may transmit, to a network node, an indication of a PPU limit associated with the UE. The reception component 1602 may receive, from the network node, configurations for a plurality of search space sets for PDCCH candidates, wherein the plurality of search space sets includes one or more linked pairs of search space sets with linked PDCCH candidates for PDCCH repetition. The monitoring component 1608 may selectively monitor one or more of the linked PDCCH candidates in a linked pair of monitoring occasions associated with a linked pair of search space sets of the one or more linked pairs of search space sets based at least in part on a comparison of a total number of PPUs occupied by the linked PDCCH candidates in all of the one or more linked pairs of search space sets and the PPU limit associated with the UE.

The calculation component 1610 may calculate the total number of PPUs occupied by the linked PDCCH candidates in all of the one or more linked pairs of search space sets at one or more time points associated with the linked pair of monitoring occasions, wherein selectively monitoring the one or more of the linked PDCCH candidates in the monitoring occasions is based at least in part on a comparison of the total number of PPUs calculated at the one or more time points associated with the linked pair of monitoring occasions and the PPU limit associated with the UE.

The derivation component 1612 may derive a total PPU limit across all of the one or more component carriers based at least in part on the respective PPU limits for the one or more component carriers.

The transmission component 1604 may transmit, to a network node, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates. The reception component 1602 may receive, from the network node, a configuration of a plurality of search space sets for monitoring PDCCH candidates based at least in part on the indication of the capability of the UE to support the linked monitoring occasion between the other two linked monitoring occasions.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
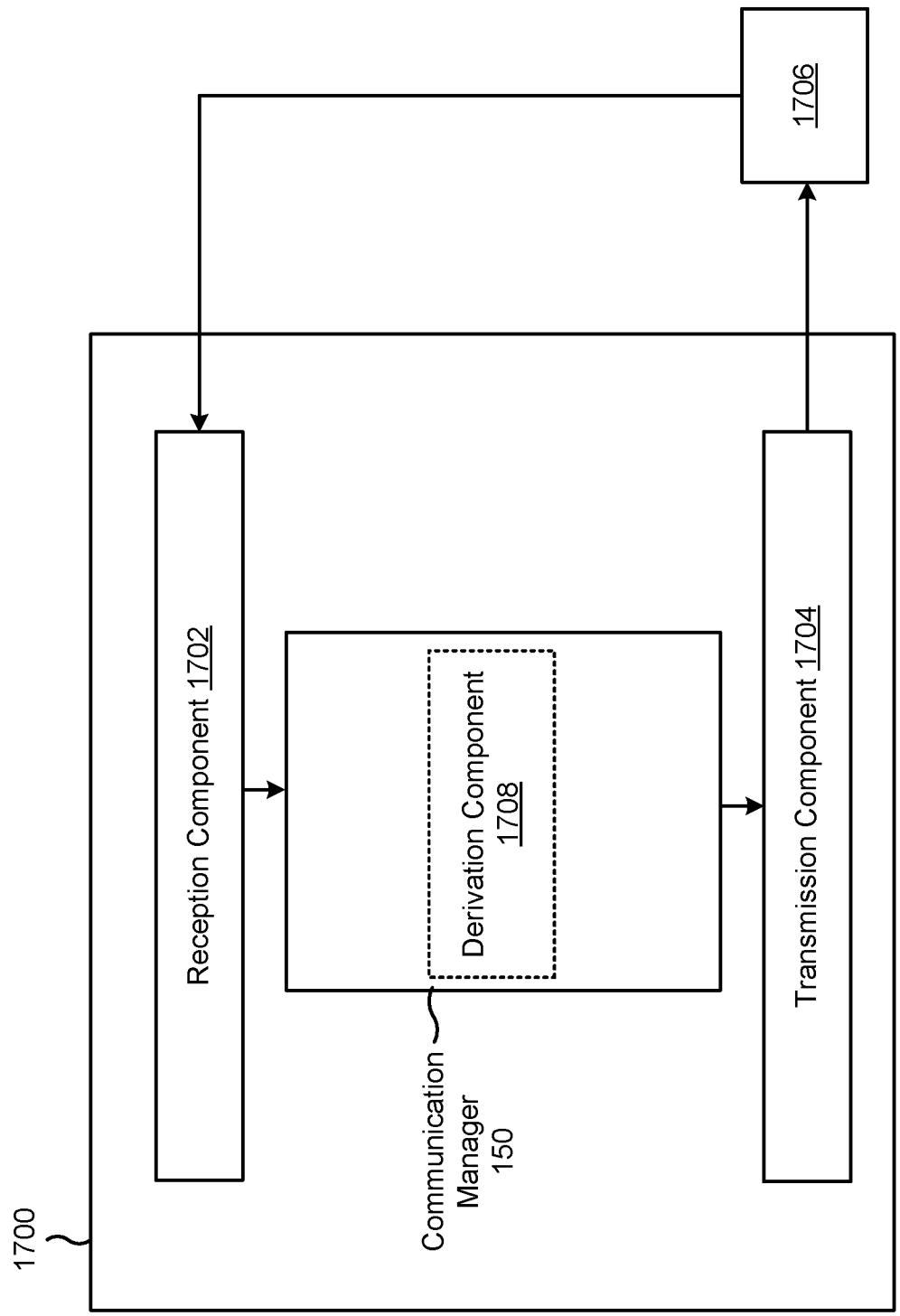

FIG. 17 is a diagram of an example apparatus 1700 for wireless communication. The apparatus 1700 may be a network node (e.g., a base station), or a network node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include a derivation component 1708, among other examples.

In some aspects, the apparatus 1700 may be configured to perform one or more operations described herein in connection with FIGS. 5-9B. Additionally, or alternatively, the apparatus 1700 may be configured to perform one or more processes described herein, such as process 1300 of FIG. 13, process 1400 of FIG. 14, process 1500 of FIG. 15, or a combination thereof. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1700. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1700. In some aspects, one or more other components of the apparatus 1700 may generate communications and may provide the generated communications to the transmission component 1704 for transmission to the apparatus 1700. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1700. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The reception component 1702 may receive, from a UE, an indication of a PPU limit associated with the UE. The transmission component 1704 may transmit, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

The transmission component 1704 may transmit, to the UE, repeated PDCCH transmissions in the linked PDCCH candidates of the one or more linked pairs of search space sets based at least in part on the configurations of the one or more linked pairs of search space sets.

The reception component 1702 may receive, from a UE, an indication of a PPU limit associated with the UE. The transmission component 1704 may transmit, to the UE, configurations for a plurality of search space sets for PDCCH candidates, wherein the plurality of search space sets includes one or more linked pairs of search space sets with linked PDCCH candidates for PDCCH repetition. The transmission component 1704 may transmit, to the UE, repeated PDCCH transmissions in a pair of linked PDCCH candidates of a linked pair of search space sets, wherein at least one of the configurations of the linked pairs of search space sets or transmitting the repeated PDCCH transmissions is based at least in part on the PPU limit associated with the UE.

The derivation component 1708 may derive a total PPU limit across all of the one or more component carriers based at least in part on the respective PPU limits for the one or more component carriers.

The reception component 1702 may receive, from a UE, an indication of a capability of the UE to support a linked monitoring occasion, in a first pair of linked monitoring occasions for monitoring linked PDCCH candidates, between two other linked monitoring occasions in a second pair of linked monitoring occasions for monitoring linked PDCCH candidates. The transmission component 1704 may transmit, to the UE, a configuration of one or more search space sets for monitoring PDCCH candidates based at least in part on the indication of the capability of the UE to support the linked monitoring occasion between the other two linked monitoring occasions.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: transmitting, to a network node, an indication of a physical downlink control channel (PDCCH) processing unit (PPU) limit associated with the UE; receiving, from the network node, configurations for a plurality of search space sets for PDCCH candidates, wherein the plurality of search space sets includes one or more linked pairs of search space sets with linked PDCCH candidates for PDCCH repetition; and selectively monitoring one or more of the linked PDCCH candidates in a linked pair of monitoring occasions associated with a linked pair of search space sets of the one or more linked pairs of search space sets based at least in part on a comparison of a total number of PPUs occupied by the linked PDCCH candidates in all of the one or more linked pairs of search space sets and the PPU limit associated with the UE.

Aspect 2: The method of Aspect 1, further comprising: calculating the total number of PPUs occupied by the linked PDCCH candidates in all of the one or more linked pairs of search space sets at one or more time points associated with the linked pair of monitoring occasions, wherein selectively monitoring the one or more of the linked PDCCH candidates in the monitoring occasions is based at least in part on a comparison of the total number of PPUs calculated at the one or more time points associated with the linked pair of monitoring occasions and the PPU limit associated with the UE.

Aspect 3: The method of any of Aspects 1-2, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

Aspect 4: The method of Aspect 3, wherein, for each pair of linked PDCCH candidates, the number of PPUs occupied by that pair of linked PDCCH candidates is based at least in part on an aggregation level associated with that pair of linked PDCCH candidates.

Aspect 5: The method of any of Aspects 3-4, wherein, for each pair of linked PDCCH candidates, the number of PPUs occupied by that pair of linked PDCCH candidates is equal to an aggregation level associated with that pair of linked PDCCH candidates.

Aspect 6: The method of any of Aspects 3-4, wherein, for each pair of linked PDCCH candidates, the number of PPUs occupied by that pair of linked PDCCH candidates is based at least in part on a mother code length for an aggregation level associated with that pair of linked PDCCH candidates.

Aspect 7: The method of any of Aspects 3-6, wherein, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

Aspect 8: The method of any of Aspects 3-7, wherein, for each pair of linked PDCCH candidates, the duration associated with that pair of linked PDCCH candidates runs from a start of a first symbol associated with the first PDCCH candidate of that pair of linked PDCCH candidates to an end of a last symbol associated with the second PDCCH candidate of that pair of linked PDCCH candidates.

Aspect 9: The method of any of Aspects 3-7, wherein, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

Aspect 10: The method of any of Aspects 3-7, wherein, for each pair of linked PDCCH candidates, the duration associated with that pair of linked PDCCH candidates runs from a start of a first symbol associated with the first PDCCH candidate of that pair of linked PDCCH candidates to a start of a first symbol associated with the second PDCCH candidate of that pair of linked PDCCH candidates.

Aspect 11: The method of any of Aspects 3-7, wherein, for each pair of linked PDCCH candidates, the duration associated with that pair of linked PDCCH candidates runs from an end of a last symbol associated with the first PDCCH candidate of that pair of linked PDCCH candidates to a start of a first symbol associated with the second PDCCH candidate of that pair of linked PDCCH candidates.

Aspect 12: The method of any of Aspects 1-11, wherein the indication of the PPU limit associated with the UE includes an indication of respective PPU limits for one or more component carriers.

Aspect 13: The method of Aspect 12, further comprising: deriving a total PPU limit across all of the one or more component carriers based at least in part on the respective PPU limits for the one or more component carriers.

Aspect 14: The method of any of Aspects 1-12, wherein the indication of the PPU limit associated with the UE indicates a PPU limit for a number of PPUs across one or more component carriers.

Aspect 15: The method of any of Aspects 1-14, wherein the indication of the PPU limit associated with the UE includes a respective PPU limit for each of one or more subcarrier spacings.

Aspect 16: The method of any of Aspects 1-15, wherein selectively monitoring the one or more of the linked PDCCH candidates in the linked pair of monitoring occasions comprises: monitoring the one or more of the linked PDCCH candidates for PDCCH repetition in the linked pair of monitoring occasions, wherein the total number of PPUs occupied by the linked PDCCHs in all of the one or more linked pairs of search space sets is required to satisfy the PPU limit associated with the UE.

Aspect 17: The method of any of Aspects 1-16, wherein selectively monitoring the one or more of the linked PDCCH candidates in the linked pair of monitoring occasions comprises: monitoring the one or more of the linked PDCCH candidates for PDCCH repetition in the linked pair of monitoring occasions in connection with a determination that the total number of PPUs occupied by the linked PDCCHs in all of the one or more linked pairs of search space sets satisfies the PPU limit associated with the UE during a duration associated with the one or more of the linked PDCCH candidates.

Aspect 18: The method of any of Aspects 1-15, wherein selectively monitoring the one or more of the linked PDCCH candidates in the linked pair of monitoring occasions comprises: refraining from monitoring one or more PDCCH candidates of the one or more of the linked PDCCH candidates in the linked pair of monitoring occasions in connection with a determination that the total number of PPUs occupied by the linked PDCCHs in all of the one or more linked pairs of search space sets does not satisfy the PPU limit associated with the UE during a duration associated with the one or more of the linked PDCCH candidates.

Aspect 19: The method of any of Aspects 18, wherein refraining from monitoring one or more PDCCH candidates of the one or more of the linked PDCCH candidates in the linked pair of monitoring occasions comprises: refraining from monitoring the one or more PDCCH candidates in connection with the determination that the total number of PPUs occupied does not satisfy the PPU limit associated with the UE based at least in part on a priority associated with a component carrier for the PDCCH candidates.

Aspect 20: The method of Aspect 18, wherein refraining from monitoring one or more PDCCH candidates of the one or more of the linked PDCCH candidates in the linked pair of monitoring occasions comprises: refraining from monitoring the linked search space set pair in connection with the determination that the total number of PPUs occupied does not satisfy the PPU limit associated with the UE based at least in part on a priority associated with the linked search space set pair.

Aspect 21: The method of Aspect 18, wherein refraining from monitoring one or more PDCCH candidates of the one or more of the linked PDCCH candidates in the linked pair of monitoring occasions comprises: refraining from monitoring the linked monitoring occasion pair in connection with the determination that the total number of PPUs occupied does not satisfy the PPU limit associated with the UE based at least in part on a priority associated with the linked monitoring occasion pair.

Aspect 22: The method of Aspect 18, wherein refraining from monitoring one or more PDCCH candidates of the one or more of the linked PDCCH candidates in the linked pair of monitoring occasions comprises: selecting the PDCCH candidates to refrain from monitoring from the one or more of the linked PDCCH candidates based at least in part on respective priorities associated with the one or more of the linked PDCCH candidates.

Aspect 23: The method of any of Aspects 1-15, wherein selectively monitoring the one or more of the linked PDCCH candidates in the linked pair of monitoring occasions comprises: monitoring the one or more of the linked PDCCH candidates in the linked pair of monitoring occasions separately as unlinked PDCCH candidates in connection with a determination that the total number of PPUs occupied by the linked PDCCHs in all of the one or more linked pairs of search space sets does not satisfy the PPU limit associated with the UE during a duration associated with the one or more of the linked PDCCH candidates.

Aspect 24: A method of communication performed by a user equipment (UE), comprising: transmitting, to a network node, an indication of a capability of the UE to support a linked monitoring occasion, in a first pair of linked monitoring occasions for monitoring linked physical downlink control channel (PDCCH) candidates, between two other linked monitoring occasions in a second pair of linked monitoring occasions for monitoring linked PDCCH candidates; and receiving, from the network node, a configuration of a plurality of search space sets for monitoring PDCCH candidates based at least in part on the indication of the capability of the UE to support the linked monitoring occasion between the other two linked monitoring occasions.

Aspect 25: A method of wireless communication performed by a network node, comprising: receiving, from a user equipment (UE), an indication of a physical downlink control channel (PDCCH) processing unit (PPU) limit associated with the UE; transmitting, to the UE, configurations for a plurality of search space sets for PDCCH candidates, wherein the plurality of search space sets includes one or more linked pairs of search space sets with linked PDCCH candidates for PDCCH repetition; and transmitting, to the UE, repeated PDCCH transmissions in a pair of linked PDCCH candidates of a linked pair of search space sets, wherein at least one of the configurations of the linked pairs of search space sets or transmitting the repeated PDCCH transmissions is based at least in part on the PPU limit associated with the UE.

Aspect 26: The method of Aspect 25, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

Aspect 27: The method of Aspect 26, wherein, for each pair of linked PDCCH candidates, the number of PPUs occupied by that pair of linked PDCCH candidates is based at least in part on an aggregation level associated with that pair of linked PDCCH candidates.

Aspect 28: The method of any of Aspects 26-27, wherein, for each pair of linked PDCCH candidates, the number of PPUs occupied by that pair of linked PDCCH candidates is equal to an aggregation level associated with that pair of linked PDCCH candidates.

Aspect 29: The method of any of Aspects 26-27, wherein, for each pair of linked PDCCH candidates, the number of PPUs occupied by that pair of linked PDCCH candidates is based at least in part on a mother code length for an aggregation level associated with that pair of linked PDCCH candidates.

Aspect 30: The method of any of Aspects 26-29, wherein, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

Aspect 31: The method of any of Aspects 26-30, wherein, for each pair of linked PDCCH candidates, the duration associated with that pair of linked PDCCH candidates runs from a start of a first symbol associated with the first PDCCH candidate of that pair of linked PDCCH candidates to an end of a last symbol associated with the second PDCCH candidate of that pair of linked PDCCH candidates.

Aspect 32: The method of any of Aspects 26-30, wherein, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

Aspect 33: The method of any of Aspects 26-30, wherein, for each pair of linked PDCCH candidates, the duration associated with that pair of linked PDCCH candidates runs from a start of a first symbol associated with the first PDCCH candidate of that pair of linked PDCCH candidates to a start of a first symbol associated with the second PDCCH candidate of that pair of linked PDCCH candidates.

Aspect 34: The method of any of Aspects 26-30, wherein, for each pair of linked PDCCH candidates, the duration associated with that pair of linked PDCCH candidates runs from an end of a last symbol associated with the first PDCCH candidate of that pair of linked PDCCH candidates to a start of a first symbol associated with the second PDCCH candidate of that pair of linked PDCCH candidates.

Aspect 35: The method of any of Aspects 25-34, wherein the indication of the PPU limit associated with the UE includes an indication of respective PPU limits for one or more component carriers.

Aspect 36: The method of Aspect 35, further comprising: deriving a total PPU limit across all of the one or more component carriers based at least in part on the respective PPU limits for the one or more component carriers.

Aspect 37: The method of any of Aspects 25-35, wherein the indication of the PPU limit associated with the UE indicates a PPU limit for a number of PPUs across one or more component carriers.

Aspect 38: The method of any of Aspects 25-37, wherein the indication of the PPU limit associated with the UE includes a respective PPU limit for each of one or more subcarrier spacings.

Aspect 39: The method of any of Aspects 25-38, wherein the configurations for the plurality of search space sets ensure that a total number of PPUs occupied by the linked PDCCHs in all of the one or more linked pairs of search space sets satisfies the PPU limit associated with the UE at all times.

Aspect 40: The method of any of Aspects 25-39, wherein transmitting the repeated PDCCH transmissions in a pair of linked PDCCH candidates of a linked pair of search space sets comprises: transmitting repeated PDCCH transmissions in the pair of linked PDCCH candidates in connection with a determination that a total number of PPUs occupied by the linked PDCCHs in all of the one or more linked pairs of search space sets satisfies the PPU limit associated with the UE during a duration associated with the pair of the linked PDCCH candidates.

Aspect 41: The method of any of Aspects 25-38, wherein transmitting the repeated PDCCH transmissions in a pair of linked PDCCH candidates of a linked pair of search space sets comprises: identifying one or more of the linked PDCCH candidates to be dropped by the UE in connection with a determination that a total number of PPUs occupied by the linked PDCCHs in all of the one or more linked pairs of search space sets does not satisfy the PPU limit associated with the UE; and transmitting the repeated PDCCH transmissions in the pair of linked PDCCH candidates, wherein the pair of linked PDCCH candidates is selected from a set of remaining linked PDCCH candidates other than the one or more of the linked PDCCH candidates to be dropped by the UE.

Aspect 42: The method of any of Aspects 25-38, wherein transmitting the repeated PDCCH transmissions in a pair of linked PDCCH candidates of a linked pair of search space sets comprises: identifying one or more of the linked PDCCH candidates to be monitored as unlinked PDCCH candidates by the UE in connection with a determination that a total number of PPUs occupied by the linked PDCCHs in all of the one or more linked pairs of search space sets does not satisfy the PPU limit associated with the UE; and transmitting the repeated PDCCH transmissions in the pair of linked PDCCH candidates, wherein the pair of linked PDCCH candidates is selected from a set of remaining linked PDCCH candidates other than the one or more of the linked PDCCH candidates to be monitored as unlinked PDCCH candidates by the UE.

Aspect 43: A method of communication performed by a network node, comprising: receiving, from a user equipment (UE), an indication of a capability of the UE to support a linked monitoring occasion, in a first pair of linked monitoring occasions for monitoring linked physical downlink control channel (PDCCH) candidates, between two other linked monitoring occasions in a second pair of linked monitoring occasions for monitoring linked PDCCH candidates; and transmitting, to the UE, a configuration of one or more search space sets for monitoring PDCCH candidates based at least in part on the indication of the capability of the UE to support the linked monitoring occasion between the other two linked monitoring occasions.

Aspect 44: A method of wireless communication performed by a user equipment (UE), comprising: transmitting, to a network node, an indication of a physical downlink control channel (PDCCH) processing unit (PPU) limit associated with the UE; receiving, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Aspect 45: The method of Aspect 44, further comprising: monitoring the linked PDCCH candidates in the one or more linked pairs of search space sets based at least in part on the configurations for the one or more linked pairs of search space sets.

Aspect 46: The method of any of Aspects 44-45, further comprising: calculating a total number of PPUs occupied by the linked PDCCH candidates in all of the one or more linked pairs of search space sets at one or more time points associated with linked pairs of monitoring occasions associated with the one or more linked pairs of search space sets.

Aspect 47: The method of any of Aspects 44-46, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

Aspect 48: The method of Aspect 47, wherein, for each pair of linked PDCCH candidates, the number of PPUs occupied by that pair of linked PDCCH candidates is based at least in part on an aggregation level associated with that pair of linked PDCCH candidates.

Aspect 49: The method of any of Aspects 47-48, wherein, for each pair of linked PDCCH candidates, the number of PPUs occupied by that pair of linked PDCCH candidates is based at least in part on a mother code length for an aggregation level associated with that pair of linked PDCCH candidates.

Aspect 50: The method of any of Aspects 47-49, wherein, for each pair of linked PDCCH candidates, the number of PPUs occupied by that pair of linked PDCCH candidates is equal to a first value in connection with an aggregation level of 1 associated with that pair of linked PDCCH candidates, a second value, larger than the first value, in connection with an aggregation level of 2 associated with that pair of linked PDCCH candidates, or a third value, larger than the second value, in connection with an aggregation level of 4, 8, or 16 associated with that pair of linked PDCCH candidates.

Aspect 51: The method of any of Aspects 47-50, wherein, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

Aspect 52: The method of any of Aspects 47-51, wherein, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

Aspect 53: The method of any of Aspects 44-52, wherein the indication of the PPU limit associated with the UE includes an indication of respective PPU limits for one or more component carriers.

Aspect 54: The method of any of Aspects 44-53, wherein the indication of the PPU limit associated with the UE indicates a PPU limit for a number of PPUs across one or more component carriers.

Aspect 55: The method of any of Aspects 44-54, wherein the indication of the PPU limit associated with the UE includes a respective PPU limit for each of one or more subcarrier spacings.

Aspect 56: The method of any of Aspects 44-55, wherein a total number of PPUs occupied by the linked PDCCHs in all of the one or more linked pairs of search space sets is required to satisfy the PPU limit associated with the UE.

Aspect 57: The method of any of Aspects 44-56, further comprising: monitoring one or more of the linked PDCCH candidates for PDCCH repetition in a linked pair of monitoring occasions in connection with a determination that a total number of PPUs occupied by the linked PDCCH candidates in all of the one or more linked pairs of search space sets satisfies the PPU limit associated with the UE during a duration associated with the one or more of the linked PDCCH candidates.

Aspect 58: A method of wireless communication performed by a network node, comprising: receiving, from a user equipment (UE), an indication of a physical downlink control channel (PDCCH) processing unit (PPU) limit associated with the UE; transmitting, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE.

Aspect 59: The method of Aspect 58, further comprising: transmit, to the UE, repeated PDCCH transmissions in the linked PDCCH candidates of the one or more linked pairs of search space sets based at least in part on the configurations of the one or more linked pairs of search space sets.

Aspect 60: The method of any of Aspects 58-59, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

Aspect 61: The method of Aspect 60, wherein, for each pair of linked PDCCH candidates, the number of PPUs occupied by that pair of linked PDCCH candidates is based at least in part on an aggregation level associated with that pair of linked PDCCH candidates.

Aspect 62: The method of any of Aspects 60-61, wherein, for each pair of linked PDCCH candidates, the number of PPUs occupied by that pair of linked PDCCH candidates is based at least in part on a mother code length for an aggregation level associated with that pair of linked PDCCH candidates.

Aspect 63: The method of any of Aspects 60-62, wherein, for each pair of linked PDCCH candidates, the number of PPUs occupied by that pair of linked PDCCH candidates is equal to a first value in connection with an aggregation level of 1 associated with that pair of linked PDCCH candidates, a second value, larger than the first value, in connection with an aggregation level of 2 associated with that pair of linked PDCCH candidates, or a third value, larger than the second value, in connection with an aggregation level of 4, 8, or 16 associated with that pair of linked PDCCH candidates.

Aspect 64: The method of any of Aspects 60-63, wherein, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

Aspect 65: The method of any of Aspects 60-64, wherein, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

Aspect 66: The method of any of Aspects 58-65, wherein the indication of the PPU limit associated with the UE includes an indication of respective PPU limits for one or more component carriers.

Aspect 67: The method of any of Aspects 58-66, wherein the indication of the PPU limit associated with the UE indicates a PPU limit for a number of PPUs across one or more component carriers.

Aspect 68: The method of any of Aspects 58-67, wherein the indication of the PPU limit associated with the UE includes a respective PPU limit for each of one or more subcarrier spacings.

Aspect 69: The method of any of Aspects 58-68, wherein the configurations for the plurality of search space sets ensure that a total number of PPUs occupied by the linked PDCCHs in all of the one or more linked pairs of search space sets satisfies the PPU limit associated with the UE at all times.

Aspect 70: An apparatus for wireless communication at a device, comprising a processor; memory coupled with the processor; and instructions stored in the memory and executable by the processor to cause the apparatus to perform the method of one or more of Aspects 1-23.

Aspect 71: An apparatus for wireless communication at a device, comprising a processor; memory coupled with the processor; and instructions stored in the memory and executable by the processor to cause the apparatus to perform the method of Aspect 24.

Aspect 72: An apparatus for wireless communication at a device, comprising a processor; memory coupled with the processor; and instructions stored in the memory and executable by the processor to cause the apparatus to perform the method of one or more of Aspects 25-42.

Aspect 73: An apparatus for wireless communication at a device, comprising a processor; memory coupled with the processor; and instructions stored in the memory and executable by the processor to cause the apparatus to perform the method of Aspect 43.

Aspect 74: An apparatus for wireless communication at a device, comprising a processor; memory coupled with the processor; and instructions stored in the memory and executable by the processor to cause the apparatus to perform the method of one or more of Aspects 44-57.

Aspect 75: An apparatus for wireless communication at a device, comprising a processor; memory coupled with the processor; and instructions stored in the memory and executable by the processor to cause the apparatus to perform the method of one or more of Aspects 58-69.

Aspect 76: A device for wireless communication, comprising a memory and one or more processors coupled to the memory, the one or more processors configured to perform the method of one or more of Aspects 1-23.

Aspect 77: A device for wireless communication, comprising a memory and one or more processors coupled to the memory, the one or more processors configured to perform the method of Aspect 24.

Aspect 78: A device for wireless communication, comprising a memory and one or more processors coupled to the memory, the one or more processors configured to perform the method of one or more of Aspects 25-42.

Aspect 79: A device for wireless communication, comprising a memory and one or more processors coupled to the memory, the one or more processors configured to perform the method of Aspect 43.

Aspect 80: A device for wireless communication, comprising a memory and one or more processors coupled to the memory, the one or more processors configured to perform the method of one or more of Aspects 44-57.

Aspect 81: A device for wireless communication, comprising a memory and one or more processors coupled to the memory, the one or more processors configured to perform the method of one or more of Aspects 58-69.

Aspect 82: An apparatus for wireless communication, comprising at least one means for performing the method of one or more of Aspects 1-23.

Aspect 83: An apparatus for wireless communication, comprising at least one means for performing the method of Aspect 24.

Aspect 84: An apparatus for wireless communication, comprising at least one means for performing the method of one or more of Aspects 25-42.

Aspect 85: An apparatus for wireless communication, comprising at least one means for performing the method of Aspect 43.

Aspect 86: An apparatus for wireless communication, comprising at least one means for performing the method of Aspects 44-57.

Aspect 87: An apparatus for wireless communication, comprising at least one means for performing the method of Aspects 58-69.

Aspect 88: A non-transitory computer-readable medium storing code for wireless communication, the code comprising instructions executable by a processor to perform the method of one or more of Aspects 1-23.

Aspect 89: A non-transitory computer-readable medium storing code for wireless communication, the code comprising instructions executable by a processor to perform the method of Aspect 24.

Aspect 90: A non-transitory computer-readable medium storing code for wireless communication, the code comprising instructions executable by a processor to perform the method of one or more of Aspects 25-42.

Aspect 91: A non-transitory computer-readable medium storing code for wireless communication, the code comprising instructions executable by a processor to perform the method of Aspect 43.

Aspect 92: A non-transitory computer-readable medium storing code for wireless communication, the code comprising instructions executable by a processor to perform the method of one or more of Aspects 44-57.

Aspect 93: A non-transitory computer-readable medium storing code for wireless communication, the code comprising instructions executable by a processor to perform the method of one or more of Aspects 57-69.

Aspect 94: A non-transitory computer-readable medium storing a set of instructions for wireless communication, the set of instructions comprising one or more instructions that, when executed by one or more processors of a device, cause the device to perform the method of one or more of Aspects 1-23.

Aspect 95: A non-transitory computer-readable medium storing a set of instructions for wireless communication, the set of instructions comprising one or more instructions that, when executed by one or more processors of a device, cause the device to perform the method of Aspect 24.

Aspect 96: A non-transitory computer-readable medium storing a set of instructions for wireless communication, the set of instructions comprising one or more instructions that, when executed by one or more processors of a device, cause the device to perform the method of one or more of Aspects 25-42.

Aspect 97: A non-transitory computer-readable medium storing a set of instructions for wireless communication, the set of instructions comprising one or more instructions that, when executed by one or more processors of a device, cause the device to perform the method of Aspect 43.

Aspect 98: A non-transitory computer-readable medium storing a set of instructions for wireless communication, the set of instructions comprising one or more instructions that, when executed by one or more processors of a device, cause the device to perform the method of one or more of Aspects 44-57.

Aspect 99: A non-transitory computer-readable medium storing a set of instructions for wireless communication, the set of instructions comprising one or more instructions that, when executed by one or more processors of a device, cause the device to perform the method of one or more of Aspects 58-69.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, individually or collectively configured to cause the UE to:
   transmit, to a network node, an indication of a physical downlink control channel (PDCCH) processing unit (PPU) limit associated with the UE; and
   receive, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

2. The UE of claim 1, wherein the one or more processors are individually or collectively configured to cause the UE to:
monitor the linked PDCCH candidates in the one or more linked pairs of search space sets based at least in part on the configurations for the one or more linked pairs of search space sets.

3. The UE of claim 1, wherein the one or more processors are individually or collectively configured to cause the UE to:
calculate a total number of PPUs occupied by the linked PDCCH candidates in all of the one or more linked pairs of search space sets at one or more time points associated with linked pairs of monitoring occasions associated with the one or more linked pairs of search space sets.

4. The UE of claim 1, wherein, for each pair of linked PDCCH candidates, the number of PPUs occupied by that pair of linked PDCCH candidates is based at least in part on an aggregation level associated with that pair of linked PDCCH candidates.

5. The UE of claim 1, wherein, for each pair of linked PDCCH candidates, the number of PPUs occupied by that pair of linked PDCCH candidates is based at least in part on a mother code length for an aggregation level associated with that pair of linked PDCCH candidates.

6. The UE of claim 1, wherein, for each pair of linked PDCCH candidates, the number of PPUs occupied by that pair of linked PDCCH candidates is equal to a first value in connection with an aggregation level of 1 associated with that pair of linked PDCCH candidates, a second value, larger than the first value, in connection with an aggregation level of 2 associated with that pair of linked PDCCH candidates, or a third value, larger than the second value, in connection with an aggregation level of 4, 8, or 16 associated with that pair of linked PDCCH candidates.

7. The UE of claim 1, wherein, for each pair of linked PDCCH candidates, the duration associated with that pair of linked PDCCH candidates is based at least in part on one or more symbols associated with the first PDCCH candidate of that pair of linked PDCCH candidates and one or more symbols associated with the second PDCCH candidate of that pair of linked PDCCH candidates.

8. The UE of claim 1, wherein, for each pair of linked PDCCH candidates, the duration associated with that pair of linked PDCCH candidates runs from an end of a last symbol associated with the first PDCCH candidate of that pair of linked PDCCH candidates to an end of a last symbol associated with the second PDCCH candidate of that pair of linked PDCCH candidates.

9. The UE of claim 1, wherein the indication of the PPU limit associated with the UE includes an indication of respective PPU limits for one or more component carriers.

10. The UE of claim 1, wherein the indication of the PPU limit associated with the UE indicates a PPU limit for a number of PPUs across one or more component carriers.

11. The UE of claim 1, wherein the indication of the PPU limit associated with the UE includes a respective PPU limit for each of one or more subcarrier spacings.

12. The UE of claim 1, wherein a total number of PPUs occupied by the linked PDCCHs in all of the one or more linked pairs of search space sets is required to satisfy the PPU limit associated with the UE.

13. The UE of claim 1, wherein the one or more processors are individually or collectively configured to cause the UE to:
monitor one or more of the linked PDCCH candidates for PDCCH repetition in a linked pair of monitoring occasions in connection with a determination that a total number of PPUs occupied by the linked PDCCHs in all of the one or more linked pairs of search space sets satisfies the PPU limit associated with the UE during a duration associated with the one or more of the linked PDCCH candidates.

14. A network node for wireless communication, comprising:
one or more memories; and
one or more processors, coupled to the one or more memories, individually or collectively configured to cause the network node to:
receive, from a user equipment (UE), an indication of a physical downlink control channel (PDCCH) processing unit (PPU) limit associated with the UE; and
transmit, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

15. The network node of claim 14, wherein the one or more processors are individually or collectively configured to cause the network node to:
transmit, to the UE, repeated PDCCH transmissions in the linked PDCCH candidates of the one or more linked pairs of search space sets based at least in part on the configurations of the one or more linked pairs of search space sets.

16. The network node of claim 14, wherein, for each pair of linked PDCCH candidates, the number of PPUs occupied by that pair of linked PDCCH candidates is based at least in part on an aggregation level associated with that pair of linked PDCCH candidates.

17. The network node of claim 14, wherein the indication of the PPU limit associated with the UE includes an indication of respective PPU limits for one or more component carriers.

18. The network node of claim 14, wherein the indication of the PPU limit associated with the UE indicates a PPU limit for a number of PPUs across one or more component carriers.

19. The network node of claim 14, wherein the indication of the PPU limit associated with the UE includes a respective PPU limit for each of one or more subcarrier spacings.

20. The network node of claim 14, wherein the configurations for the plurality of search space sets ensure that a total number of PPUs occupied by the linked PDCCHs in all of the one or more linked pairs of search space sets satisfies the PPU limit associated with the UE at all times.

21. A method of wireless communication performed by a user equipment (UE), comprising:
- transmitting, to a network node, an indication of a physical downlink control channel (PDCCH) processing unit (PPU) limit associated with the UE; and
- receiving, from the network node, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

22. The method of claim 21, further comprising:
- monitoring the linked PDCCH candidates in the one or more linked pairs of search space sets based at least in part on the configurations for the one or more linked pairs of search space sets.

23. The method of claim 21, wherein, for each pair of linked PDCCH candidates, the number of PPUs occupied by that pair of linked PDCCH candidates is based at least in part on an aggregation level associated with that pair of linked PDCCH candidates.

24. The method of claim 21, wherein the indication of the PPU limit associated with the UE includes an indication of respective PPU limits for one or more component carriers.

25. The method of claim 21, wherein the indication of the PPU limit associated with the UE indicates a PPU limit for a number of PPUs across one or more component carriers.

26. The method of claim 21, wherein the indication of the PPU limit associated with the UE includes a respective PPU limit for each of one or more subcarrier spacings.

27. The method of claim 21, wherein, for each pair of linked PDCCH candidates, the number of PPUs occupied by that pair of linked PDCCH candidates is based at least in part on a mother code length for an aggregation level associated with that pair of linked PDCCH candidates.

28. A method of wireless communication performed by a network node, comprising:
- receiving, from a user equipment (UE), an indication of a physical downlink control channel (PDCCH) processing unit (PPU) limit associated with the UE; and
- transmitting, to the UE, configurations for a plurality of search space sets for PDCCH candidates, wherein the plurality of search space sets includes one or more linked pairs of search space sets with linked PDCCH candidates for PDCCH repetition, and wherein the configurations for the one or more linked pairs of search space sets are based at least in part on the PPU limit associated with the UE, wherein the linked PDCCH candidates include one or more pairs of linked PDCCH candidates, where each pair of linked PDCCH candidates of the one or more pairs of linked PDCCH candidates includes a first PDCCH candidate in a first search space set linked to a second PDCCH candidate in a second search space set, and wherein each pair of linked PDCCH candidates occupies a number of PPUs for a duration associated with that pair of linked PDCCH candidates.

29. The method of claim 28, wherein, for each pair of linked PDCCH candidates, the number of PPUs occupied by that pair of linked PDCCH candidates is based at least in part on a mother code length for an aggregation level associated with that pair of linked PDCCH candidates.

30. The method of claim 28, wherein the indication of the PPU limit associated with the UE indicates: a PPU limit for a number of PPUs across one or more component carriers, or a respective PPU limit for each of one or more subcarrier spacings.

* * * * *